(12) United States Patent
Lampard et al.

(10) Patent No.: US 11,484,172 B1
(45) Date of Patent: Nov. 1, 2022

(54) WET DRY APPLIANCE

(71) Applicant: SHARKNINJA OPERATING LLC, Needham, MA (US)

(72) Inventors: Bartholomew Lampard, London (GB); Lee Cottrell, Edenbridge (GB); Simon Wells, Wokingham (GB); Fred Harrison, London (GB); Simon Lewis Bilton, Warws (GB); Rory Hawkins, Warws (GB); Benedict William Flynn Taylor, Warws (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/832,136

(22) Filed: Jun. 3, 2022

Related U.S. Application Data

(60) Provisional application No. 63/285,867, filed on Dec. 3, 2021.

(51) Int. Cl.
*A47L 11/40* (2006.01)
*A47L 7/00* (2006.01)
(Continued)

(52) U.S. Cl.
CPC ......... *A47L 11/4027* (2013.01); *A47L 7/0038* (2013.01); *A47L 7/0042* (2013.01);
(Continued)

(58) Field of Classification Search
CPC .............. A47L 11/4027; A47L 11/302; A47L 11/4016; A47L 11/4025; A47L 7/0038; A47L 7/0042
See application file for complete search history.

(56) References Cited

U.S. PATENT DOCUMENTS

| 7,491,005 B2 | 2/2009 | Blom |
| 9,131,824 B2 | 9/2015 | Crawford et al. |
| (Continued) | | |

FOREIGN PATENT DOCUMENTS

| CA | 3025513 A1 | 5/2019 |
| CA | 3028214 A1 | 6/2019 |
| (Continued) | | |

OTHER PUBLICATIONS

U.S. Appl. No. 17/832,155, filed Jun. 3, 2022, Wet Dry Appliance.
(Continued)

*Primary Examiner* — Andrew A Horton
(74) *Attorney, Agent, or Firm* — Mintz Levin Cohn Ferris Glovsky and Popeo, PC; Lisa Adams

(57) ABSTRACT

A cleaning device and methods for cleaning are provided. In one embodiment, the cleaning device includes a head assembly, a body assembly, and a handle assembly. The cleaning device also includes components that enable the cleaning device to operate in dry cleaning modes and wet cleaning modes. Dry cleaning modes can employ a vacuum assembly, including a motor, tubing, and a fluid recovery tank in order to draw in debris and waste into a fluid recovery tank. Wet cleaning modes can further employ a fluid supply tank, a pump, and tubing in order to supply fluid to a brushroll to aid in a cleaning process.

27 Claims, 52 Drawing Sheets

(51) Int. Cl.
  *B01D 21/00* (2006.01)
  *B01D 29/01* (2006.01)
  *B01D 29/56* (2006.01)
  *A47L 11/30* (2006.01)
  *B01D 35/30* (2006.01)

(52) U.S. Cl.
  CPC ......... *A47L 11/302* (2013.01); *A47L 11/4016* (2013.01); *A47L 11/4025* (2013.01); *B01D 21/0042* (2013.01); *B01D 29/01* (2013.01); *B01D 29/56* (2013.01); *B01D 35/30* (2013.01); *B01D 2201/184* (2013.01); *B01D 2201/302* (2013.01); *B01D 2201/305* (2013.01); *B01D 2201/316* (2013.01)

(56) References Cited

U.S. PATENT DOCUMENTS

| | | | |
|---|---|---|---|
| 9,320,406 | B2 | 4/2016 | Irwin et al. |
| 9,408,517 | B2 | 8/2016 | Fitzpatrick et al. |
| 9,661,975 | B2 | 5/2017 | Charlton |
| 9,687,133 | B2 | 6/2017 | Zhu et al. |
| 9,833,117 | B2 | 12/2017 | Ludtke et al. |
| 10,092,155 | B2 | 10/2018 | Xia et al. |
| 10,182,697 | B2 | 1/2019 | Schultheis et al. |
| 10,478,038 | B1 | 11/2019 | Gardner |
| 10,512,383 | B2 | 12/2019 | Luyckx et al. |
| 10,631,702 | B2 | 4/2020 | Xia et al. |
| 10,682,034 | B2 | 6/2020 | Ribbe et al. |
| 10,820,769 | B2 | 11/2020 | Xia et al. |
| D908,994 | S | 1/2021 | Xia et al. |
| D908,995 | S | 1/2021 | Xia et al. |
| 10,925,455 | B1 | 2/2021 | Xia et al. |
| 10,966,586 | B2 | 4/2021 | Luyckx et al. |
| 10,973,383 | B1 | 4/2021 | Nguyen et al. |
| 11,006,809 | B2 | 5/2021 | Li |
| 11,013,389 | B2 | 5/2021 | Resch et al. |
| 11,013,392 | B2 | 5/2021 | Mcdonnell |
| 11,071,428 | B2 | 7/2021 | Resch et al. |
| 11,076,735 | B2 | 8/2021 | Resch et al. |
| 11,089,933 | B2 | 8/2021 | Xia et al. |
| 11,096,539 | B2 | 8/2021 | Xia et al. |
| 11,096,540 | B2 | 8/2021 | Xia et al. |
| 11,096,541 | B2 | 8/2021 | Xia et al. |
| 11,096,542 | B2 | 8/2021 | Xia et al. |
| 11,096,543 | B2 | 8/2021 | Xia et al. |
| 11,096,544 | B2 | 8/2021 | Nguyen et al. |
| 11,122,949 | B2 | 9/2021 | Xia et al. |
| 11,122,956 | B2 | 9/2021 | Harrington et al. |
| 11,147,426 | B2 | 10/2021 | Nguyen et al. |
| 11,147,428 | B2 | 10/2021 | Metzel et al. |
| 11,147,429 | B2 | 10/2021 | Mcdonnell |
| 11,185,205 | B2 | 11/2021 | Luyckx et al. |
| 11,202,549 | B2 | 12/2021 | Krebs et al. |
| 11,241,134 | B2 | 2/2022 | Xia et al. |
| 11,304,581 | B2 | 4/2022 | Resch et al. |
| 11,375,868 | B2 | 7/2022 | Zhu et al. |
| 2019/0082925 | A1* | 3/2019 | Conrad ................. A47L 7/0023 |
| 2020/0214527 | A1 | 7/2020 | Resch et al. |
| 2020/0253447 | A1 | 8/2020 | Wang et al. |
| 2021/0022581 | A1 | 1/2021 | Piksa |
| 2021/0113047 | A1 | 4/2021 | Zhao et al. |
| 2021/0228046 | A1 | 7/2021 | Nguyen et al. |
| 2021/0267428 | A1 | 9/2021 | Scholten et al. |
| 2021/0298554 | A1 | 9/2021 | Resch et al. |
| 2021/0321849 | A1 | 10/2021 | Resch et al. |
| 2021/0338033 | A1 | 11/2021 | Nguyen et al. |
| 2022/0015597 | A1 | 1/2022 | Nguyen et al. |
| 2022/0061622 | A1 | 3/2022 | Luyckx et al. |
| 2022/0071466 | A1 | 3/2022 | Xia et al. |

FOREIGN PATENT DOCUMENTS

| | | |
|---|---|---|
| CA | 3104286 A1 | 12/2019 |
| CA | 3104290 A1 | 12/2019 |
| CA | 3123772 A1 | 12/2019 |
| CA | 3104494 A1 | 7/2020 |
| CA | 3104496 A1 | 7/2020 |
| CA | 3104499 A1 | 7/2020 |
| CA | 3104501 A1 | 7/2020 |
| CA | 3066796 C | 7/2021 |
| CN | 105816120 A | 8/2016 |
| CN | 106108810 A | 11/2016 |
| CN | 206434268 U | 8/2017 |
| CN | 107348918 A | 11/2017 |
| CN | 106108810 B | 8/2018 |
| CN | 108720754 A | 11/2018 |
| CN | 108903859 A | 11/2018 |
| CN | 108937750 A | 12/2018 |
| CN | 109124511 A | 1/2019 |
| CN | 105816120 B | 2/2019 |
| CN | 109431401 A | 3/2019 |
| CN | 109938647 A | 6/2019 |
| CN | 209463915 U | 10/2019 |
| CN | 108720754 B | 10/2020 |
| CN | 211933874 U | 11/2020 |
| CN | 112469319 A | 3/2021 |
| CN | 112512394 A | 3/2021 |
| CN | 109124511 B | 4/2021 |
| CN | 112806900 A | 5/2021 |
| CN | 112842164 A | 5/2021 |
| CN | 112914441 A | 6/2021 |
| CN | 112932324 A | 6/2021 |
| CN | 112956946 A | 6/2021 |
| CN | 112971589 A | 6/2021 |
| CN | 113057539 A | 7/2021 |
| CN | 213850446 U | 8/2021 |
| CN | 213883040 U | 8/2021 |
| CN | 213883041 U | 8/2021 |
| CN | 112469319 B | 4/2022 |
| EP | 3491991 A1 | 6/2019 |
| EP | 3466311 B1 | 2/2020 |
| EP | 3491986 B1 | 6/2020 |
| EP | 3501363 B1 | 10/2020 |
| EP | 3763269 A1 | 1/2021 |
| EP | 3162262 B1 | 2/2021 |
| EP | 3785594 A1 | 3/2021 |
| EP | 3787468 A1 | 3/2021 |
| EP | 3788922 A1 | 3/2021 |
| EP | 3793420 A1 | 3/2021 |
| EP | 3834689 A1 | 6/2021 |
| EP | 3834690 A1 | 6/2021 |
| EP | 3766397 B8 | 11/2021 |
| EP | 3838096 B1 | 11/2021 |
| EP | 3788932 B1 | 12/2021 |
| EP | 3847940 B1 | 2/2022 |
| EP | 3888519 B1 | 2/2022 |
| EP | 3679845 B1 | 3/2022 |
| EP | 3815592 B1 | 3/2022 |
| EP | 3875013 B1 | 3/2022 |
| WO | 2022116343 A1 | 6/2022 |
| WO | 2022116344 A1 | 6/2022 |

OTHER PUBLICATIONS

U.S. Appl. No. 17/832,192, filed Jun. 3, 2022, Wet Dry Appliance.

\* cited by examiner

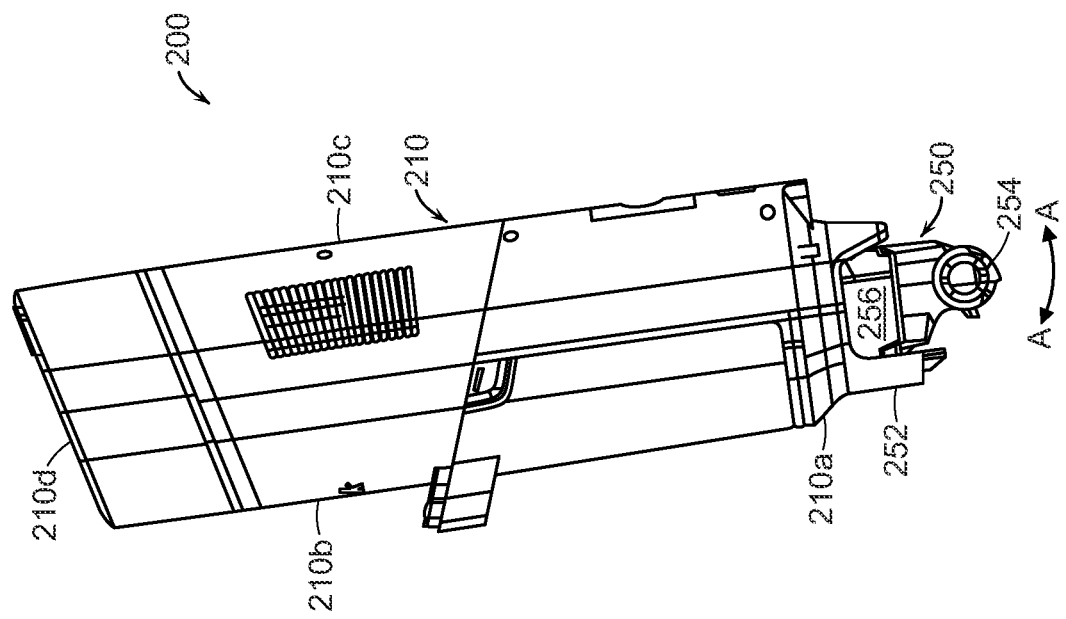
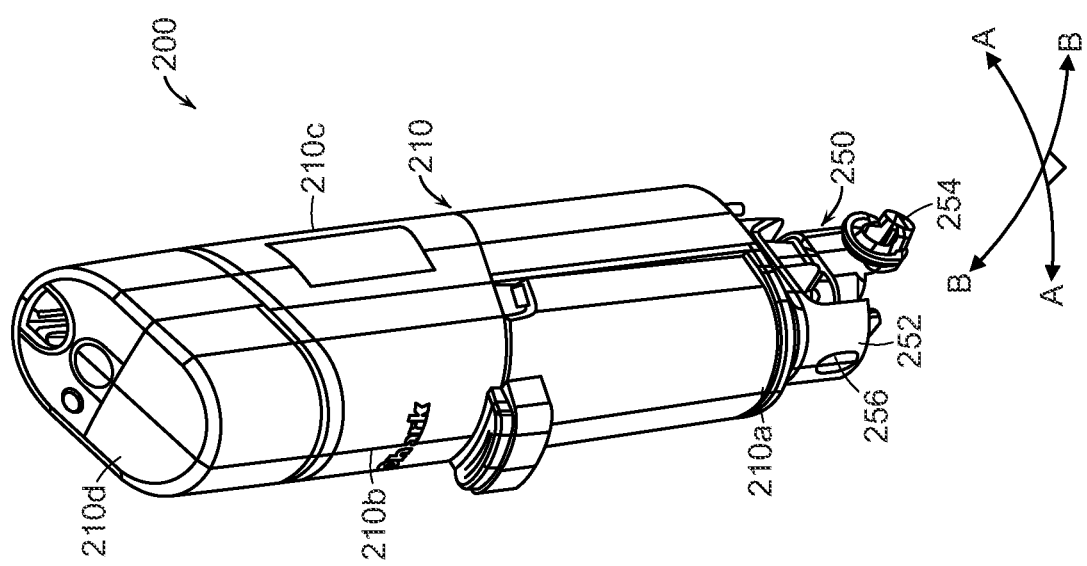

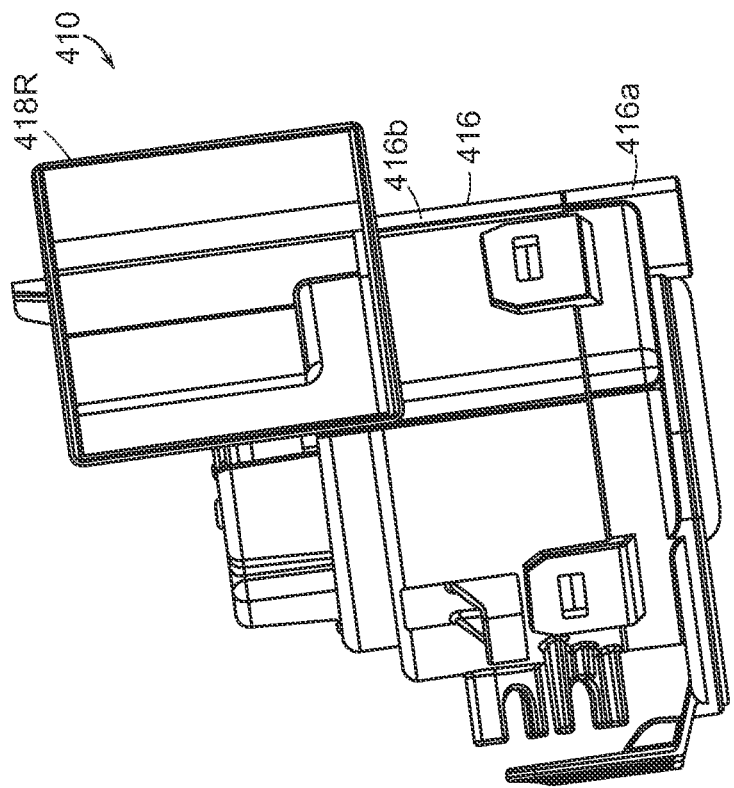
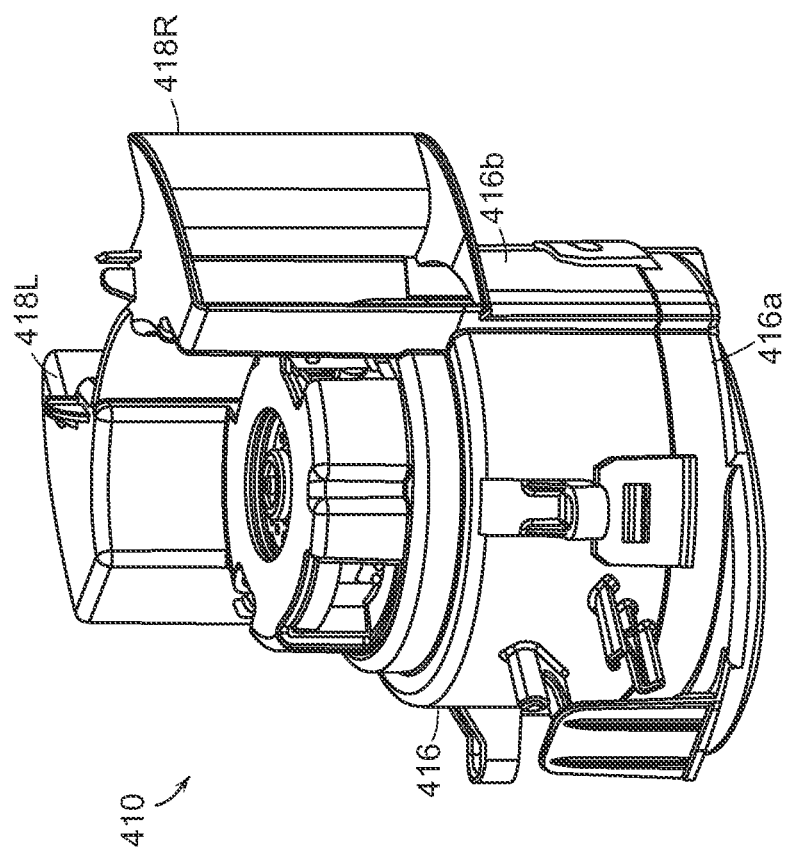

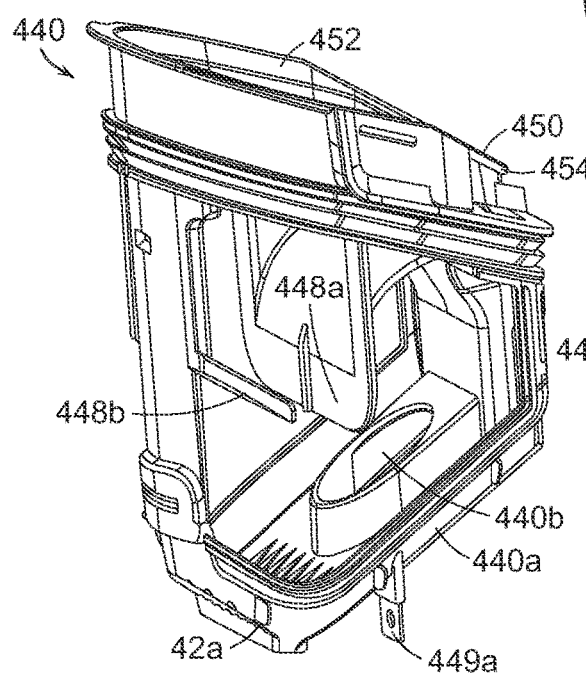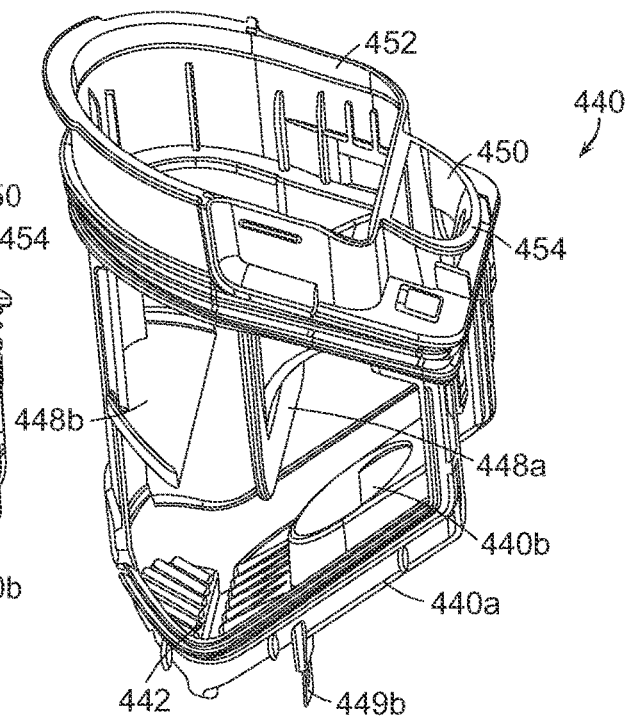
FIG. 10E  FIG. 10F
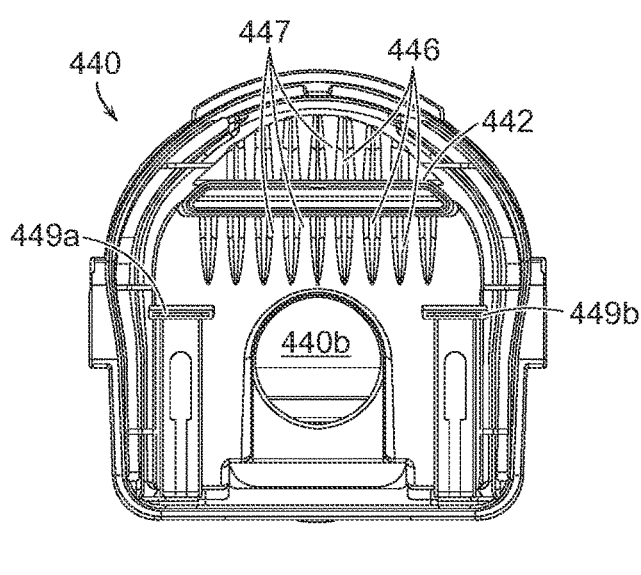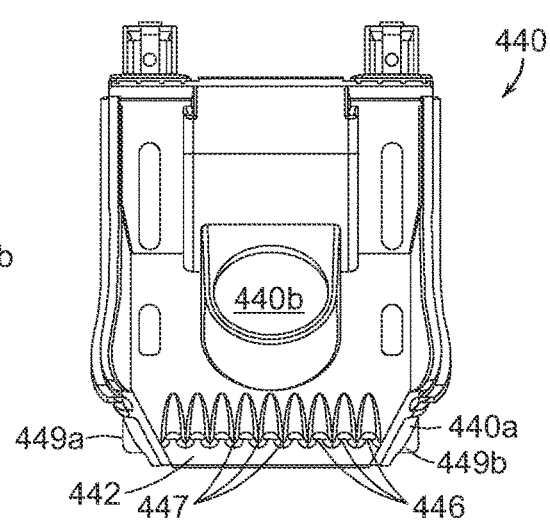
FIG. 10G  FIG. 10H

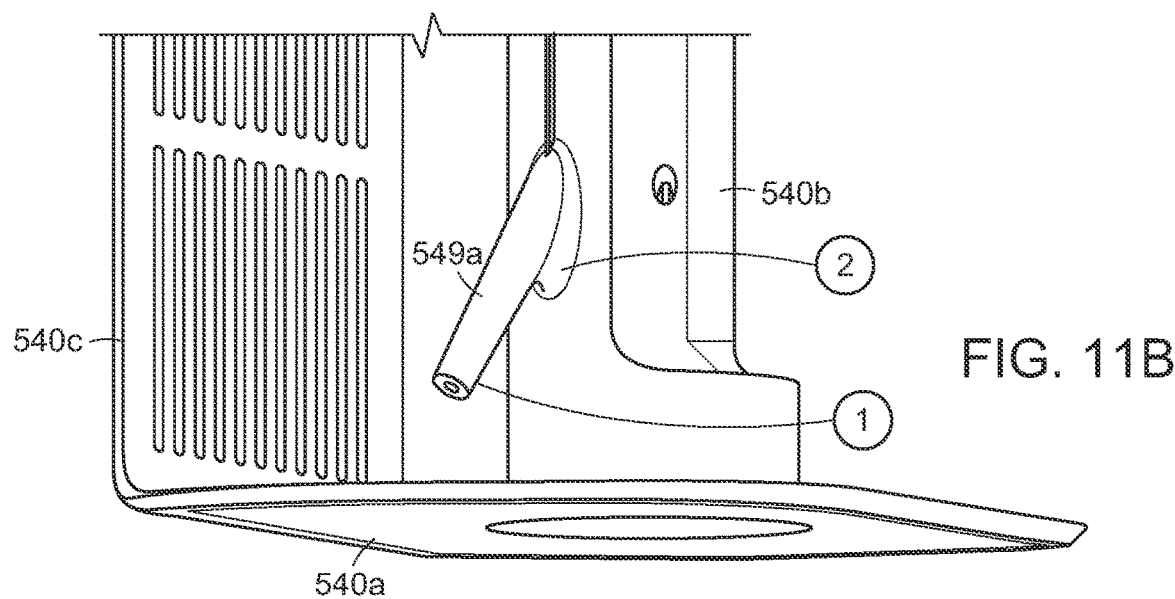
FIG. 11B
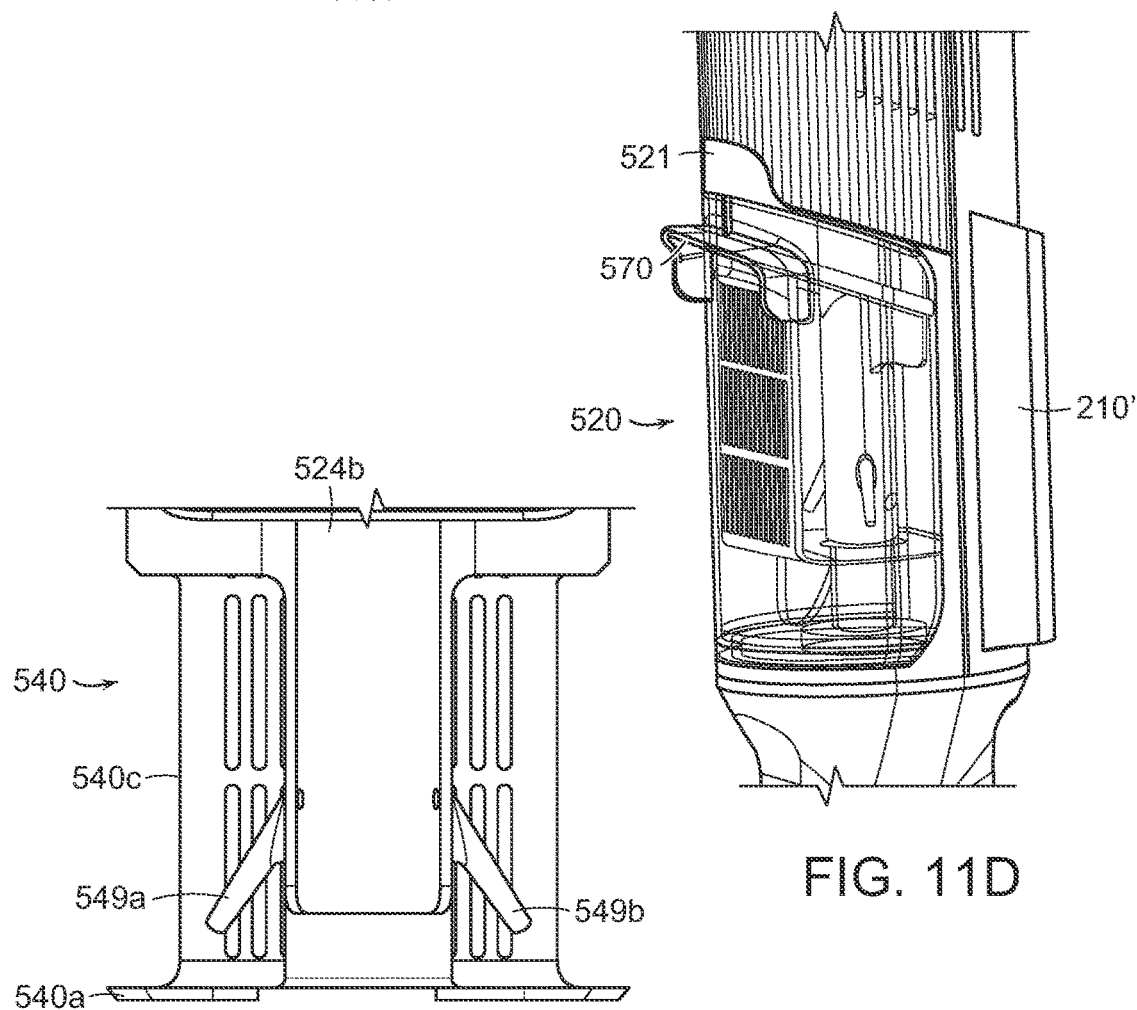
FIG. 11C
FIG. 11D

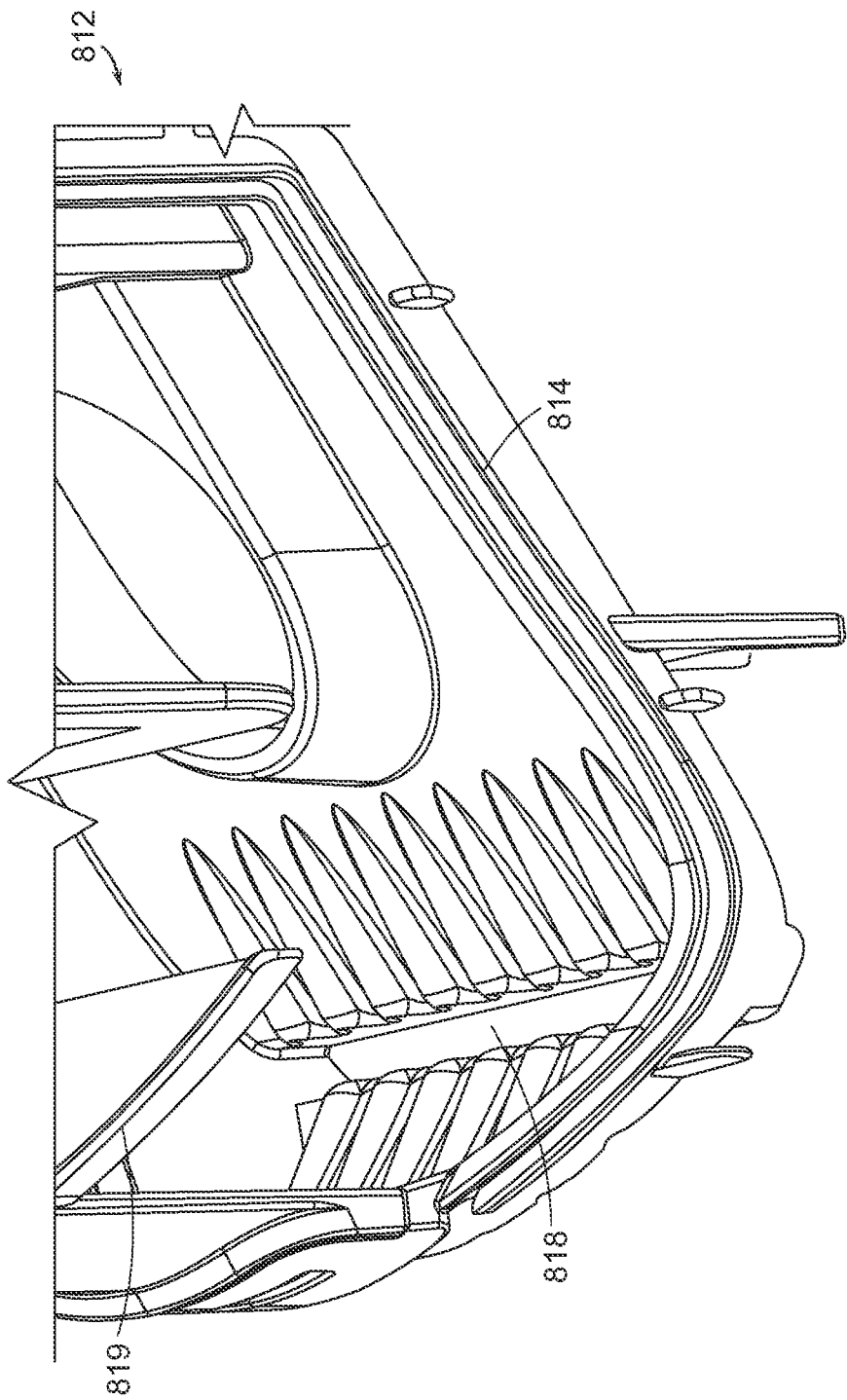

WET DRY APPLIANCE

CROSS-REFERENCE TO RELATED APPLICATIONS

This application claims priority to U.S. Provisional Patent Application No. 63/285,867 filed on Dec. 3, 2021 and entitled "EXTRACTION CLEANER," the entire contents of which are hereby expressly incorporated by reference herein.

FIELD

A cleaning device operable in wet and dry modes is provided.

BACKGROUND

Conventional cleaning devices, such as dry vacuums and wet vacuums, perform cleaning operations using suction to take in debris and waste. Dry vacuums operate through the use of suction and may employ a brushroll or agitator to assist in freeing the debris and waste from a surface. Wet vacuums operate through the use of suction and a brushroll or pad, but they also supply fluid to the to-be-cleaned surface in order to assist in removal of debris and waste. The supply of fluid can occur directly, wherein fluid is sprayed onto a surface, or indirectly, wherein fluid is sprayed onto an applicator such as a brushroll. When fluid is sprayed onto a brushroll, application of the fluid can be uneven, resulting in inconsistent cleaning of the surface.

When fluid is applied to the surface, the fluid will, incidentally, mix with the debris and waste, and the resulting slurry is drawn into the device using suction. Once inside the cleaning device, the fluid may need to be separated from the debris in order to ease in disposal. Disposal may require total removal of a fluid recovery tank, as well as disassembly of the tank.

Accordingly, there remains a need to provide a better fluid application method to improve consistent fluid application, as well as to enable ease of waste disposal after being drawn into a vacuum cleaning device.

SUMMARY

A cleaning device operable in dry and wet cleaning modes is provided. Related apparatuses and techniques are also provided.

In one embodiment, a cleaning device is provided having a housing body with an upright handle assembly and a head assembly coupled thereto. A fluid recovery tank can be removably coupled to the housing body, and it can include a container having an opening in a top portion thereof extending into an inner chamber configured to hold a liquid therein. The inner chamber can have an inlet formed in a bottom wall and configured to receive fluid from the head assembly. The fluid recovery tank can also include a separator removably disposed within the opening in the container and configured to separate solid debris from fluid drawn into the inner chamber. The fluid recovery tank can also include a lid removably coupled to the separator. The lid can have an outlet fluidly coupled to the suction source such that a suction force can be applied through the outlet, the chamber, and the inlet to the head assembly to draw fluid and debris into the inner chamber. The fluid recovery tank can further include a pour spout formed in the separator and having an opening formed there through and in fluid communication with the inner chamber, wherein the separator is configured to allow fluid to be poured from the pour spout while retaining solid debris in the inner chamber.

One or more of the following features can be included in any feasible combination. For example, the separator can include a lower surface that is spaced from the lid and from the bottom wall of the container. The lower surface of the separator can have an opening formed therein to allow fluid to pass therethrough while substantially preventing solid debris from passing therethrough. In certain embodiments, the lower surface of the separator can be substantially V-shaped with opposed walls oriented at an angle relative to one another and mated along a lower-most end thereof. The opening can be formed between the walls at the lower-most end.

In another example, the separator can include a sidewall having a channel formed therein and aligned with the pour spout to allow fluid to flow from the container out the pour spout.

In another example, the lid can include a removable filter disposed across the outlet. In certain aspects, the removable filter can include a first filter material having a first porosity and a second filter material having a second porosity that is different than the first porosity.

In another example, the cleaning device can include a latch on the container and configured to engage the housing body to retain the fluid recovery tank on the housing body. In certain aspects, the latch can be positioned on a first side of the container and the pour spout can be positioned on a second side of the container opposite the first side.

In another example, the inlet in the bottom wall can include a hollow standpipe extending from the bottom wall toward the lid and having an inner lumen there through for receiving fluid and debris from the head assembly. In certain aspects, the hollow standpipe can extend through an opening in the separator to deliver fluid and debris into the separator.

In another example, the separator can include at least one deflector configured to direct fluid away from the lid. In certain aspects, the at least one deflector can be located proximate to the inlet. In further aspects, the at least one deflector can include a first deflector located proximate the inlet and a second deflector located below the inlet.

In another embodiment, a fluid recovery tank for use on a cleaning device is provided. The fluid recovery tank can include a container having a bottom wall and sidewalls defining an inner chamber therein. The top of the container can be open, and the bottom wall can include a fluid inlet therein. The cleaning device can include a separator removably disposed within the open top of the container and extending into the chamber. A removable lid can be disposed in the separator. The separator can have a pour spout formed therein. The separator can separate the chamber into an upper portion and a lower portion. The separator can be configured to retain solid debris within the upper portion while allowing liquid in the bottom portion to be poured out of the pour spout.

One or more of the following features can be included in any feasible combination. For example, the separator can include a lower surface that is spaced from the lid and from the bottom wall of the container. The lower surface of the separator can have an opening formed therein to allow fluid to pass there through while substantially preventing solid debris from passing there through.

In another example, the separator can include a sidewall having a channel formed therein and aligned with the pour spout to allow fluid to flow from the container out the pour spout.

In another example, the lid can include a removable filter disposed therein and configured to allow a suction force to be applied there through. In other aspects, the removable filter can include a first filter material having a first porosity and a second filter material having a second porosity that is different than the first porosity.

In another example, the fluid recovery device can include a spring-biased latch movably mounted on an exterior surface of the container. In other aspects, the latch can be positioned on a first side of the container and the pour spout is positioned on a second side of the container opposite the first side.

In another example, the inlet in the bottom wall can include a hollow standpipe extending from the bottom wall toward the lid and having an inner lumen there through for receiving fluid and debris from the head assembly. The hollow standpipe can extend through an opening in the separator.

In another example, the pour spout can be configured to be in an open position when the lid is in an open position and a closed position.

In another example, the separator can include a seal configured to frictionally engage the container to create a water-tight seal therewith.

In another example, the separator can include at least one deflector configured to direct fluid away from the lid. In certain aspects, the at least one deflector can be located proximate to the fluid inlet. In further aspects, the at least one deflector can include a first deflector located proximate the inlet and a second deflector located below the fluid inlet.

In another embodiment, a cleaning device is provided and can include a head assembly containing a brushroll and a housing body coupled to the head assembly and having an upright handle extending therefrom. The housing body can include a suction source in fluid communication with the head assembly, a fluid supply assembly configured to retain fluid and to deliver fluid to the head assembly, and a fluid recovery tank configured to receive fluid from the head assembly using the suction source. The head assembly can include at least one spray nozzle in fluid communication with the fluid supply assembly and configured to emit fluid onto a first portion of the brushroll. The head assembly can further include at least one deflector disposed therein and configured to redirect fluid emitted by the at least one spray nozzle onto a second portion of the brushroll.

One or more of the following features can be included in any feasible combination. For example, the at least one spray nozzle can include a left spray nozzle disposed on the left side of the head assembly and a right spray nozzle disposed on the right side of the head assembly. In other aspects, the at least one deflector includes a left deflector configured to redirect fluid emitted by the left spray nozzle and a right deflector configured to redirect fluid emitted by the right spray nozzle. In other aspects, the second portion of the brushroll can include a left end portion of the brushroll and a right end portion of the brushroll. The first portion of the brushroll can be a mid-position located between the left end portion and the right end portion. In still further aspects, the left spray nozzle and the right spray nozzle can be longitudinally aligned with one another.

In another embodiment, the at least one deflector can be curved toward the at least one spray nozzle.

In another embodiment, the at least one spray nozzle is configured to spray fluid in a substantially planar orientation. In other aspects, the at least one nozzle is configured to spray fluid in a fan pattern at a spray angle between about 10 and 60 degrees. In another example, the at least one spray nozzle is configured to spray fluid in a flat fan pattern along a plane substantially tangential to the brushroll.

In another embodiment, a cleaning device is provided and can include a base housing having a brushroll chamber with a brushroll disposed therein, and a suction outlet disposed therein and in fluid communication with the brushroll chamber. The cleaning device can include at least one fluid delivery spray nozzle disposed in the brushroll chamber and configured to emit fluid onto a first portion of the brushroll. The cleaning device can include at least one deflector disposed in the brushroll chamber and configured to redirect fluid emitted by the fluid assembly onto a second portion of the brushroll.

One or more of the following features can be included in any feasible combination. For example, the cleaning device can include a fluid recovery tank in fluid communication with the suction inlet and configured to receive fluid and debris from the suction inlet.

In another example, the at least one fluid delivery spray nozzle can include first and second fluid delivery spray nozzles positioned on opposite ends of the brushroll and configured to delivery fluid along a length of the brushroll. The at least one deflector can be positioned within the brushroll chamber between the first and second fluid delivery spray nozzles. In certain embodiments, the at least one deflector can include a first deflector positioned adjacent to the first fluid delivery spray nozzle for deflecting fluid sprayed from the first fluid delivery nozzle, and a second deflector positioned adjacent the second fluid delivery spray nozzle for deflecting fluid sprayed from the second fluid delivery spray nozzle.

In another embodiment, the at least one deflector can include an elongate projection formed on an inner surface of the brushroll chamber and positioned within a flow path of fluid delivered by the at least one fluid delivery nozzle.

In other aspects, the first portion of the brushroll can include a mid-portion of the brushroll and the second portion of the brushroll comprises first and second end portions of the brushroll.

In another example, the at least one deflector can be molded into a housing at least partially defining the brushroll chamber.

In another example, the at least one deflector can be positioned on an inner surface of the brushroll chamber above an opening within the brushroll chamber defining the suction inlet.

In another example, the at least one nozzle can be configured to spray fluid in a substantially planar fan-shaped pattern.

In another example, the at least one nozzle can include a first nozzle disposed in a right side of the brushroll chamber and a second nozzle disposed in the left side of the brushroll chamber. The at least one deflector can be a first pair of deflectors configured to redirect fluid emitted by the first nozzle and a second pair of deflectors configured to redirect fluid emitted by the second nozzle.

In another embodiment, a fluid recovery tank for use on a cleaning device is provided. The fluid recovery tank can include a container having a bottom wall and sidewalls defining an inner chamber therein, a top of the container being open, the bottom wall including a fluid inlet therein, and the container having a longitudinal axis extending from the top to the bottom wall. The fluid recovery tank can include a latch movably coupled to an outer sidewall of the container and configured to move along an axis substantially parallel to the longitudinal axis of the chamber. The latch can include an engagement feature configured to engage a portion of a cleaning device to mate the container to a cleaning device. The fluid recovery tank can include a a separator removably disposed within the open top of the container and extending into the chamber, the separator being configured to separate solid debris from fluid within the inner chamber.

One or more of the following features can be included in any feasible combination. For example, the latch can be movably disposed within a housing formed on the outer sidewall of the container. The latch can extend above an upper surface of the container. In certain embodiments, the latch can be spring-biased to a locking position. In another example, the latch can be disposed entirely outside the container.

In another embodiment, the separator can have a bottom wall that is spaced from the bottom wall of the container. The bottom wall of the separator can have an opening formed therein to allow fluid to pass there through while substantially preventing solid debris from passing there through such that solid debris is retained within the separator.

In another example, the fluid recovery tank can include a lid removably disposed within an opening formed in a top of the separator. In other aspects, the lid can include a filtration device.

In another embodiment, a fluid recovery tank for use on a cleaning device is provided. The fluid recovery tank can include a container defining an inner chamber therein. The container can have a suction outlet configured to couple to a suction source for allowing a suction force to be applied to the inner chamber. The container can also have a fluid inlet for allowing fluid to be drawn into the chamber by the suction force. The fluid recovery tank can include a separator removably disposed within the container and having an opening formed therein and configured to allow fluid to pass there through while substantially preventing solid debris from passing there through such that solid debris is retained within the separator. The fluid recovery tank can include a button movably disposed on an exterior of the container and configured to move between a locked configuration in which the button is configured to engage a cleaning device to retain the container on the cleaning device, and an unlocked configuration in which the button is configured to disengage from a cleaning device to allow the container to be removed from the cleaning device.

One or more of the following features can be included in any feasible combination. For example, a top of the button can be substantially parallel to a top of the container when the button is in the locked configuration and the unlocked configuration. The button can be biased to the locked configuration.

In another embodiment, a top of the button can extend above the top of the container when the button is in the locked configuration, and the top of the button can extend above the top of the container when the button is in the unlocked configuration.

In other aspects, the button can be disposed within a housing formed on an external surface of the container. The housing can include a biasing element disposed therein and can bias the button to the locked configuration. The button can include a protrusion configured to be received by a complementary depression on a cleaning device. In other aspects, the button can be curved to align with a contour of the cleaning device.

In another embodiment, the fluid recovery tank can include a lid removably disposed within an opening in the separator, the lid defining the suction outlet. The lid can include at least one filter disposed therein and extending across the suction outlet. The at least one filter can include a first filter material having a first porosity and a second filter material having a second porosity greater than the first porosity.

In another example, the fluid inlet can include a hollow standpipe extending into the inner chamber.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which:

FIG. 6A is a front perspective view of a body assembly of the cleaning device of FIG. 1A;

FIG. 6B is a right side view of the body assembly of FIG. 6A;

FIG. 9A is a front perspective view of a motor assembly of the cleaning device of FIG. 1A;

FIG. 9B is a right side view of the motor assembly of FIG. 9A;

FIG. 10E is a front perspective view of a separator of the fluid recovery tank of FIG. 10A;

FIG. 10F is a rear side perspective view of the separator of FIG. 10E;

FIG. 10G is a bottom view of the separator of FIG. 10E;

FIG. 10H is a partial cross-sectional view of the separator of FIG. 10E;

FIG. 11B is a partial left perspective view of a separator of the fluid recovery tank of FIG. 11A;

FIG. 11C is a partial front view of the separator of FIG. 11B;

FIG. 11D is a front perspective view of the fluid recovery tank of FIG. 11A, having been installed in a body assembly of a cleaning device;

FIG. 17C is another partial perspective view of the separator of FIG. 17B;

Figure 1A:
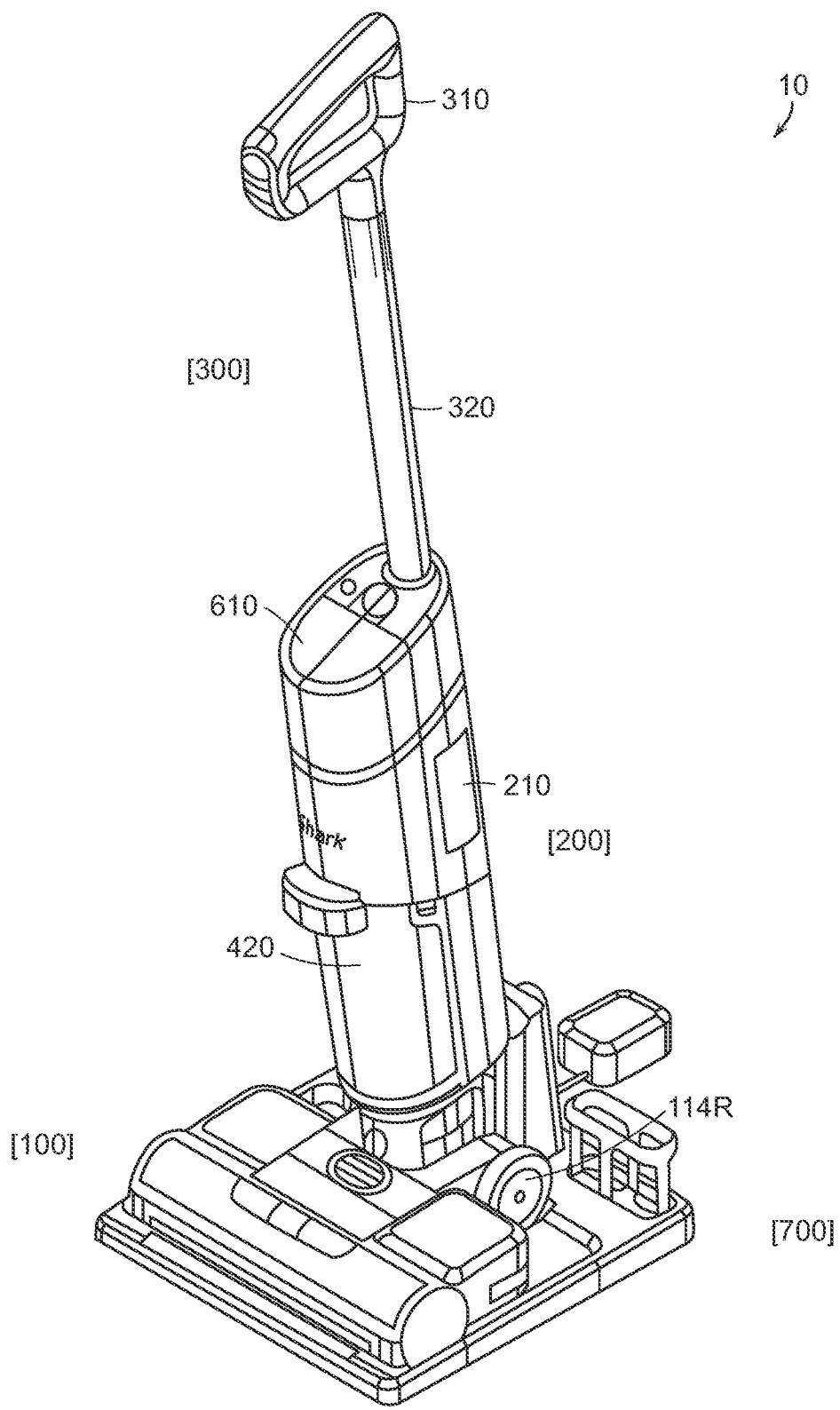
FIG. 1A is a front perspective view of one embodiment of a cleaning device.
Figure 1B:
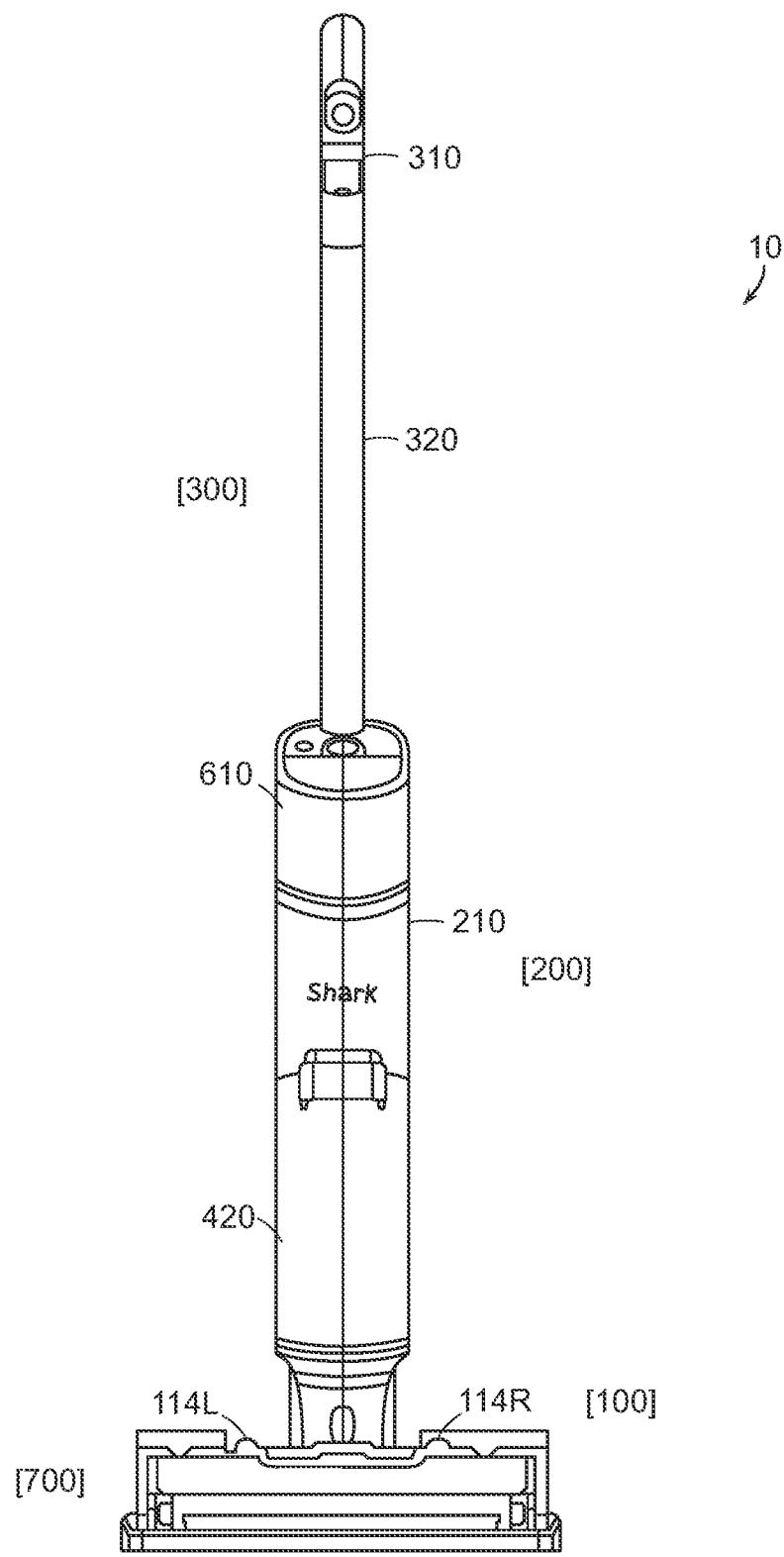
FIG. 1B is a front view of the cleaning device of FIG. 1A.
Figure 1C:
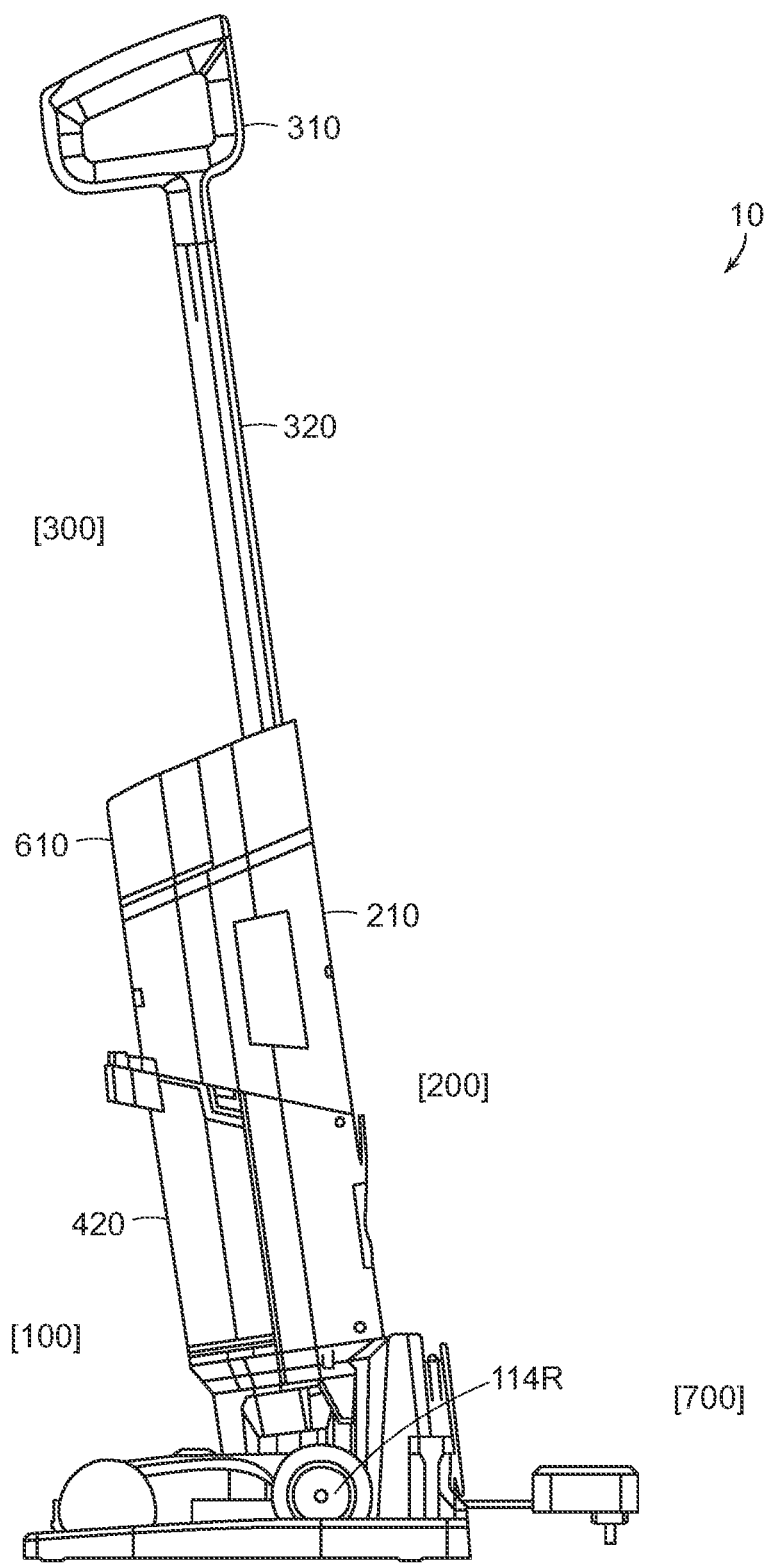
FIG. 1C is a right side view of the cleaning device of FIG. 1A.
Figure 1D:
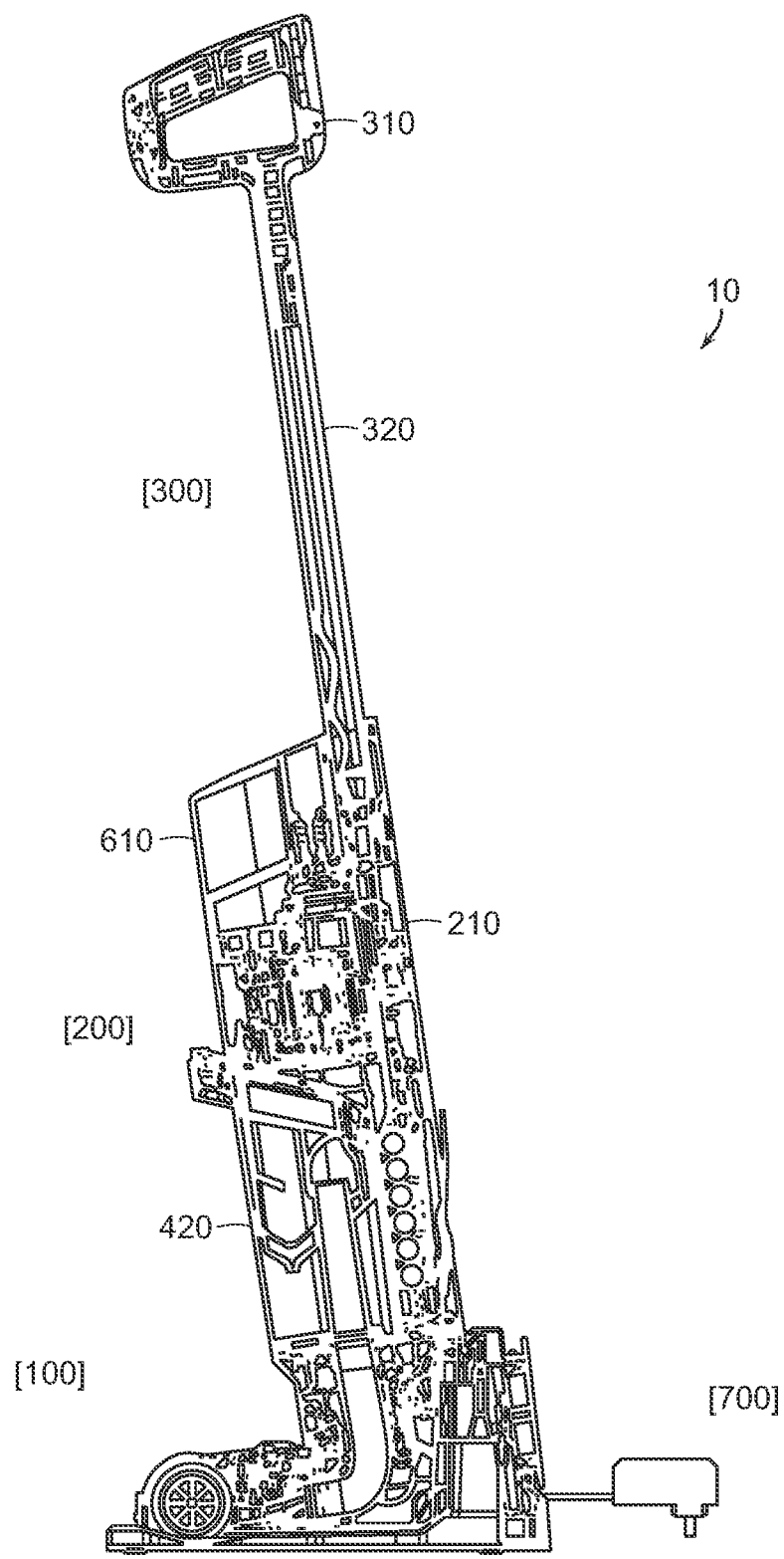
FIG. 1D is cross-sectional right side view of the cleaning device of FIG. 1A.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

A cleaning device is provided that includes fluid delivery and recovery systems that can be operated in combination with, or in place of, traditional vacuum modes in order to improve cleaning capabilities of the device. In certain exemplary embodiments, the cleaning device includes features to aid in fluid delivery in a more uniform manner to improve cleaning, as well as to aid in the recovery and disposal of fluid and debris (waste). For example, the cleaning device can include features located within the cleaning heading assembly that evenly distribute fluid onto a brushroll, thus allowing fluid to be evenly applied to a surface to be cleaned. The cleaning device can also include fluid recovery tank for collecting waste from the surface to be cleaned, and it can include features to aid in separating the debris from the fluid, as well as features to facilitate disposal of the waste. For example, the fluid recovery tank can include a pour spout to facilitate disposable of fluid, while retaining debris within the tank. The fluid recovery tank can also include a unique latch mechanism that aids in removal of the fluid recovery tank from the device without interfering with suction delivery to the tank and waste collection within the tank.

With reference now to FIGS. 1A-1D, an exemplary embodiment of a cleaning device 10 is shown. The illustrated cleaning device 10 generally includes a head assembly 100, a body assembly 200, a handle assembly 300, and a vacuum assembly 400 (not shown). The cleaning device is shown disposed atop a charging mat 700, which will be discussed below. As will be explained in detail below, the device 10 also includes fluid delivery and fluid recovery assemblies. In the illustrated embodiment, the handle assembly 300 includes a handle 310 and a stem 320, and the body assembly 200 includes a body housing 210 coupled to the stem 320. The head assembly 100 can be coupled to the body housing 210 opposite the stem 320. The head assembly 100 can include a head housing 110, and small wheels 112L, 112R (not shown) rotatably and large wheels 114L, 114R rotatably coupled to the head housing 110 and configured to allow the cleaning device 10 to roll along a surface, and a brushroll, not shown in FIGS. 1A-1D, disposed in the head assembly 100 and configured to rotate during operation of the cleaning device 10.

The vacuum assembly 400 (not shown), is disposed within the head and body assemblies 100, 200 and is capable of taking in fluid, dirt, debris, and other waste through suction and storing it within the cleaning device 10. In certain embodiments, the vacuum assembly 400 can include a motor and a motor fan, as will be discussed in more detail below. The motor and motor fan can be entirely contained in a motor housing disposed within the body assembly 200. As will be discussed in more detail below, hosing (not shown) can be coupled to the motor fan and it can be disposed to run through the body assembly 200 to the head assembly 100 to allow the motor to generate a suction force to draw waste into the device 10. Waste taken in by the vacuum assembly 400 through the hosing (not shown) can be deposited into a recovery tank removably disposed within the body assembly, as will also be discussed in more detail below.

The cleaning device 10 can further include a fluid supply tank 610 capable of supplying fluid to an area to be cleaned in order to aid in a cleaning process. The fluid can be mixed with dirt and debris, and the waste can be drawn back into the cleaning device 10 with suction generated by the motor and deposited in the recovery tank 420.

Figure 2A:
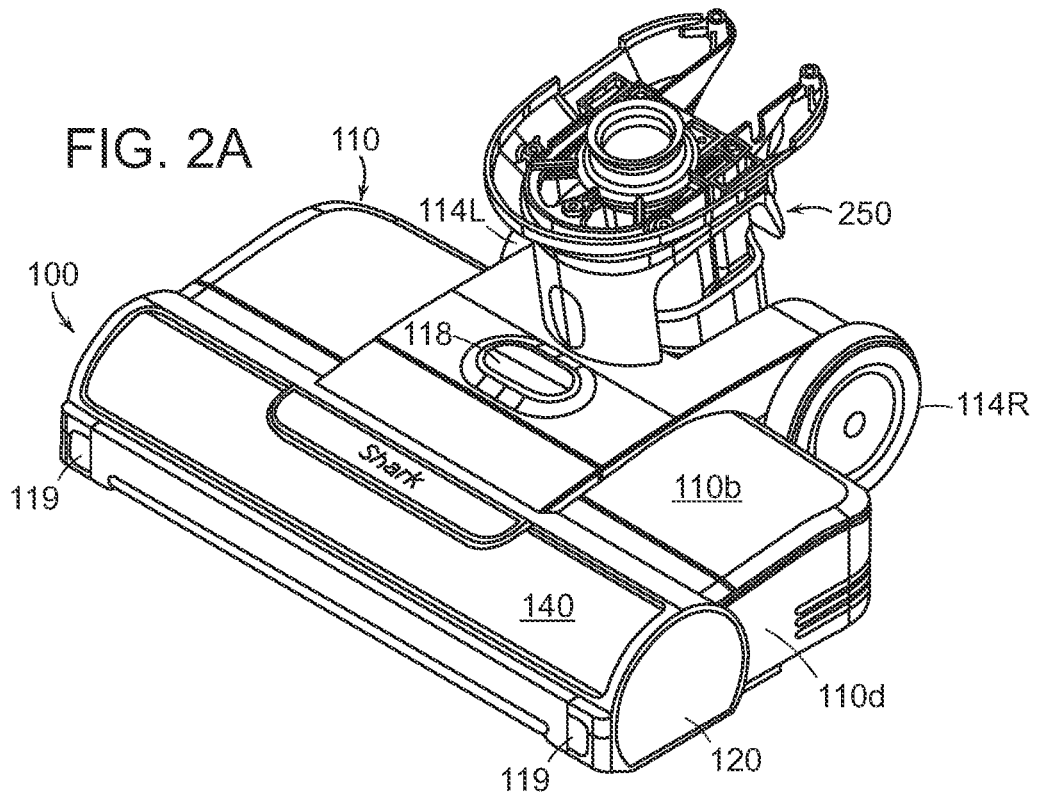
FIG. 2A is a front perspective view of a head assembly of the cleaning device of FIG. 1A.
Figure 2B:
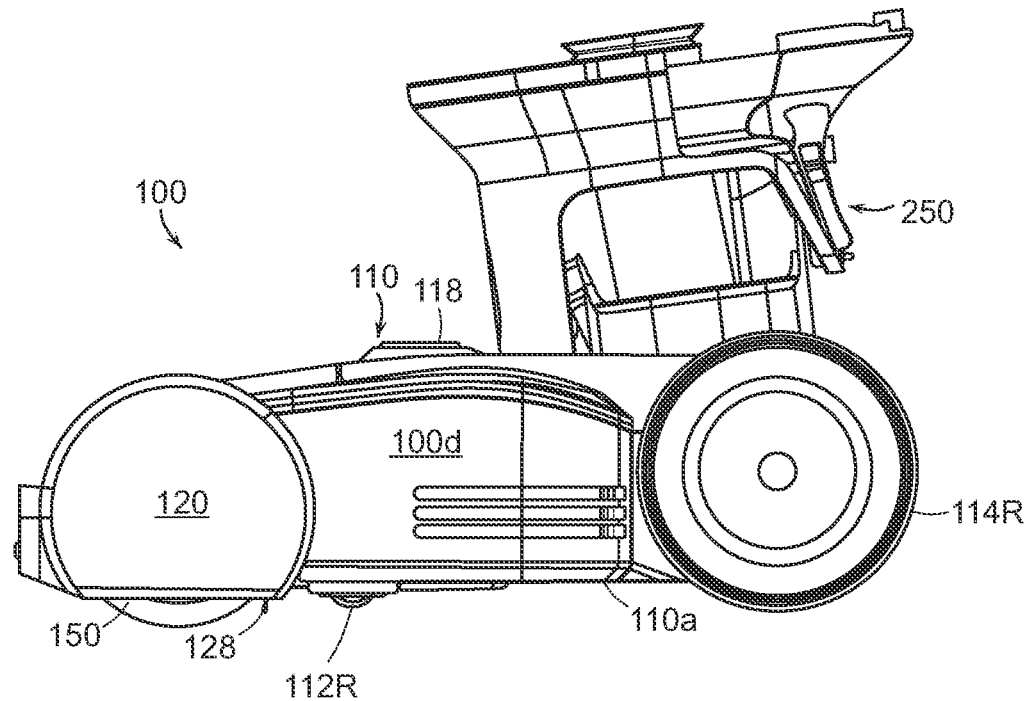
FIG. 2B is a right side view of the head assembly of FIG. 2A.
Figure 2C:
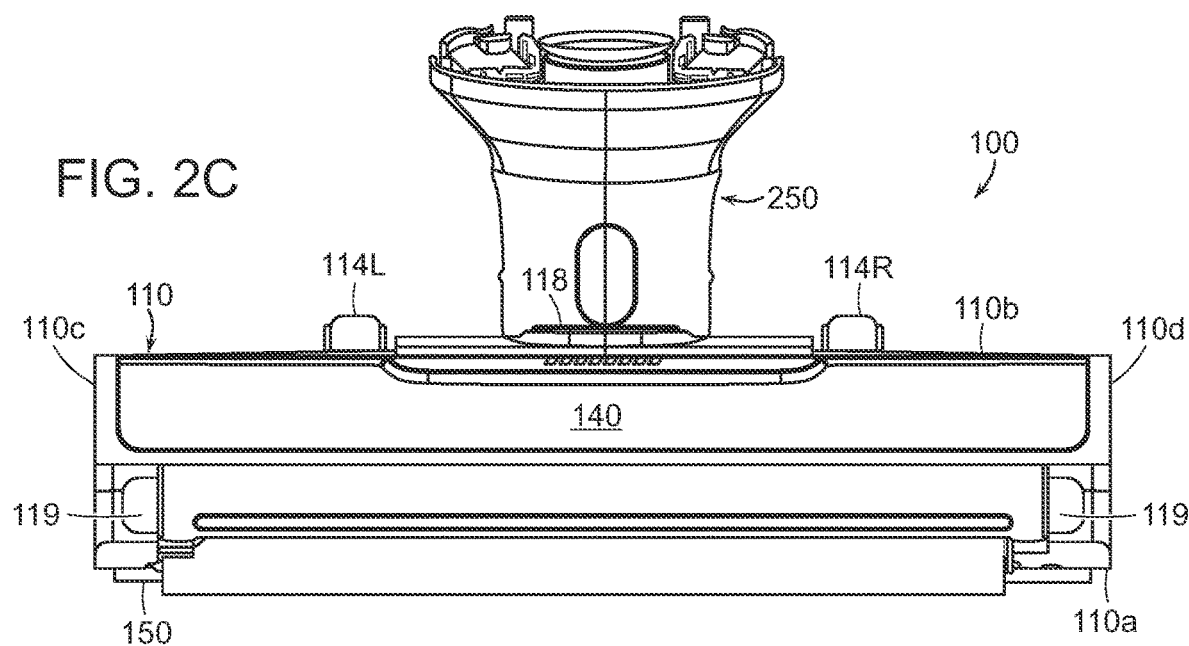
FIG. 2C is a front view of the head assembly of FIG. 2A.
Figure 2D:
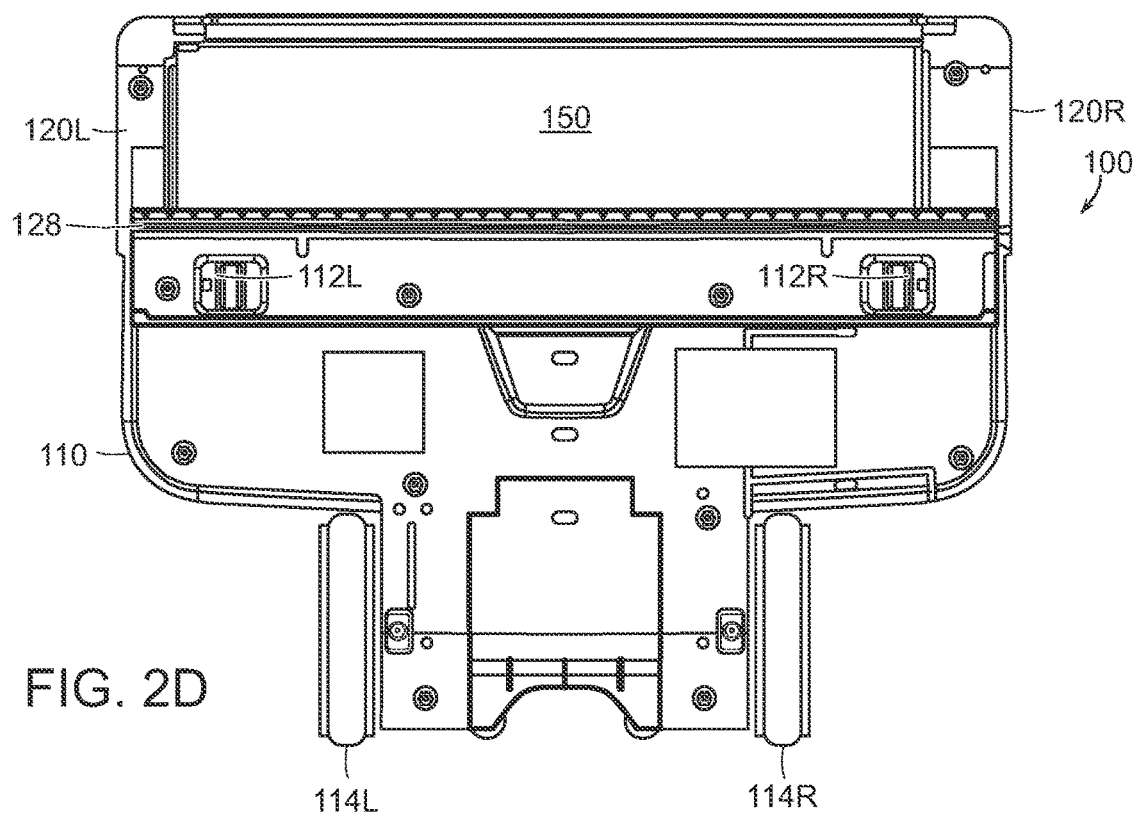
FIG. 2D is a bottom view of the head assembly of FIG. 2A.
Figure 2E:
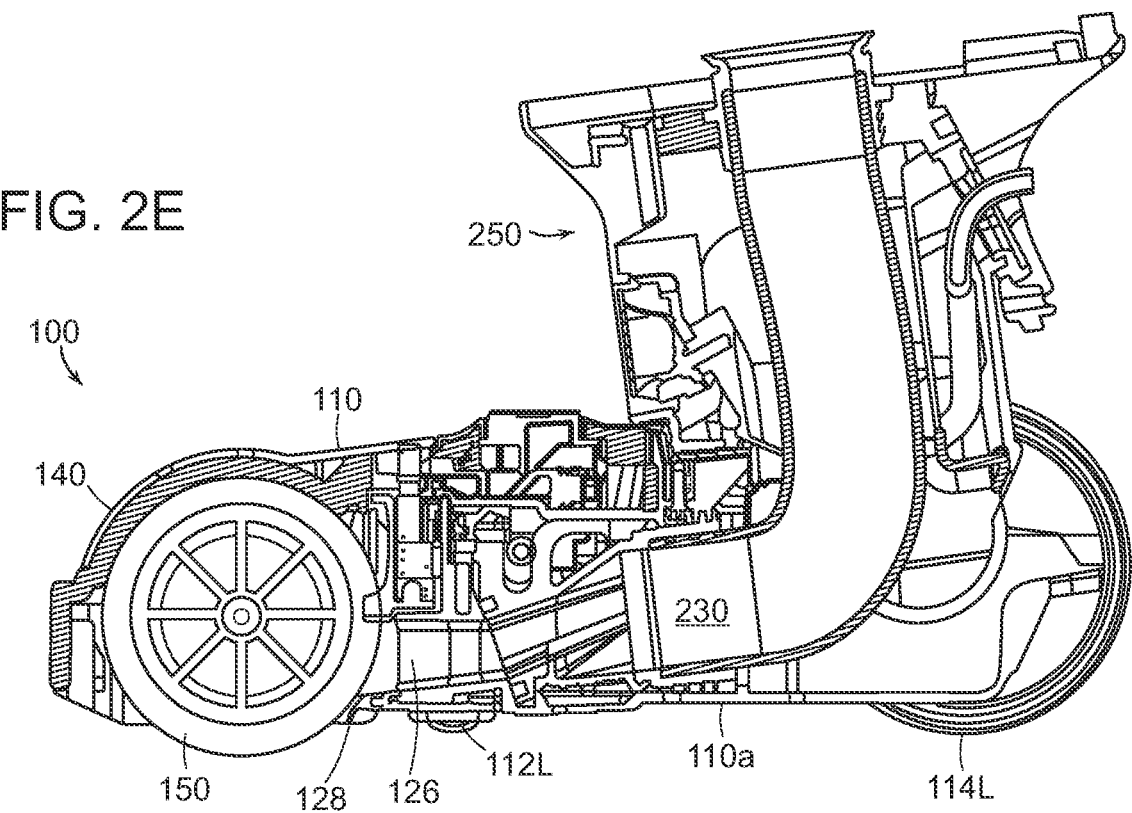
FIG. 2E is a cross-sectional side view of the head assembly of FIG. 2A.
Figure 2F:
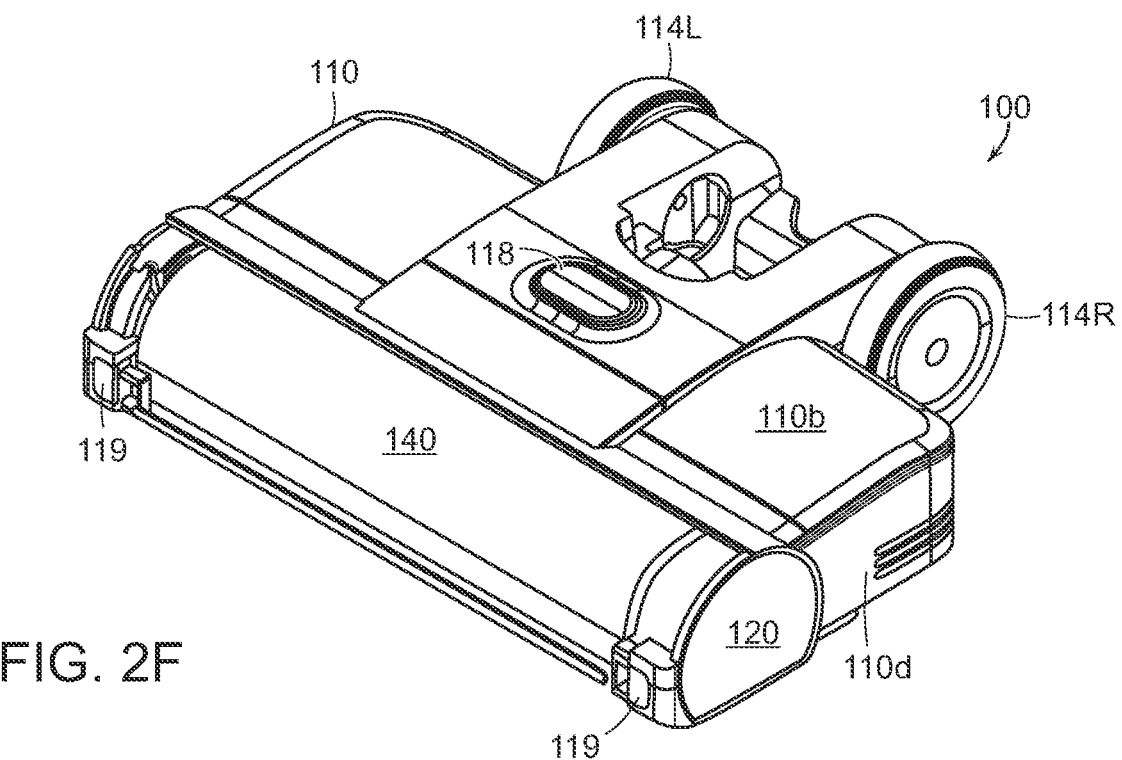
FIG. 2F is a front perspective view of the head assembly of FIG. 2A, having a linking assembly removed.
Figure 2G:
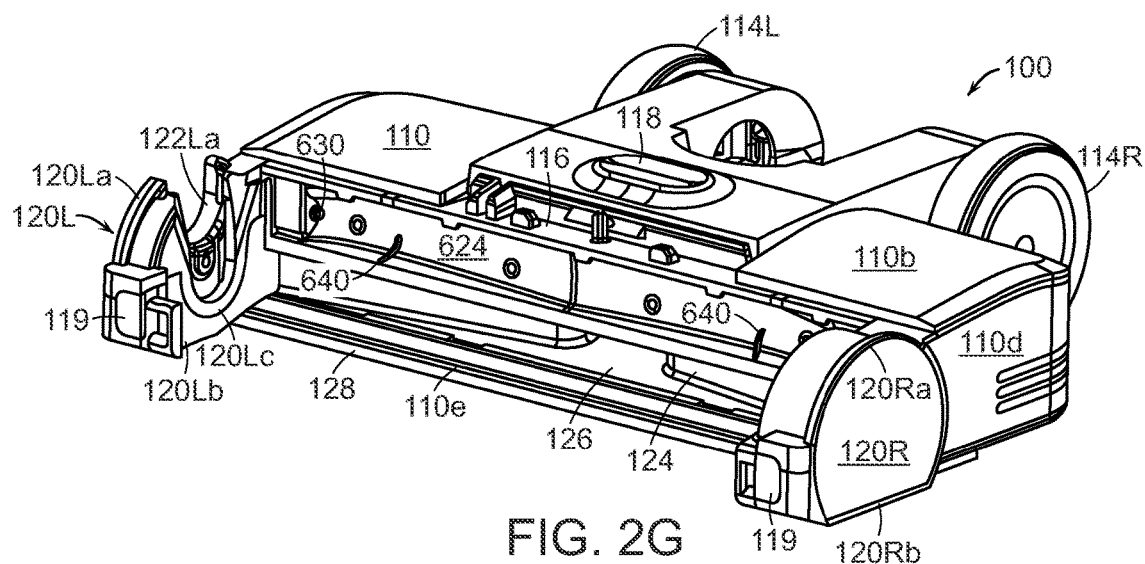
FIG. 2G is a front perspective view of the head assembly of FIG. 2F, having a brushroll removed and showing a right support structure.
Figure 2H:
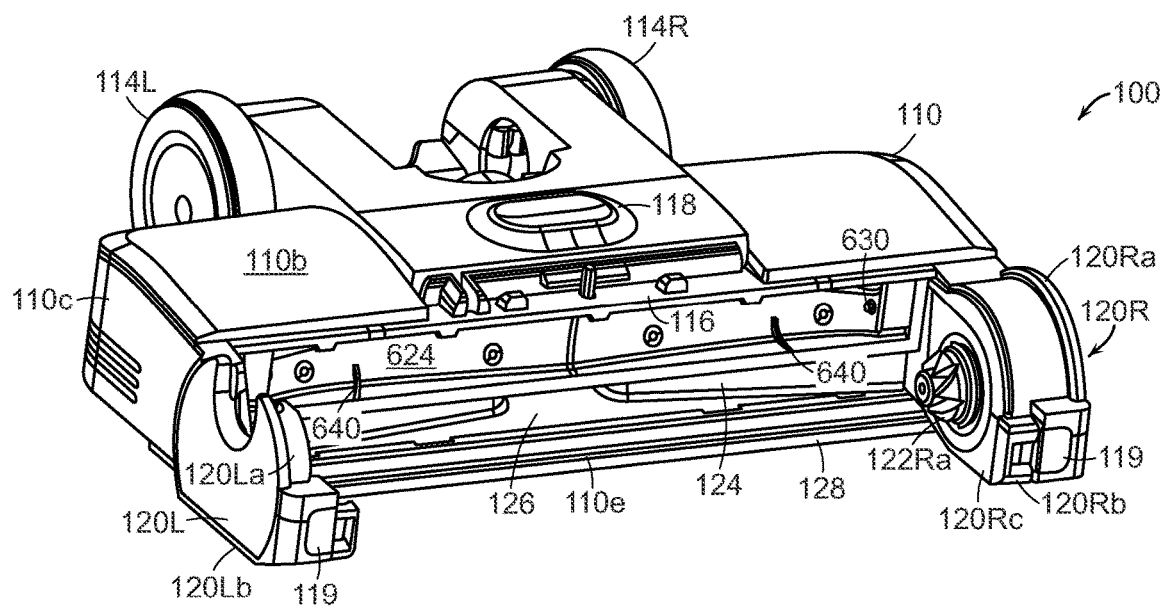
FIG. 2H is a front perspective view of the head assembly of FIG. 2F, having a brushroll removed and showing a left support structure.

FIGS. 2A-2H depict the head assembly 100 in more detail. More specifically, FIGS. 2A-2E depict the head assembly 100 including an articulator 250, to be described in more detail below, and FIGS. 2F-2H depict the head assembly 100 without the articulator 250. As shown, the head assembly 100 includes a head housing 110, which is substantially T-shaped when viewed from the bottom as shown in FIG. 2D. The head assembly 100 can include wheels disposed on the head housing 110, which aid in movement of the cleaning device 10. In the illustrated embodiment, a set of left and right small wheels 112L, 112R is disposed on the bottom side 110a of the head housing 110 beneath left and right portions respectively, and a set of left and right large wheels 114L, 114R is disposed on left and right rear sides of the head housing 110, respectively. Both the small wheels 112L, 112R and the large wheels 114L, 114R rotate to allow the cleaning device 10 to be maneuvered on surfaces.

FIG. 2E shows a cross-section of the head assembly 100 with hosing 230 extending from the front of the head assembly and up through the articulator. The hosing 230 will be discussed in more detail below, with respect to the vacuum assembly and the dry and wet cleaning operations.

FIGS. 2G and 2H show the head assembly 100 with a brushroll cover 140 and a brushroll 150 removed, thereby providing a more-detailed view of the inner form of the head housing 110. On an upper portion of the front side 110d of the head housing 110 is a cover support 116, which can removably receive a brushroll cover 140. Rearward of the cover support 116, located on the top side 110b of the head housing 110, is a cover button 118, which can be actuated to release the brush cover 140 mounted to the head housing 110 to enable removal of the brush cover 140. Extending from the front side 110e of the head housing 110, especially as seen in FIGS. 2G and 2H, are the brushroll supports 120L, 120R, which are capable of holding a brushroll 150 for use during cleaning operations. The left and right brushroll supports 120L, 120R extend from the front side 120e of the head housing 110. The left and right supports 120L, 120R each have a rounded top edge 120La, 120Ra and a substantially flat bottom edge 120Lb, 120Rb. Brushroll support structures 122L, 122R are located on interior faces 120Lc, 120Rc of both the left and right supports 120L, 120R. The left support structure 122L, seen in FIG. 2G, includes a rounded cutout portion 122La capable of receiving a complimentary structure on the brushroll 150, and the right support structure 120R includes a rotatably coupled extension 122Ra having a geometric interface capable of meshing with a corresponding geometric indentation of the brushroll 150.

The head assembly can further include light sources 119 disposed on the front of the left and right support structures 120L, 120R, which can act to illuminate a surface to be cleaned in order to aid in a cleaning process. The light sources 119 can be any kind of light source known, including a light-emitting diode, and the like.

Also depicted in FIGS. 2G and 2H, a fluid application face 624 is located on the front side 110e of the head housing 110. The fluid application face 624 has a generally hemi-cylindrical, concave shape so that, when a brushroll 150 is installed between the left and right supports 120L, 120R, the fluid application face 624 at least partially surrounds the outer face of the brushroll 150. The fluid application face 624 occupies a top half of the front side 110e of the head housing 110. One or more spray nozzles 630 and deflectors 640 can be disposed on the fluid application face 624. The spray nozzles 630 and deflectors 640 will be discussed in more detail below with respect to FIGS. 13A-14C.

Beneath the fluid application face 624 and occupying a lower half of the front side 110e of the head housing 110 is an intake face 124. The intake face includes a recessed façade leading to a central intake 126 therein. The left and right sides 124L, 124R of the intake face 124 can angle inward and lead to the central intake 126 itself. The central intake 126 forms a suction inlet that generally allows for dirt, debris, and waste to be taken into the cleaning device 10, as will be discussed in more detail below.

At the lower edge of the front side 110e of the head housing 110 below the intake face 124 is a flexible guide 128. The flexible guide 128 can be gradually sloped upward from the front side 110e toward the rear, and it can extend the entire width of the front side 110e between the left and right supports 120L, 120R. The flexible guide 128 is formed such that, in a neutral position, the guide 128 extends below the bottom side 110a of the head housing 110, which can be seen especially in FIGS. 2B and 2E. As a result, when the cleaning device 10 is placed upon a surface, the flexible guide 128 is biased against the surface, thereby allowing for waste to be fed toward the intake face 124 without leaving a gap for waste to avoid the cleaning device 10.

FIGS. 3A-3D shown an embodiment of a brushroll 150, which can be received between the left and right support structures 120L, 120R depicted in FIGS. 2A-H. In various cleaning operations, the brushroll 150 is configured to rotate to loosen waste deposited on a surface to be cleaned. The brushroll 150 is also able to direct waste into the cleaning device. While the configuration of the brushroll 150 can vary, in one embodiment the brushroll 150 can have a substantially elongate cylindrical shape and can include a central dowel 152 and a cleaning material 154 surrounding the dowel 152. The dowel 152 can be cylindrical, having right and left ends 152R, 152L, and it can be made of a rigid material, such as a hard plastic, metal, rubber, or a combination thereof, to provide the brushroll 150 with some support. The cleaning material 154 is attached to the outer surface of the dowel 152 along the entire length thereof and can be made of various cleaning materials, such as microfiber, bristles, or other materials known in the art, alone or in some combination. Further, the cleaning material 154 can be disposed in a variety of configurations on the outer surface of the dowel 152, and it can be formed from one or more materials which can be intermixed or separated into specific regions.

Figures 3A, 3B, 3C, 3D:
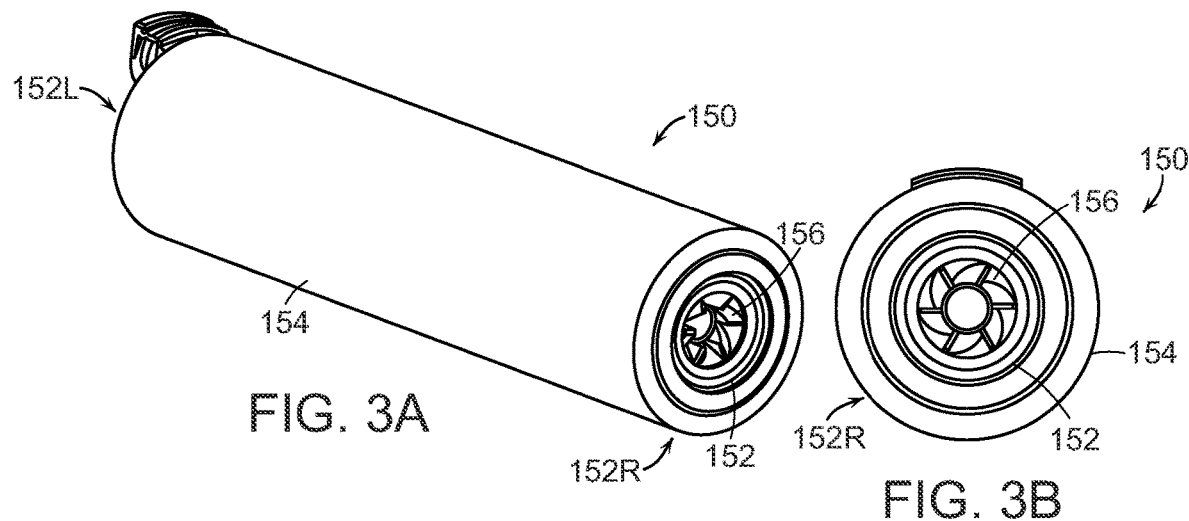
FIG. 3A is a right front perspective view of a brushroll used in the cleaning device of FIG. 1A.
FIG. 3B is a left rear perspective view of the brushroll of FIG. 3A.
FIG. 3C is a right side view of the brushroll of FIG. 3A.
FIG. 3D is a left side view of the brushroll of FIG. 3A.

As mentioned previously, the brushroll 150 includes structures which can be retained by the left and right support structures 120L, 120R of the head assembly 110. These structures can be located on or extending from the right and left ends 152R, 152L of the dowel 152. FIGS. 3A and 3B show the right end 152R of the dowel 152 in more detail. The right end 152 of the dowel 152 includes an indentation 156 having a geometric pattern that corresponds to a geometric interface of the protrusion 122Ra on the right support structure 120R. The geometric design is capable of providing a friction fit between the protrusion 122Ra and the brushroll 150, such that during a cleaning operation when the protrusion 122Ra is rotatably driven, the brushroll 150 will rotate as well. FIGS. 3C and 3D show the left end 152L of the dowel 152 in more detail. The left end 152L of the dowel 152 includes an extension piece or tab 158 rotatably coupled thereon and configured to be received within the rounded cutout portion 122La of the left support structure 120L of the head assembly 110. When not in use, the tab 158 can be grasped by a user and the brushroll 150 can be removed from the left and right support structures 120L, 120R such as for inspection and maintenance or replacement.

Figure 4A:
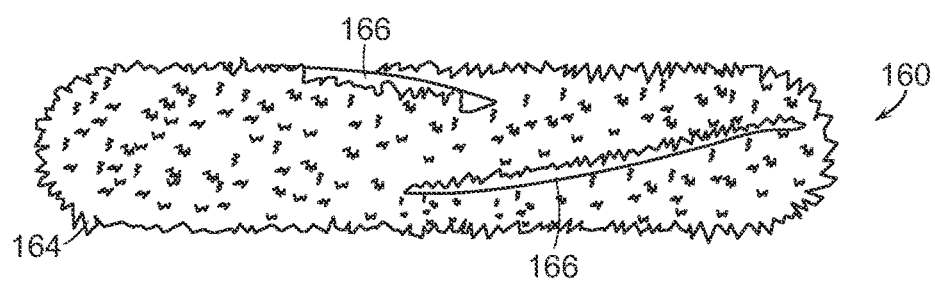
FIG. 4A is a top perspective of another embodiment of a brushroll.
Figure 4B:
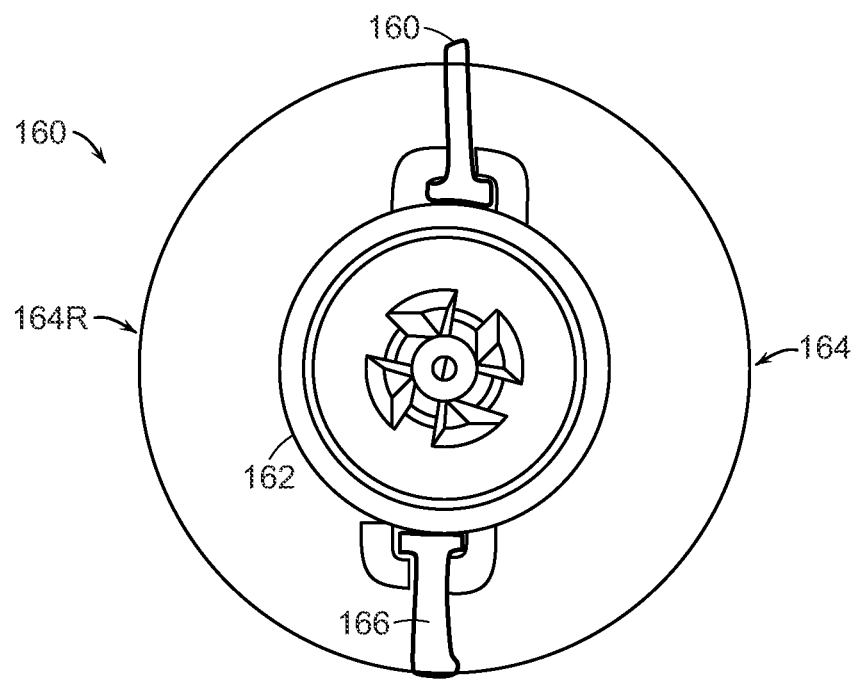
FIG. 4B is a right side view of the brushroll of FIG. 4A.
Figure 4C:
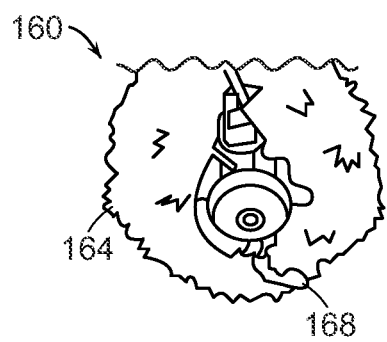
FIG. 4C is a partial left perspective view of the brushroll of FIG. 4A.

FIGS. 4A-4D depict another embodiment of a brushroll. The brushroll 160, as shown in FIG. 4A, has a similar structure to brushroll 150 depicted in FIGS. 3A-3D, and so elements with comparable structure and operation will not be described in detail. Generally, the brushroll 160 is substantially cylindrical in shape, and it includes a central dowel 162 surrounded by a cleaning material 164. The brushroll 160 also includes a helical paddle 166 secured to the central dowel 162 and winding around the dowel 162 about an outer surface thereof. The paddle 166 extends radially beyond the cleaning material 164, as can be seen in FIGS. 4A and 4B. The paddle 164 can be made of any suitable material, and may include, for example, rubber, plastic, or another similar material, and with this structure, in operation, the paddle 164 can flex and bend when impacting a cleaning surface in order to drive dirt, debris, and waste into the cleaning device 10.

Figure 4D:
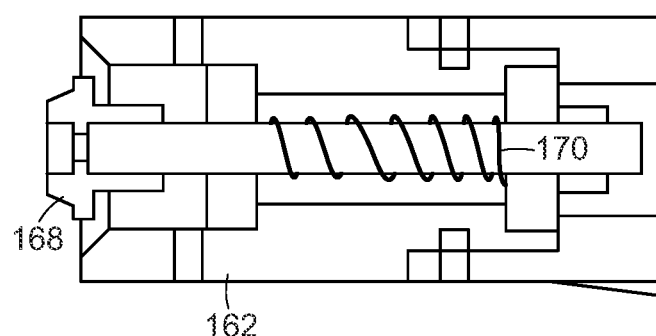
FIG. 4D is a partial cross-sectional view of the brushroll of FIG. 4A.
Figure 5A:
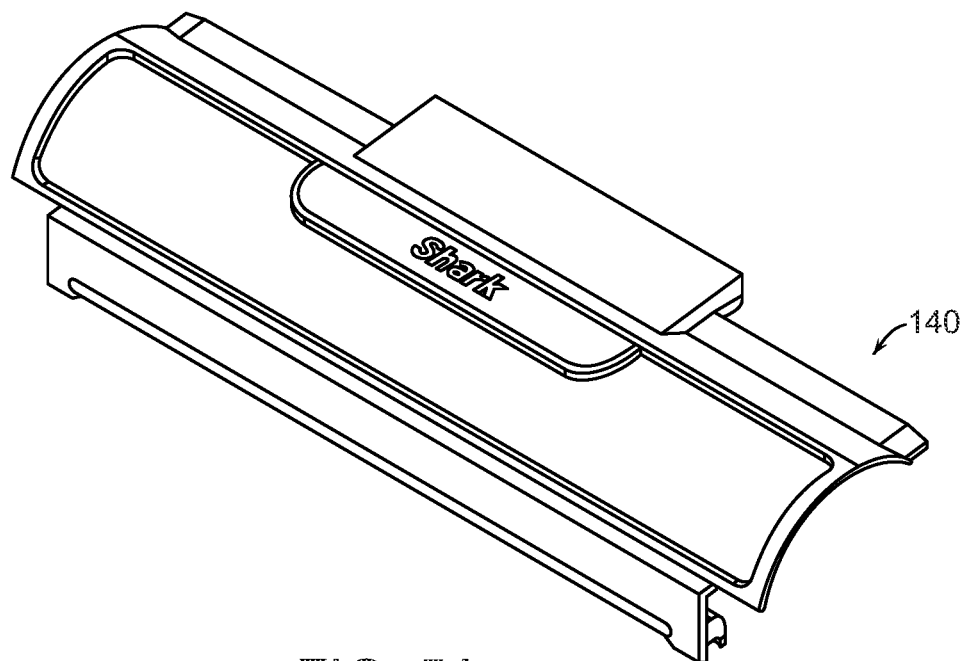
FIG. 5A is a front perspective view of a brushroll cover used with the head assembly of FIG. 2A.
Figure 5B:
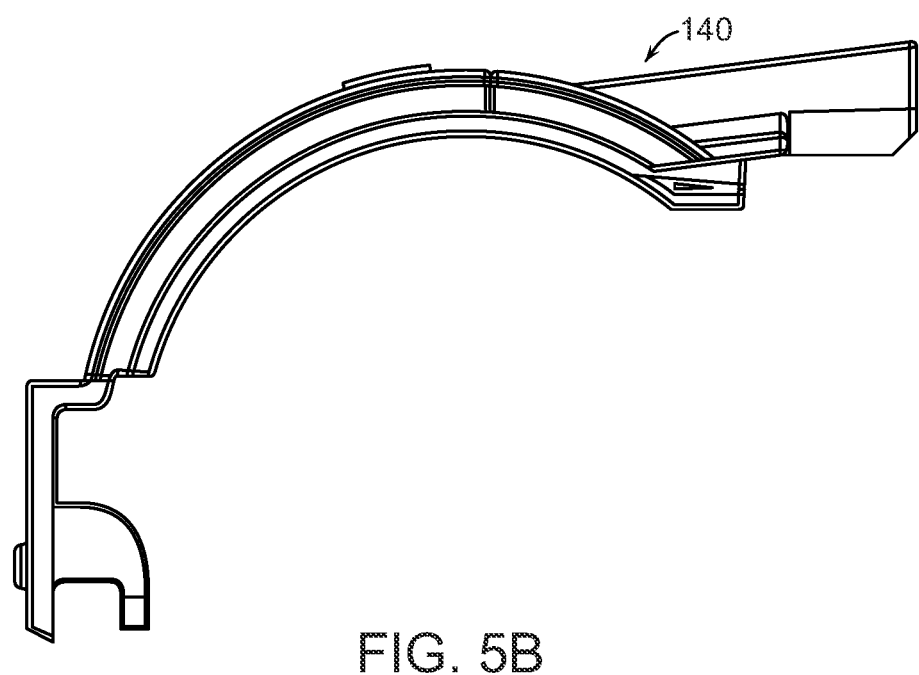
FIG. 5B is a right side view of the brushroll cover of FIG. 5A.
Figure 6D:
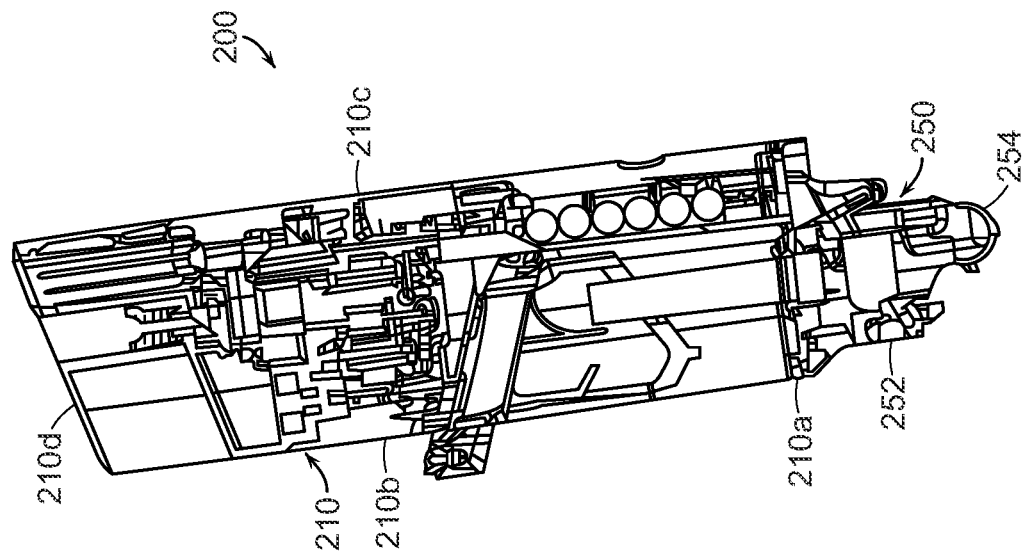
FIG. 6D is a cross-sectional side view of the body assembly of FIG. 6A.
Figure 6C:
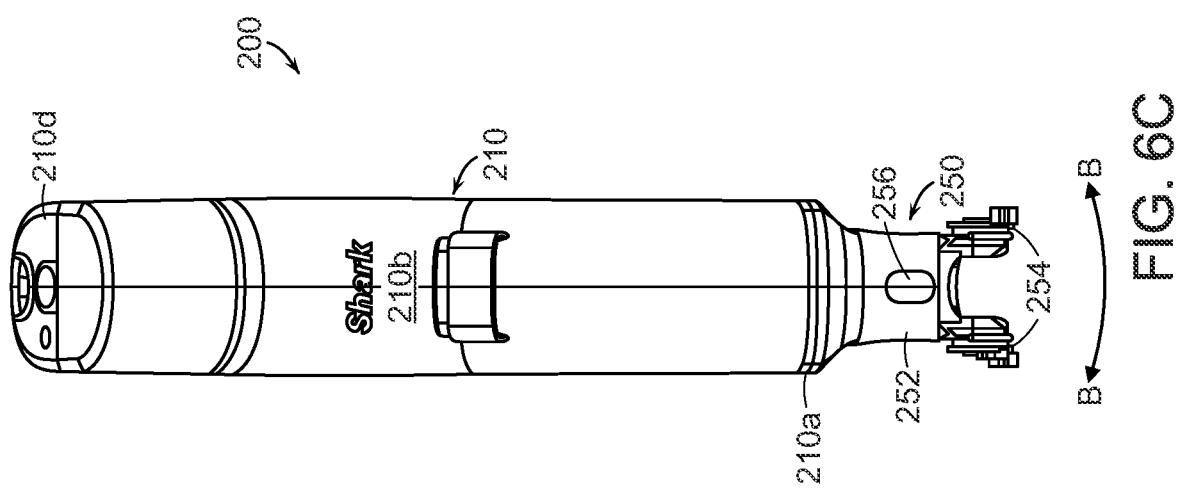
FIG. 6C is front view of the body assembly of FIG. 6A.
Figure 7B:
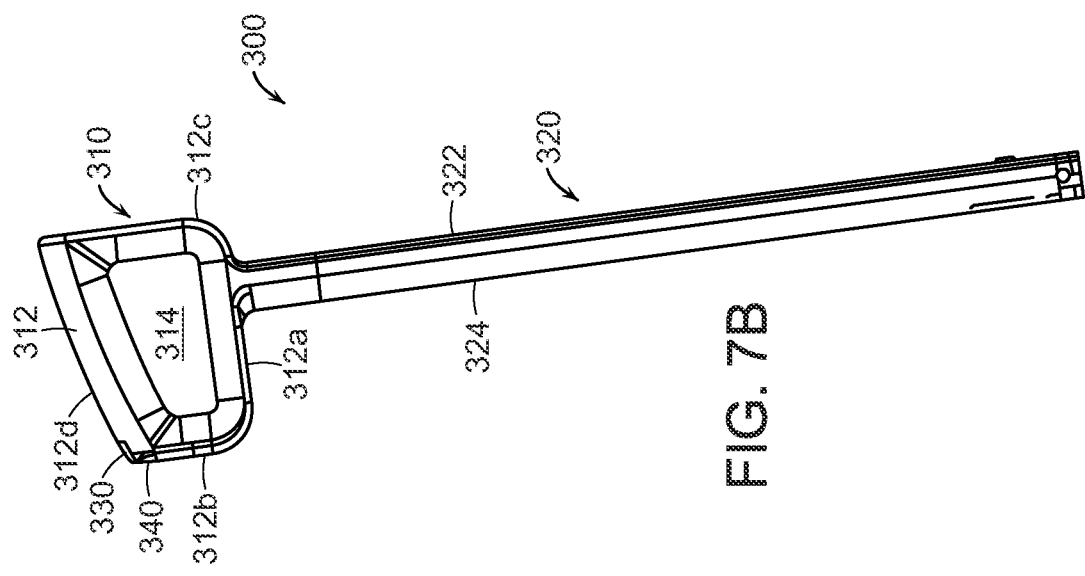
FIG. 7B is a right side view of the handle assembly of FIG. 7A.
Figure 7A:
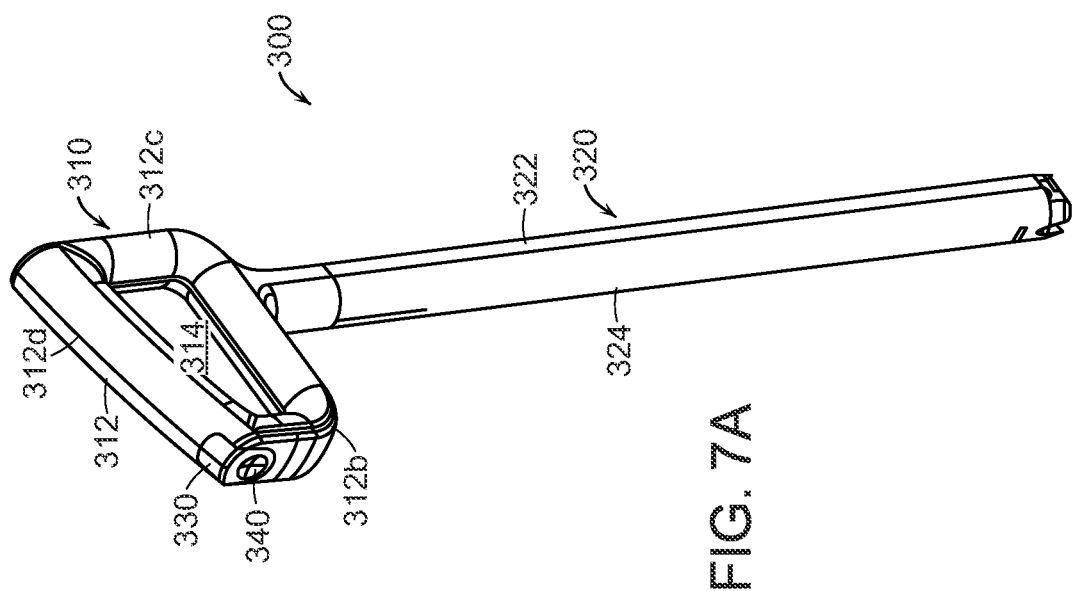
FIG. 7A is a front perspective view of a handle assembly of the cleaning device of FIG. 1A.
Figure 7D:
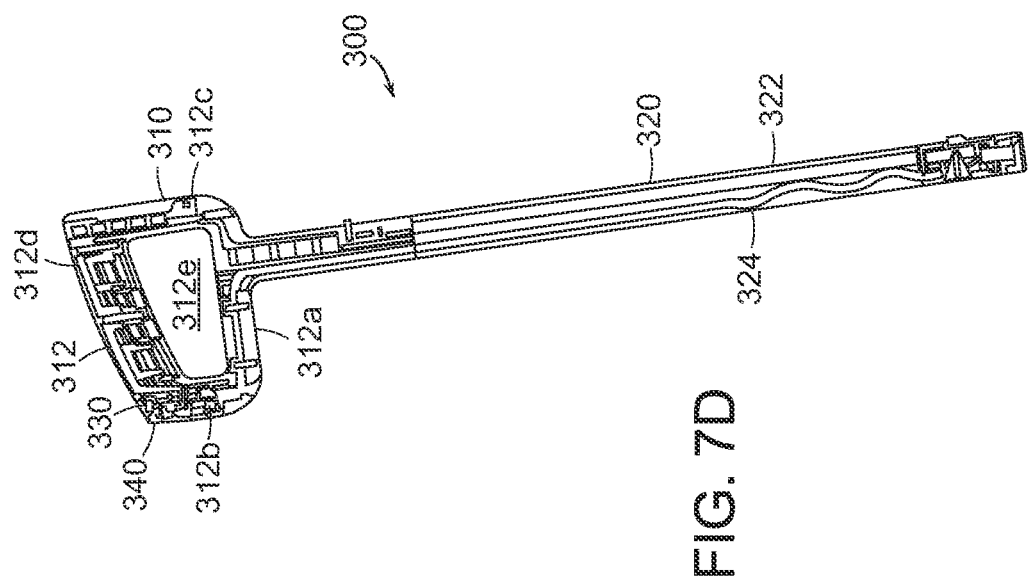
FIG. 7D is a cross-sectional side view of the handle assembly of FIG. 7A
Figure 7C:
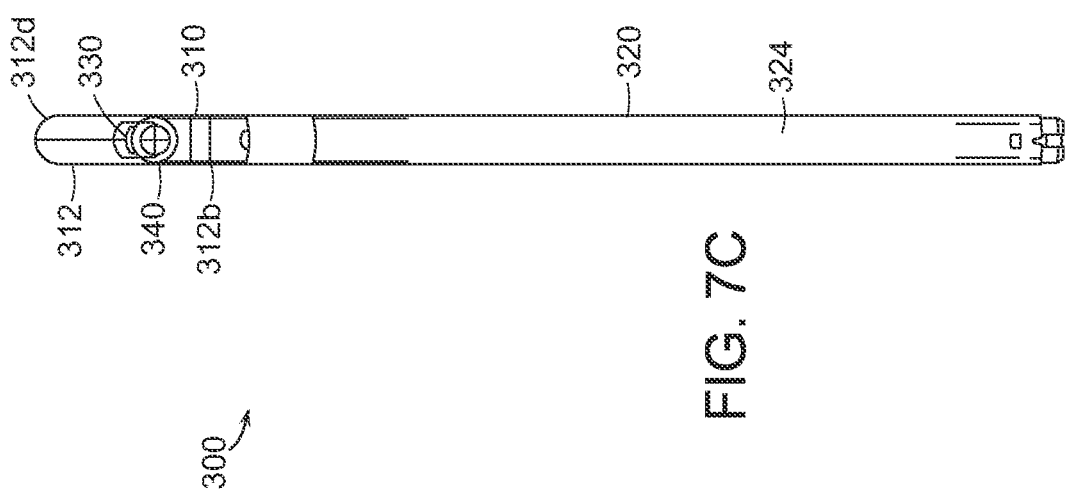
FIG. 7C is a front view of the handle assembly of FIG. 7A.
Figure 8B:
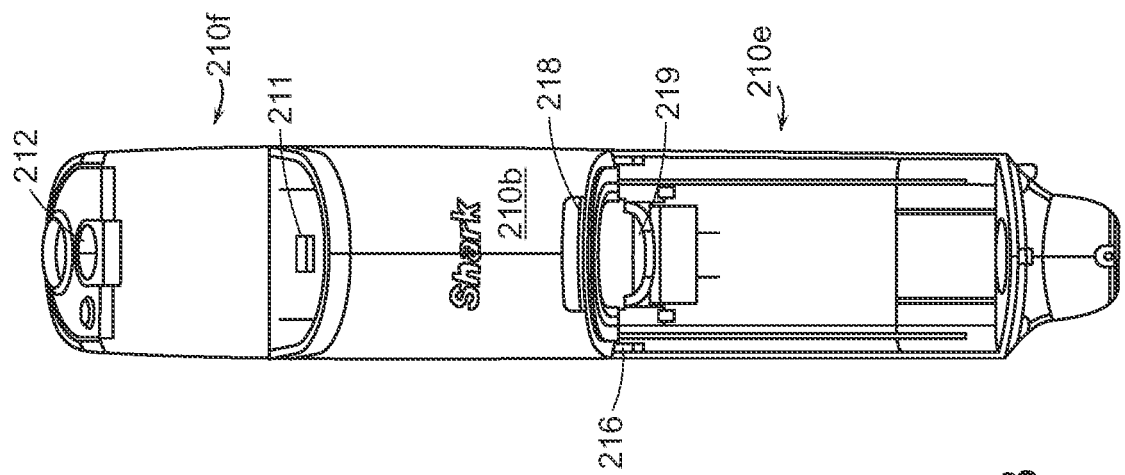
FIG. 8B is a front view of the body assembly of FIG. 8A.
Figure 8A:
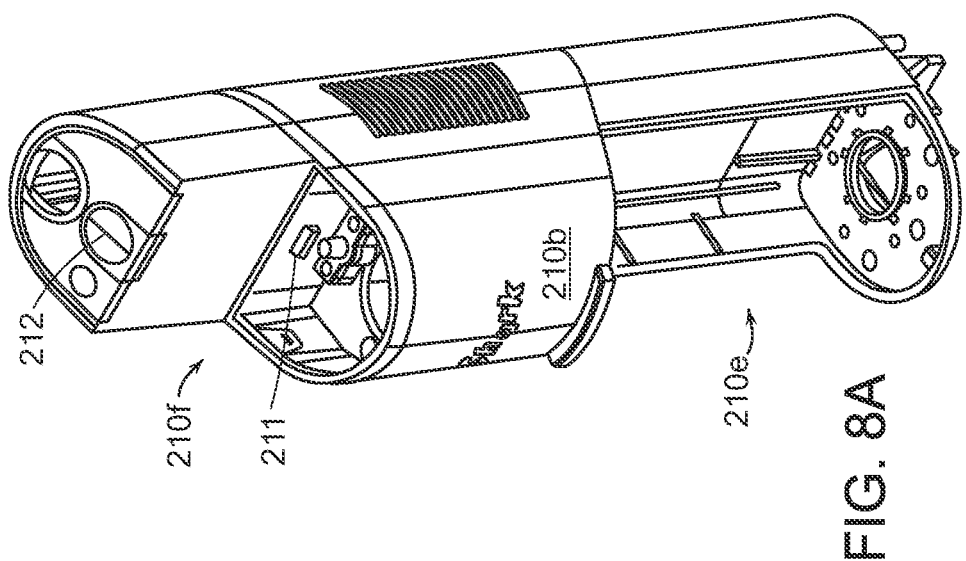
FIG. 8A is a front perspective view of the body assembly of FIG. 6A, having a fluid supply tank and a recovery tank removed from their respective retaining areas.
Figure 8D:
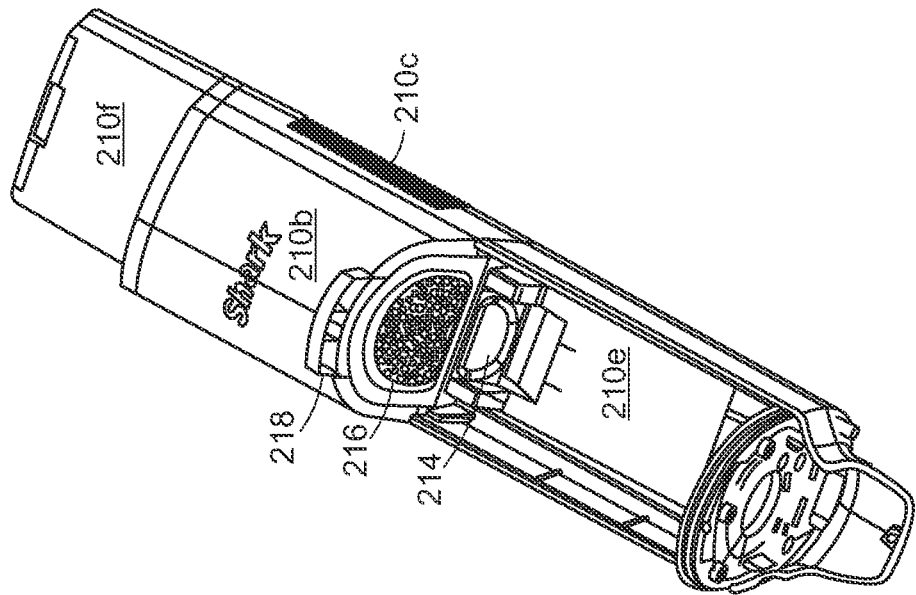
FIG. 8D is a bottom perspective view of the body assembly of FIG. 8A.
Figure 8C:
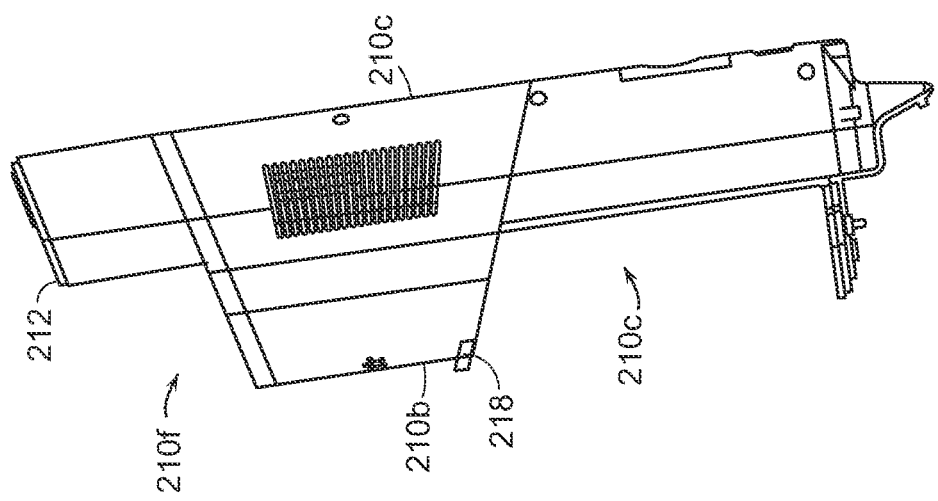
FIG. 8C is a right side view of the body assembly of FIG. 8A.
Figure 9D:
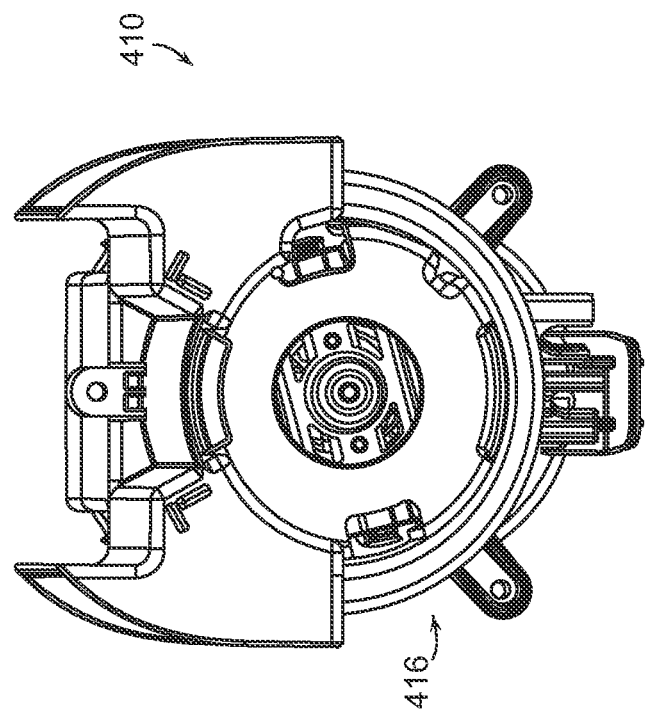
FIG. 9D is a top view of the motor assembly of FIG. 9A.
Figure 9C:
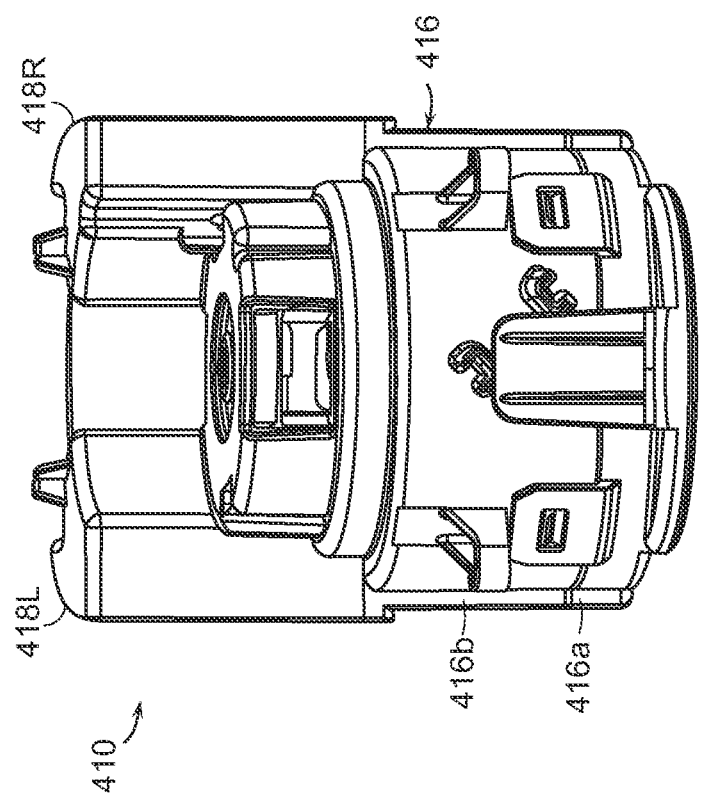
FIG. 9C is a front view of the motor assembly of FIG. 9A.
Figure 9E:
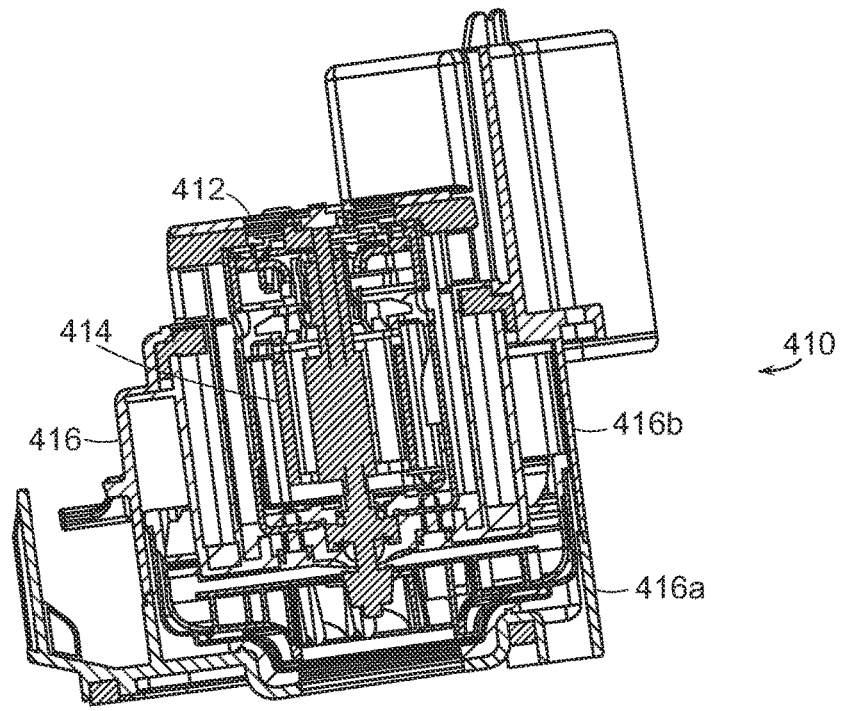
FIG. 9E is cross-sectional side view of the motor assembly of FIG. 9A.

On an outer surface of the brushroll 160, similar to the brushroll 150, are structures which can interface with corresponding structures on a head assembly 100' (not shown). For example, FIG. 4B depicts a right side 162R having a geometric interface which can operate similarly to the structure seen above in FIGS. 3A and 3B. On a left side 162L, the brushroll 160 includes a rounded protrusion 168, which can be received by a corresponding structure located on a brushroll support (not shown). FIG. 4D depicts a partial-cross-sectional view of the protrusion 168, which is biased to an extended position by a spring 170. The end of the protrusion 168 is shaped to mate with a brush support and secure the brushroll 160 so that, during cleaning operations, the brushroll 160 can rotate to drive dirt, debris, and waste to the cleaning device 10.

As mentioned above, the head assembly 100 further includes a brushroll cover 140 removably attached to the top side 110b of the head housing 110. FIGS. 5A-5D show an embodiment of a brushroll cover 140, which can be secured to the head assembly 110 to cover a brushroll 150, 160 in order to prevent splash and spray from the brushroll 150, 160 while it is in operation.

The brushroll cover 140 is shaped to extend the entire width of the head housing 110 between the left and right sides 110c, 110d, and it extends from the top side 110b of the head housing 110, over the rounded top edges 120La, 120Ra of the left and right support structures 120L, 120R, and ends just above the surface upon which the cleaning device 10 rests. This arrangement of the brushroll cover 140 can be seen in FIGS. 2A, 2C, and 2F. The brushroll cover 140 extends to be nearly even with the bottom side 110a of the head housing 110, thereby creating a small gap to allow for the introduction of waste into the cleaning device 10 during a cleaning process. The brushroll cover 140 can be removably attached to the head housing 110 at the top side 110b via the cover support 116, as explained above. The brushroll cover 140 can also be attached to the head housing 110 via a hinge (not shown), such that the cover 140 can provide easy access to the brushroll 160.

With reference now to 6A-8D, various views and components of an embodiment of the body assembly 200 of the cleaning device 10 are shown.

The body assembly 200 can be operatively coupled to the head assembly 100 via an articulator 250. The articulator 250, as introduced with respect to FIGS. 2A-2D and as shown again coupled to the body assembly 200 in FIGS. 6A-6D, is coupled to the bottom of the body assembly 200 and can be at least partially disposed within the head assembly 100. The illustrated articulator 250 is configured to articulate about two degrees of freedom. The articulator 250 has an outer housing 252 having a substantially elliptical cross-section that tapers in an upward direction to become larger, eventually coinciding with the size of the body assembly 200. A first point of articulation 254, allowing for articulation about a first degree of freedom, is mounted within the head assembly 100. The first point of articulation 254 allows for the body assembly 200 to pivot between a forward direction and a backward direction, as indicated by the arrows A-A in FIGS. 6A-6D. A second point of articulation 256, located above the first point of articulation 254, allows for the body assembly 200 to pivot between a left direction and a right direction, as indicated by the arrows B-B in FIG. 2A. One or both points of articulation 254, 256 can be articulated at a given time. Further, in other embodiments, the body assembly 200 can articulate in any number of degrees of freedom about any number of points of articulation.

The body assembly 200 includes a body housing 210 having a substantially cylindrical form with an elliptical cross-section. The body housing 210 includes a housing base 210a coupled to the articulator 250, a rounded front side 210b and a rounded rear side 210c extending upward from the housing base 210a, and a top side 210d. The top side 210d of the body housing 210 in the illustrated embodiment is substantially flat and slopes downward at an angle from the rear side 210c to the front side 210b. The top side 210d of the body housing 210 is coupled to the handle assembly 300, which extends from the body assembly 200 in a direction opposite the head assembly 100.

FIGS. 7A-7D show the handle assembly in more detail, including the handle 310 coupled to the stem 320. The illustrated handle 310 has a substantially trapezoidal handle frame 312 surrounding an interior handle aperture 314. The illustrated handle frame 312 has a substantially flat bottom section 312a, and a front section 312b and a back section 312c extending upward from the bottom section 312a at substantially right angles relative to the bottom section 312a. The front section 312b is shorter than the back section 312c, and the top of each of the front section 312b and the back section 312c are connected by a top section 312d. The top section 312d is angled downward toward the front section 312b by virtue of the height discrepancy between the front section 312b and the back section 312c. The handle 312 further includes a power button 330 disposed on an upper exterior of the front section 312b, and an area rug button 340 disposed on a front exterior of the top section 312d. The functions of these buttons will be described in more detail below.

The illustrated handle assembly 300 further includes a stem 320 disposed between an underside of the bottom section 312a of the handle 312 and the top side 210d of the body housing 210. The stem 320 is substantially linear and has a nearly flat rear face 322 and a rounded front face 324, such that the stem 320 has a substantially semicircular cross-section. A person skilled in the art will appreciate that the handle assembly can have a variety of other configurations.

Referring again to the body assembly 200 the body housing 210 includes first and second cavities 210e, 210f for receiving components of the cleaning device 10. The first and second cavities 210e, 210f are sized to receive a recovery tank 420 and a fluid supply tank 610 respectively, as shown in FIGS. 6A-6D, such that when retained in their respective cavities, the recovery tank 420 and fluid supply tank 610 are shaped to conform to the overall cylindrical shape of the body assembly 200.

FIGS. 8A-8D show the body assembly 200 with the recovery tank 420 and fluid supply tank 610 removed from the first and second cavities 210e, 210f, respectively. The first cavity 210e, located in the lower front side 210b of the body housing 210, is sized to removably receive the recovery tank 420 such that, when retained in the first cavity 210e, the recovery tank 420 occupies the entirety of a lower region of the front side 210b of the body housing 210. The first cavity 210e can include a seal 214 disposed on an upper side thereof and configured to seal against an upper portion of the retained recovery tank 420. Next to the seal 214 is a divider 216. The divider 216 can be porous to allow air to flow through the system during dry and wet cleaning operations, as will be described below in more detail. The recovery tank 420 is removable from the body housing 210 after actuation of a latch assembly 460 (not shown) extending outward from an upper extent of the recovery tank 420, which releases the recovery tank 420 from engagement with a retaining slot 218, located toward the front of the first cavity 210e. The second cavity 210f, located in an upper front portion 210b of the body housing, and occupying a substantial portion of the top side 210d, receives the fluid supply tank 610 for use in wet cleaning processes. A fluid tank switch 212 is disposed in the top side 210d of the body housing 210 between the second cavity 210f. When the fluid tank switch 212 is actuated, a tank engagement feature 211 recedes into the body housing 210, and the fluid supply tank 610 can be removed from the second cavity 210f. The recovery tank 420 and the fluid supply tank 610 will be described in greater detail below with respect to the cleaning processes that the cleaning device 10 may perform.

As previously indicated, the cleaning device 10 can operate in both wet and dry cleaning modes. Dry cleaning modes generally include modes related to traditional vacuuming operations, such as vacuuming on hard surfaces or on softer surfaces, such as carpet. Dry cleaning modes rely on a suction to take dirt and debris into the cleaning device for convenient disposal. In some dry cleaning modes, a brushroll can rotate to agitate debris and waste on a cleaning surface. The brushroll can loosen the dirt and debris while simultaneously directing it toward a suction intake of a cleaning device. In other dry cleaning modes, a brushroll does not rotate, and instead, suction is relied on alone to force dirt and debris into a cleaning device. Wet cleaning modes can generally include a cleaning device supplying fluid either directly or indirectly to a surface to aid in cleaning. The supplied fluid can act to loosen dirt and and debris stuck to the surface, and the dirtied fluid can be taken into the cleaning device through suction or other means. In some wet cleaning modes, like some dry cleaning modes described above, a brushroll can further assist in loosening dirt and debris off the surface and directing it toward a suction intake. In these wet cleaning modes, the fluid can be supplied directly to the brushroll in order to simultaneously apply the fluid to the surface while agitating the dirt and debris found on the surface. In other wet cleaning modes, fluid can be supplied directly to the surface and the brushroll can agitate the wetted surface. In still other modes, fluid can be supplied directly to the surface and a brushroll can remain stationary, thereby cleaning the surface with fluid and suction alone.

The wet and dry cleaning modes can rely on a vacuum assembly 400. In an exemplary embodiment, the vacuum assembly 400 includes a motor assembly 410, a recovery tank 420, and hosing 230 coupled to an intake, such as a central intake 126, which together can be operated to draw waste into the cleaning device 10.

FIGS. 9A-9E depict a motor assembly 410 according to the exemplary embodiment. The motor assembly 410 is configured to be disposed within the body housing 210 beneath the fluid supply tank 610 and the handle stem 320 and above the recovery tank 420. The illustrated motor assembly 410 includes a motor 412 and a fan 414 encased in a motor housing 416. The motor housing 416 is divided into a lower motor housing portion 416a and an upper motor housing portion 416b coupled to or integrally formed with the lower motor housing 416a, and the motor 412 and motor fan 414 are contained therebetween. At an upper extent of the upper motor housing portion 416b are left and right air vents 418L, 418R, which allow for air drawn into the cleaning device 10 to exit out the rear side 210c of the body housing 210. When coupled together, the lower motor housing 416a and the upper motor housing 416b substantially surround and isolate the motor 412 and fan 414 from the rest of the cleaning device 10. The motor assembly 410 sits atop the divider 216 disposed within the body assembly 200. The divider 216 can be seen especially in FIG. 8D, and it includes a plurality of apertures, which allow for air to flow through the divider 216 to facilitate the various cleaning operations which rely on suction. Moreover, the divider 216 forms an upper extent of the first cavity 210e, which receives the fluid recovery tank 420.

With reference now to FIGS. 10A-10L, an exemplary embodiment of the recovery tank 420 is shown. The recovery tank 420 can be removably retained within the body housing 210 in the first cavity 210e, as explained above. The illustrated recovery tank 420 generally includes a container 422, a separator 440, a lid 460, and a latch assembly 470.

FIGS. 10A-10D and 10L depict the container 422 in relation to the remainder of the recovery tank 420. The container 422 has a bottom surface 422a and a sidewall 422b extending upward from the bottom surface 422a. As mentioned previously, the container sidewall 422b can have a rounded front face 422c to conform with the overall substantially cylindrical shape of the body housing 210. A rear face 422d of the sidewall 422b can be substantially flat. At an upper extent, the container can have a top end 422e that is open and is able to receive the separator 440 therein. The top end 422e can be sloped from the front and extending downward toward the rear face 422d of the sidewall 422b. The container 422 can also include an inlet on the bottom surface in the form of a hollow standpipe 424 that extends nearly the entirety of the container 422 height. The upper extent of the hollow standpipe is open to allow for fluid to pass into the container 422. The hollow standpipe 424 can be disposed rearward of a center of the bottom surface 422a, closer to the rear face 422d of the sidewall 422b.

FIGS. 10E-10H show the separator 440 separated from the rest of the recovery tank 420. The separator 440 can be received within the container top end 422e and can extend downward into the container 422 from the top end 422e, such that a lower end 440a of the separator 440 extends downward beyond an upper end of the standpipe 424 to a distance above the bottom surface 422a of the container 422. The lower end 440a of the separator 440 can be shaped to allow the standpipe 424 to extend through an opening 440b, while surrounding the standpipe 424. The lower end 440a of the separator 440 can also be sloped, similar to the top end 422e of the container 422, however the lower end 440a of the separator 440 can slope downward from the rear face 422d of the container sidewall 422b to the front face 422c, bottoming out to a drain 442 some distance from the front face 422c. A secondary slope 444 can extend from the front face 422c of the sidewall 422b to the drain 442. The drain 442 itself, shown in a bottom view in FIG. 10G, can be in the form of a slot in the lower end 440a of the separator 440 that extends substantially the entire width thereof. On either side of the drain 442 are a plurality of ridges 446 defining channels 447 therebetween, which can act to catch and hold large debris, yet still allowing for fluids to pass through the drain 442. FIG. 10H is a cross-sectional view of the separator 440, and the plane of the cross section is located within the drain 442 to provide a view of the plurality of ridges 446. In this view, it can be seen that the ridges 446 form a wave pattern, so larger debris would be unable to fully block a pathway to the drain as fluid and smaller particles remain able to pass into the channels 447. A person skilled in the art will appreciate that the drain and the ridges can have a variety of other configurations, and the separator can include any number of drain holes therein.

The illustrates separator 440 also includes first and second deflectors 448a, 448b which extend downward in the container 422. The first deflector 448a extends downward to partially cover the upper portion of the standpipe 424. The first deflector 448a is curved and shaped like a quarter-pipe to extend frontward, over the standpipe 424 and past an upper extent of the standpipe 424. The second deflector 448b extends at a downward angle from a front side of the standpipe 424 and out over the drain 442. The first and second deflectors 448a, 448b are configured to mitigate the effects of splash back and to prevent fluids and debris from getting near the top end 422e of the container 422. In other embodiments, the deflectors 448a, 448b may take on other forms, and they may extend in different angles, shapes, or regions of the container 422 as needed.

On an underside of the separator 440 are first and second fluid level detectors 449a, 449b which extend downward from the separator 440. The fluid level detectors 449a, 449b are configured to sense when fluid has reached a predetermined threshold, and upon the fluid level reaching the predetermined threshold, to send a signal to the cleaning device 10 to display an alert. In an exemplary embodiment, the first and second level detectors 449a, 449b have exposed electrical contacts which, when submerged in fluid, complete a circuit and send a signal to the cleaning device 10 to display an alert message signifying that the recovery tank 420 can be emptied. In other embodiments, other level detector arrangements can be used, such as, for example, a float, a displacer, or others.

The separator 440 near the top end 422e of the container 422 can also include two openings, namely a spout 450 and a lid opening 452. The illustrated spout 450 is disposed in a rear-most region of the separator 440 and has a curved lip 454 in a rear region thereof to allow for the controlled disposal of fluid captured by the recovery tank 420. The spout 450 is aligned with a channel 451, shown in FIG. 10D, formed in the back side of the separator such that a fluid flow pathway is defined between the back of the separator 440 and the container 422 for allowing fluid to flow therethrough. When the recovery tank 420 is retained within the body housing 210, the spout 450 is pressed against the seal 214 disposed on the body housing 210 next to the divider 216 to prevent the premature expulsion of fluid from recovery tank 420. When the recovery tank 420 is removed from the body housing 210, the spout 450 is open and allows a user to invert the container 422 to pour fluid out of the spout. The lid opening 452 is positioned next to the spout 450, closer the front sidewall 422b of the container 422. The lid opening 452 is sized to securely receive a lid 460, which can be removable from the lid opening 452 when the recovery tank 420 is not retained within the body housing 210.

Figure 10A:
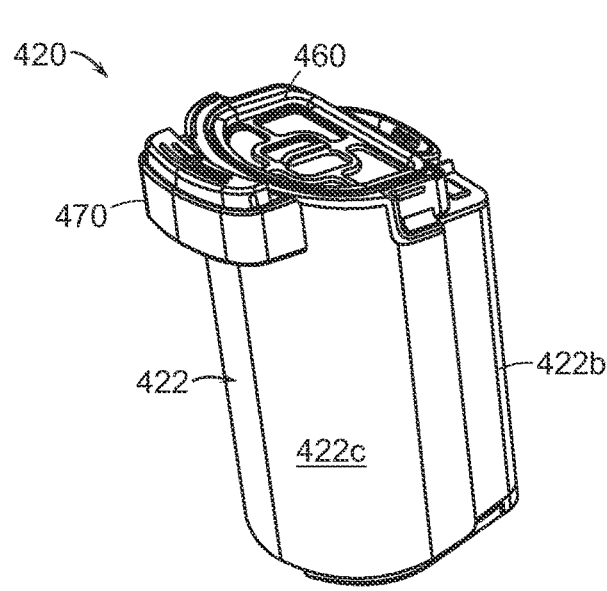
FIG. 10A is a front perspective view of a fluid recovery tank of the cleaning device of FIG. 1A.
Figure 10B:
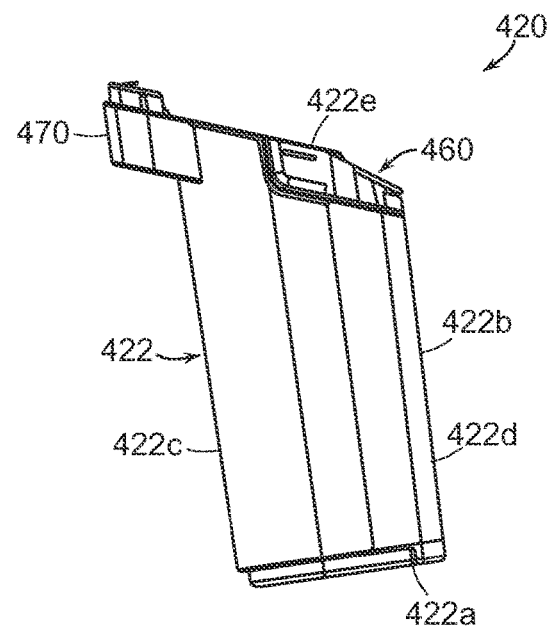
FIG. 10B is a right side view of the fluid recovery tank of FIG. 10A.
Figure 10D:
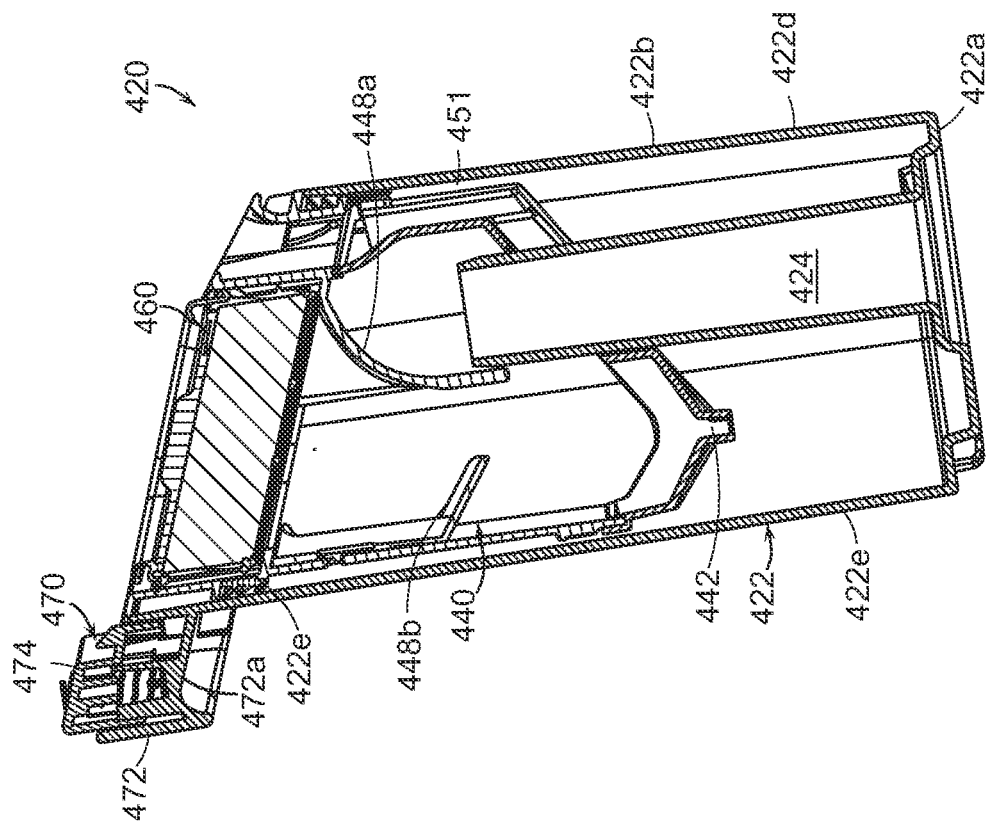
FIG. 10D is a cross-sectional side view of the fluid recovery tank of FIG. 10A.
Figure 10C:
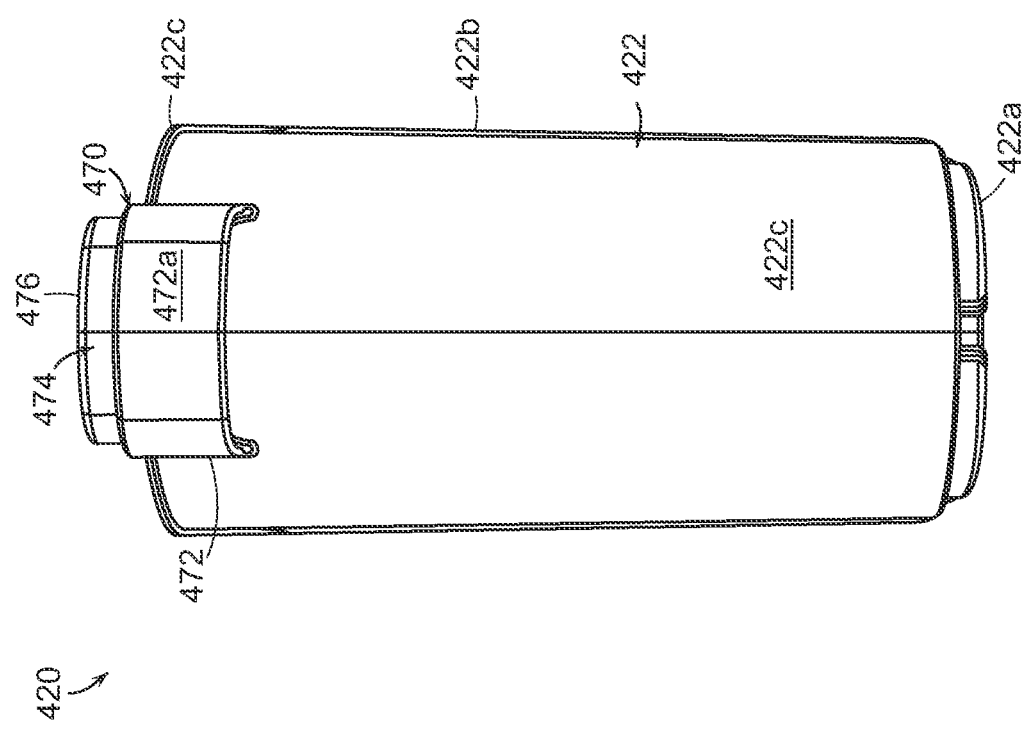
FIG. 10C is a front view of the fluid recovery tank of FIG. 10A.
Figure 10J:
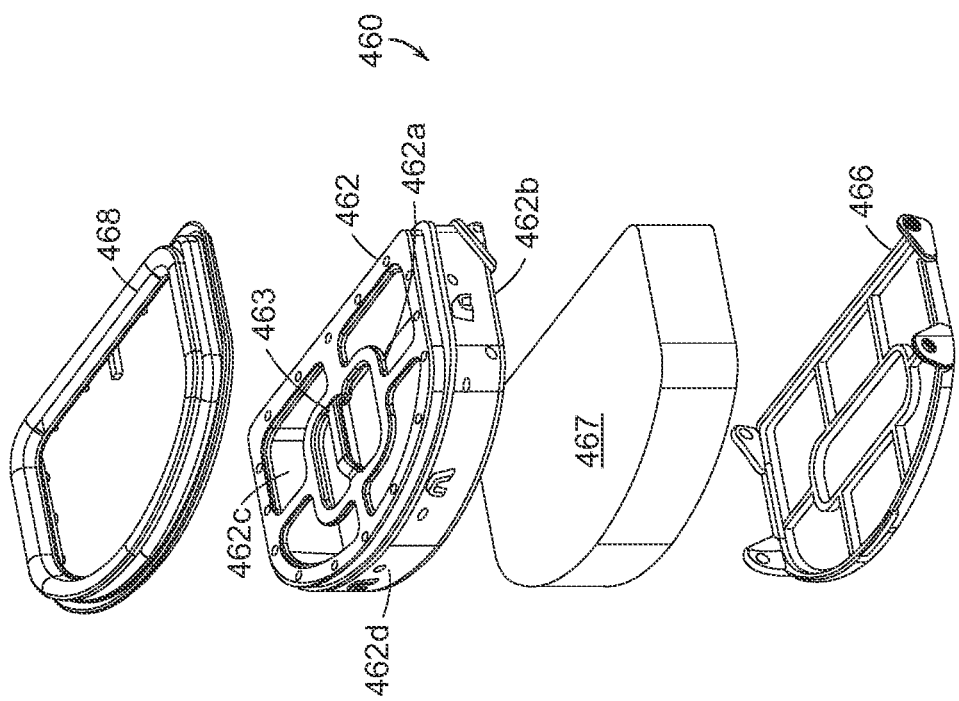
FIG. 10J is an exploded view of the lid of FIG. 10I.
Figure 10I:
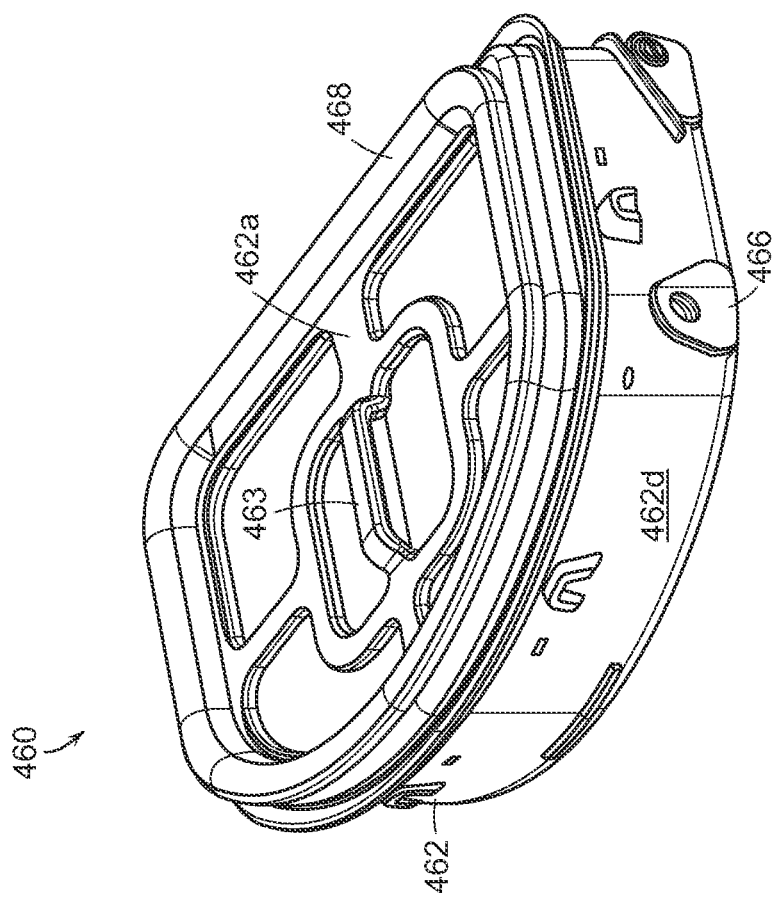
FIG. 10I is a perspective view of a lid of the fluid recovery tank of FIG. 10A.

The lid 460, shown most clearly in FIGS. 10I and 10J, can be shaped to fit within the lid opening 452. In the illustrated embodiment, the lid 460 is shaped approximately like a half ellipse and is skewed to align with the slope of the lid opening 452. The lid 460 includes a frame 462 having a top support 462a, an open bottom 462b, an inner surface 462c, and an outer surface 462d. The outer surface 462d of the body frame 462 includes multiple grooves 464 that align with ridges 452a of the lid opening 452 and prevent the lid 460 from being over-inserted into the lid opening 452. A mesh structure 466 can be hinged over the open bottom 462b of the frame 462. The mesh structure 466 can have a first porosity which can act to prevent large particles from passing through the lid 460, while still allow air to pass through the lid 460. The mesh 466 can be made of plastic, but in other embodiments, the mesh 466 can be made from various materials, including metals, rubbers, or other materials known in the art. Contained within the frame 462 is a filter material 467 sized to fill the entirety of the frame 462. The filter material 467, in the exemplary embodiment, is made from a foam-like material, which has a second porosity that is smaller than the first porosity of the mesh 466. In other embodiments, the filter material 467 can be made other materials which can act as filters, such as various pulps, plastics, sponges, or other materials known in the art. The filter material 467 can additionally have different porosities, which may be smaller, greater, or equal to the porosity of the mesh 466, and this porosity can be varied depending upon the type of matter to be filtered. In the illustrated embodiment, the smaller porosity of the filter material 467 prevents the escape of other particles from the recovery tank 420 which may not be stopped by the mesh 466. Covering the top of the frame 462 is a top support 462a, which, in the exemplary embodiment, is a scaffold that prevents the filter material 467 from being misaligned in the frame 462. A central portion of the top support 462a includes a handle 463 to assist in removal of the lid 460 from the lid opening 452. Surrounding a perimeter of the top support 462a and extending beyond the bounds of the frame is a gasket 468 which helps to seal the lid 460 into the lid opening 452. In this way, fluid cannot pass around the lid 460 when it is seated in the lid opening 462, and instead it must pass through the mesh 466 and the filter material 467. When the recovery tank 420 is retained within the body housing 210, such as depicted in FIGS. 6A-6D, the lid 460 is pressed against the divider 216, such that the container 422 and the motor assembly 410 are in fluid communication with each other.

A latch assembly 470 extends from the front sidewall 422b of the recovery tank 420 and forms a part of the container top 422e is. The latch assembly 470 functions to secure the recovery tank 420 within body housing 210, and it can be actuated to allow for removal of the recovery tank 420 from the first area 410e of the housing body 410. The illustrated latch assembly 470 includes a latch seat 472, acting as a kind of housing, which extends from the container sidewall 422b in the form of an arc-shaped protrusion. In this way, the latch is disposed entirely outside of the container 422. The latch seat 472 is hollow and defines a depression 472a, seen in FIG. 10D, which receives a latch 474 and a spring 475. The spring 475 is positioned centrally in the latch seat 472, and the latch 474 is seated in the latch seat 472 over the spring 475 such that the latch 474 is biased to a raised position, being lifted by the spring force of the spring 475.

Figure 10K:
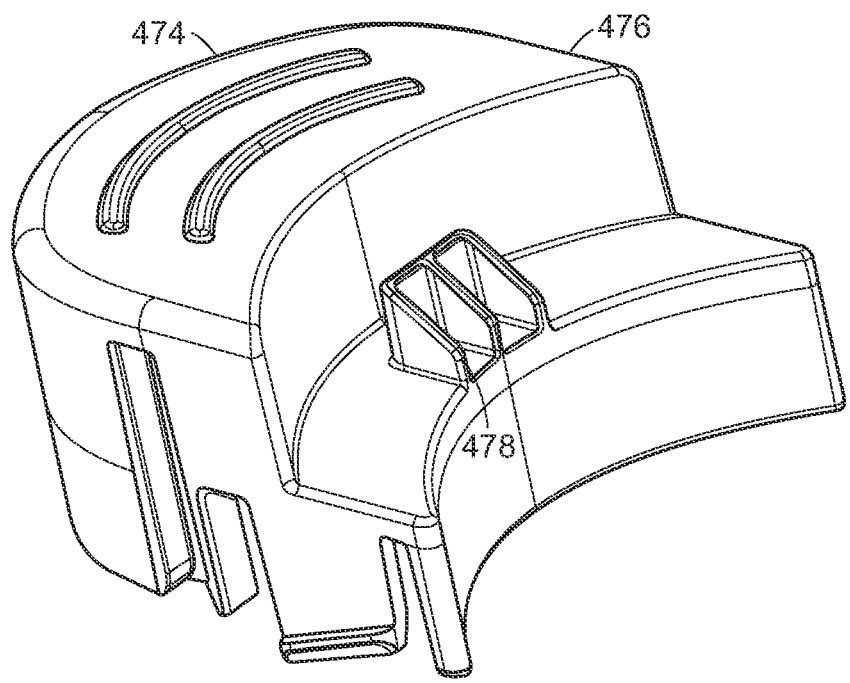
FIG. 10K is a rear perspective view of a latch of the fluid recovery tank of FIG. 10A.
Figure 10L:
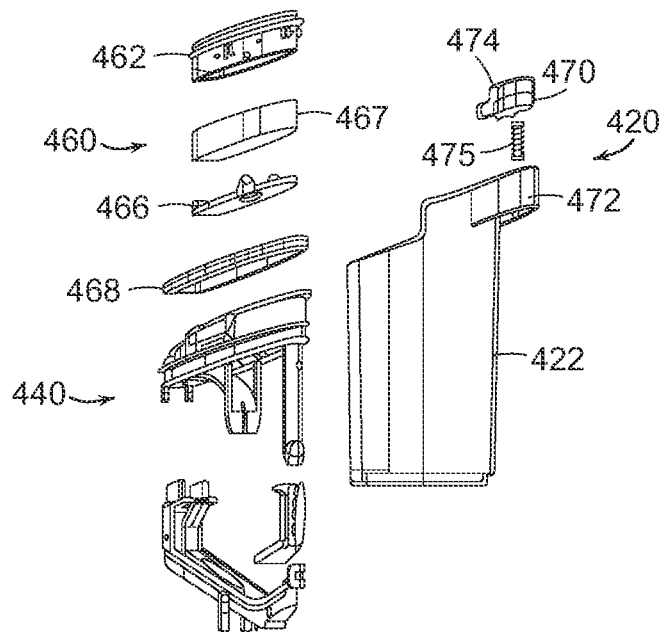
FIG. 10L is an exploded view of the fluid recovery tank of FIG. 10A.

The latch 474 itself, shown in FIGS. 10A-10D and 10K-10L, and especially FIG. 10K, has an upper arc-shaped protrusion 476 which extends out of the latch seat 472 and above an upper extent of the container 422 and separator 440. Inward from the arc-shaped protrusion 476 and also extending from the latch 474 out of the latch seat 472 is an engagement feature 478, which can be received in the complimentary slot 218 on the body housing 210 in order to enable retention of the recovery tank 420. The shape of the both the latch 474 and the latch seat 474 are curved to align with a contour of the container 422, and, in turn, the cleaning device 10. Actuation of the latch 474 counters the spring force and drives the latch 474 into the latch seat 472 in a downward direction. When the latch 474 is no longer actuated, the spring force returns the latch 474 to an upward position to extend above the latch seat 472 and above the container 422, thereby also extending the engagement feature 478 into the complimentary slot 218. Therefore, the latch is spring-biased to the locked position. In this way, the latch 474 moves vertically upward and downward, without moving laterally within the latch seat 472, all the while remaining parallel, or substantially parallel, to the top of the container 422. Further, in either the upward or downward position, the latch 474 extends above the top of the container 422. Although the exemplary embodiment depicts a latch 474 as described above, other embodiments may use alternative structures to secure the recovery tank 420 in the body housing 210, for example, a sliding mechanism, a clip, a knob, or another device known in the art.

When the recovery tank 420 is mounted within the body housing 210, hosing 230 extending between the body assembly and the head assembly can allow fluid and debris to be delivered to the recovery tank 420. In particular, the hosing 230 can be located in a lower portion of the body housing, centrally disposed beneath the recovery tank 420, and it can be configured to fluidly coupled to the outside of the standpipe 424 and to provide a fluid communication path between the container 422 and the central intake 126 in the head assembly 100. The hosing 230 is flexible so as to not inhibit full articulation of the head assembly and body assembly at the articulator. When the recovery tank 420 is retained in the body housing 210, an upper end of the hosing 230 contacts the lower end of the container 422 and creates a substantial seal around the inlet. Accordingly, the central intake 126 is in fluid communication with the recovery tank 420 when the recovery tank 420 is retained in the body housing 210.

When the recovery tank 420 is retained within the body housing 210, the lid aligns with the divider 216 and is therefore in fluid communication with the motor and the suction path by virtue of the apertures contained within the divider.

When operated in the dry cleaning modes, the sub-assemblies of the vacuum assembly 400 work together to enable debris to be drawn into the cleaning device 10 for disposal. In a dry cleaning mode, the motor assembly 410, via the motor fan 414, spins to draw in air through the central intake 126 located in the head assembly 100. Air flows into the central intake 126 in the head assembly 100, up through the hosing 230, introduced above with respect to FIG. 2E, and into the container 422 of the recovery tank 420. When the cleaning device 10 is passed near waste and debris, the suction generated by the motor assembly 410 will draw the waste and debris through the vacuum assembly where it will enter the container 422 in the recovery tank 420. Afterward, the airflow leaves the recovery tank 420 through the lid 460 passing through the mesh 466 and the filter material 467, where it enters the motor assembly 410. However, the mesh 466 and filter material 467 of the lid 460 does not allow the waste and debris to pass through, so instead it will become trapped in the container 422 until disposal. Finally, the airflow is vented out of the rear exhausts 418L, 418R of the motor assembly 410 through the rear side 210c of the body housing 210.

A person skilled in the art will appreciate that the recovery tank can have variety of other configurations. FIGS. 11A-11H and 17A-20 depicted embodiments of recovery tanks having various configurations, features, and arrangements. Features similar to those described above for the embodiment of FIG. 10A-10L will not be described again.

Figure 11A:
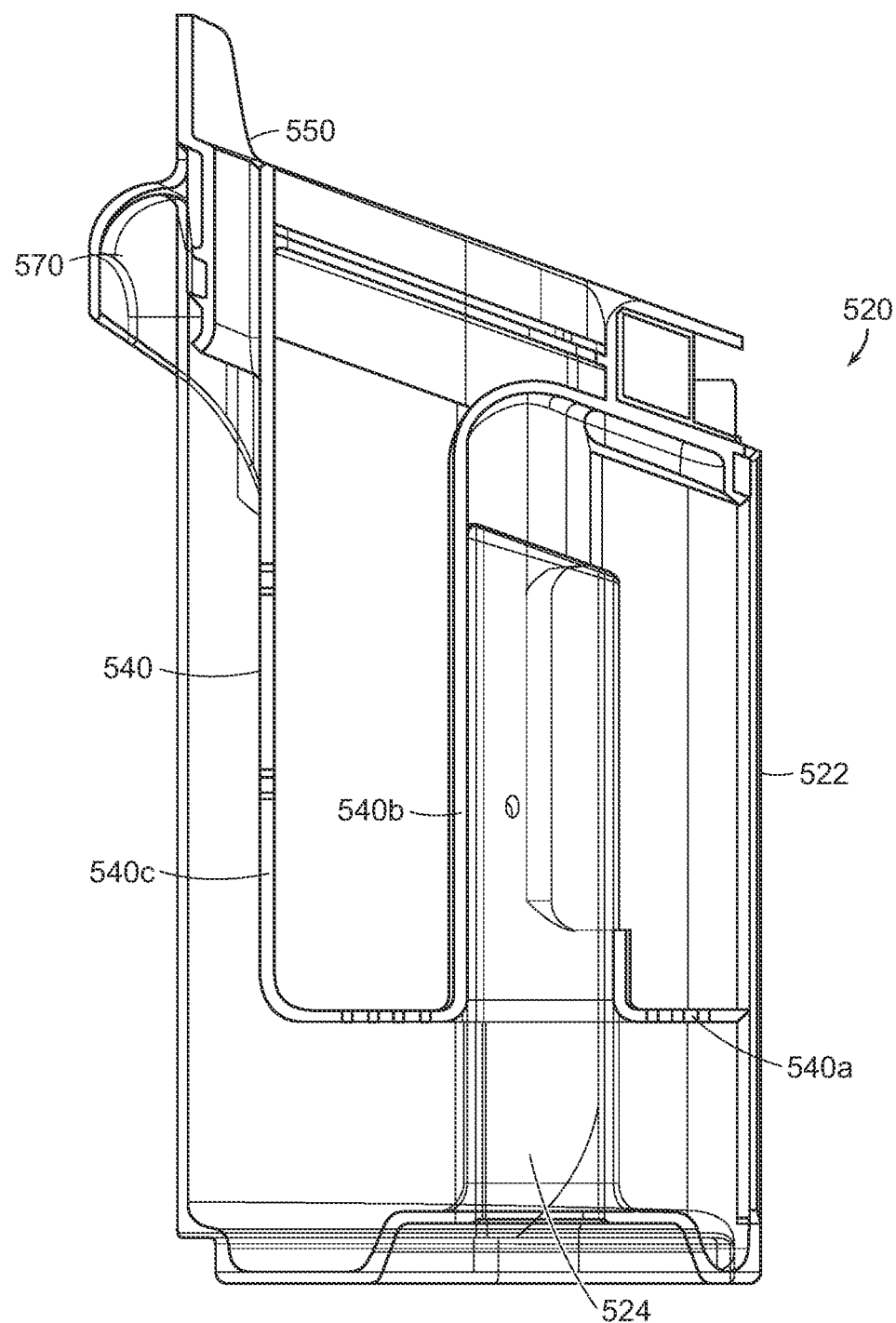
FIG. 11A is a right side view of another embodiment of a fluid recovery tank.

FIGS. 11A-11C show a recovery tank 520 that generally includes a container 522 and a separator 540. The recovery tank 520 can be retained within a body assembly 210' of a cleaning device 10 so that it can be used during cleaning processes, as explained above. In this embodiment, the separator 540 is sized to be seated around a standpipe 524 while occupying an entire width of the container 522. The standpipe 524 is received within a central shaft 540b built in to the separator 540 itself, which leads to an upper deflector 548 in the form of a quarter-pipe structure. Located on opposing sides of the central shaft are fluid detecting electrodes 549a, 549b, similar to those described previously. The separator 540 includes a flat bottom 540a and a porous rear side 540c that allows for fluid and smaller particles to pass through, while retaining larger particles.

In other aspects, the recovery tank 520 may lack a built-in lid or filter system, and instead those components can be retained directly within the body assembly 210' of the cleaning device 10. When the recovery system 520 is retained in the body assembly 210', the components can interact in order to enable the capture of dirt, debris, and waste, while allowing for air to flow freely through the system and facilitate suction.

During a cleaning process, when a fluid level within the recovery tank 510 rises to a predetermined threshold to contact the electrodes 549a, 549b, the cleaning device 10 can measure a drop in resistance across the electrodes 549a, 549b and alert a user to the detected fluid level. The cleaning device 10 can also interrupt a cleaning process and prevent further cleaning until the electrodes 549a, 549b no longer detect a fluid level exceeding the predetermined threshold. Similarly to the embodiment described above with respect to FIGS. 10A-10L, when disposing of captured dirt, debris, and waste, the separated liquid slurry can be emptied through a built-in pour spout 550 located at the top of the recovery tank 520. Then, the separator 540 can be removed, and with it, captured particles too big to pass through the separator 540 can be easily disposed of.

Figure 11F:
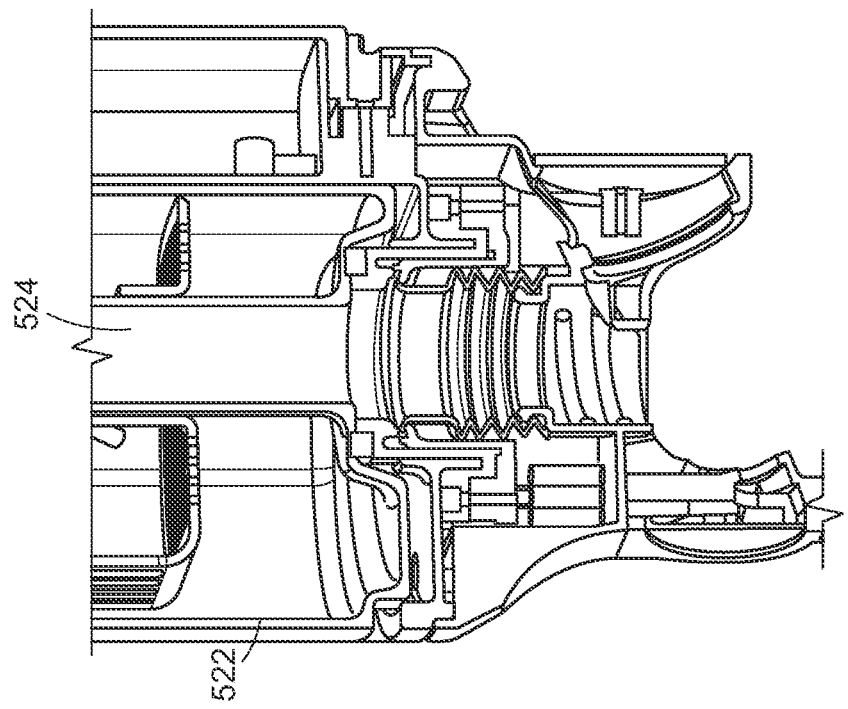
FIG. 11F is a partial cross-sectional view of the fluid recovery tank of FIG. 11D, showing a lower end engaged in the body assembly.
Figure 11E:
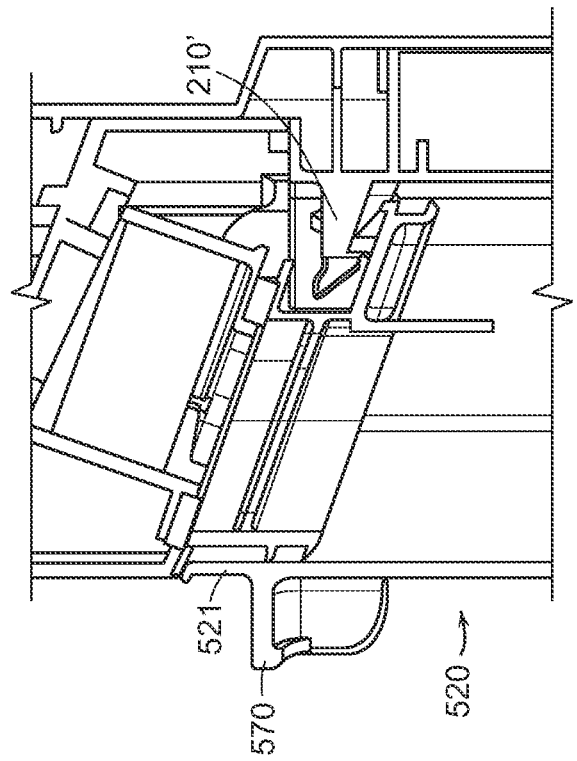
FIG. 11E is a partial cross-sectional view of the fluid recovery tank of FIG. 11D, showing an upper end engaged in the body assembly.

FIG. 11D shows the recovery tank 520 retained within the body assembly 210'. A handle 570 extends outward from the container 522 for allowing the recovery tank 520 to be pulled and removed from its retained position. When retained, an upper end of the separator 540 of the recovery tank 520 interfaces with a retention feature located within the body assembly 210', as shown in FIG. 11E. At a lower end of the separator 540, the body assembly 210' interacts with the container 522 in order to create a fluid pathway into the container 522 through the standpipe 524, as shown in FIG. 11F.

Figure 11G:
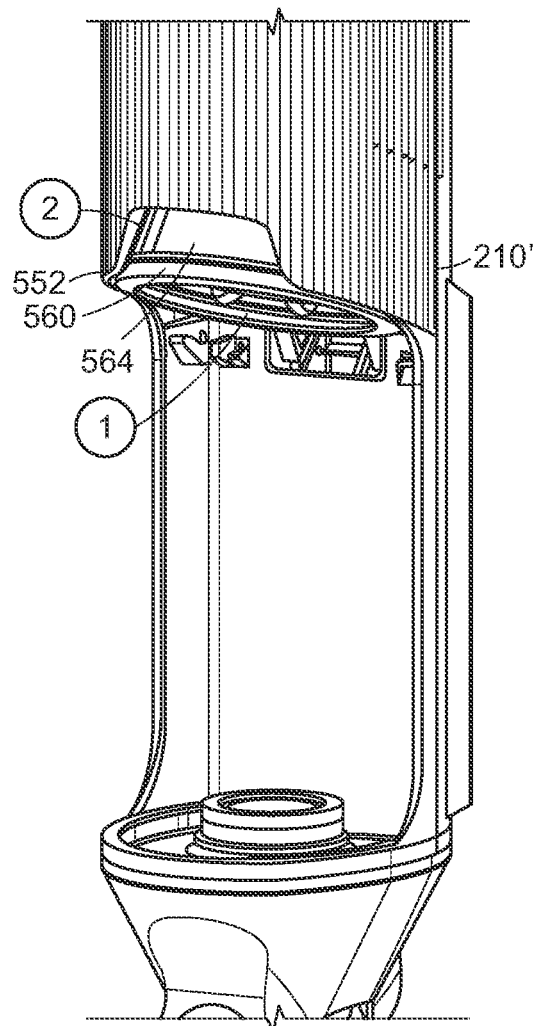
FIG. 11G is a front perspective view of a filter engaged in a body assembly according to the embodiment of FIG. 11A.
Figure 11H:
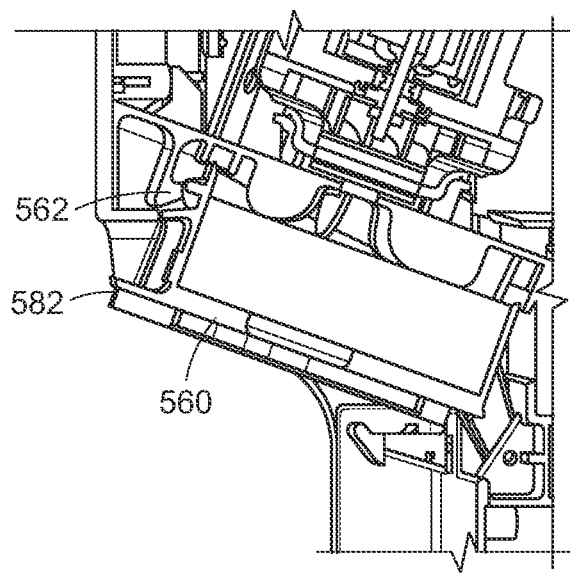
FIG. 11H is a partial cross-sectional view of the filter of FIG. 11G engaged in the body assembly.
Figure 11I:
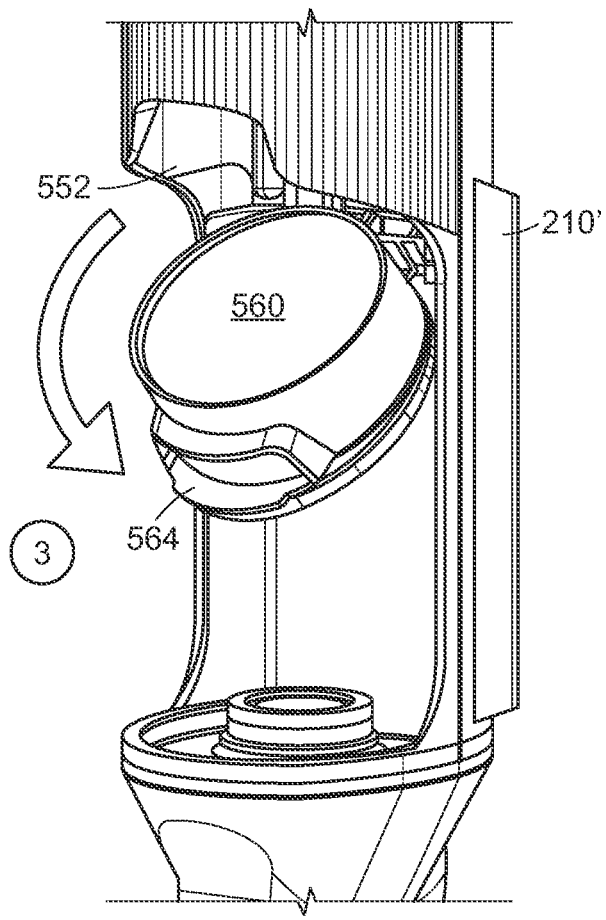
FIG. 11I is a front perspective view of the filter of FIG. 11G being disengaged from the body assembly.

FIGS. 11G-11I show a retention and removal process for a filter 560. The illustrated filter 560 is retained in a slot 552 so as to be disposed above a retained recovery tank 520. The filter 560 interfaces with a filter retention feature 562, depicted in FIG. 11H, in order to secure it in place. The filter 560 further includes a front rim 564 to aid in removal, which, when the recovery tank 520 is retained in the body assembly 210', is blocked by an extension 521 located on the recovery tank 520, as shown in FIG. 11D. When the recovery tank 520 is not retained, this slot 552 is accessible by a user and can be used to remove the filter 560, as shown in FIG.

FIGS. 17A-17D depict another embodiment of a recovery tank 810 having the same configuration as recovery tank 520, but that includes a peripheral seal 814 extending around an outer perimeter region thereof of the separator 812. The peripheral seal 814 can be made from a variety of materials, such as rubber, plastic, elastic, or other materials. When placed within a container 816 having a lid 815, the peripheral seal 814 can close off any gap left between the separator 812 and the sidewalls of the container 816, thereby preventing the passage of fluid and/or debris around the separator 812. In other words, a water-tight seal is formed. In operation, fluid and debris drawn into the container 816 must pass through the separator 812 via the drain 818, rather than avoiding the separation process. Similar to embodiments described above, the separator 812 also includes a deflector 819 in the form of a wedge-shaped protrusion. While the deflector 819 can have any form or orientation, the deflector 819 is shown angled downward toward the area of the drain 818. As fluid and debris are drawn into the recovery tank 810, the deflector 819 can assist in preventing this fluid and debris from impacting unwanted areas of the recovery tank 810, e.g., the lid 815.

FIGS. 18A-18D illustrate other embodiments of recovery tanks 820a-d, each having a configuration similar to recovery tank 420, but that have a hollow standpipe positioned at various locations. When coupled to a cleaning device (e.g., cleaning device 10) for various cleaning operations, such as those described herein, the recovery tanks 820a-d can be received by a complimentary structure located on the cleaning device (not shown). In this configuration, fluid and debris can still enter the recovery tank via the hollow standpipe, and the overall operation of the recovery assemblies 820a-d can occur in a substantially similar manner as described previously with respect to various embodiments detailed above.

Figures 18A, 18B, 18C, 18D:
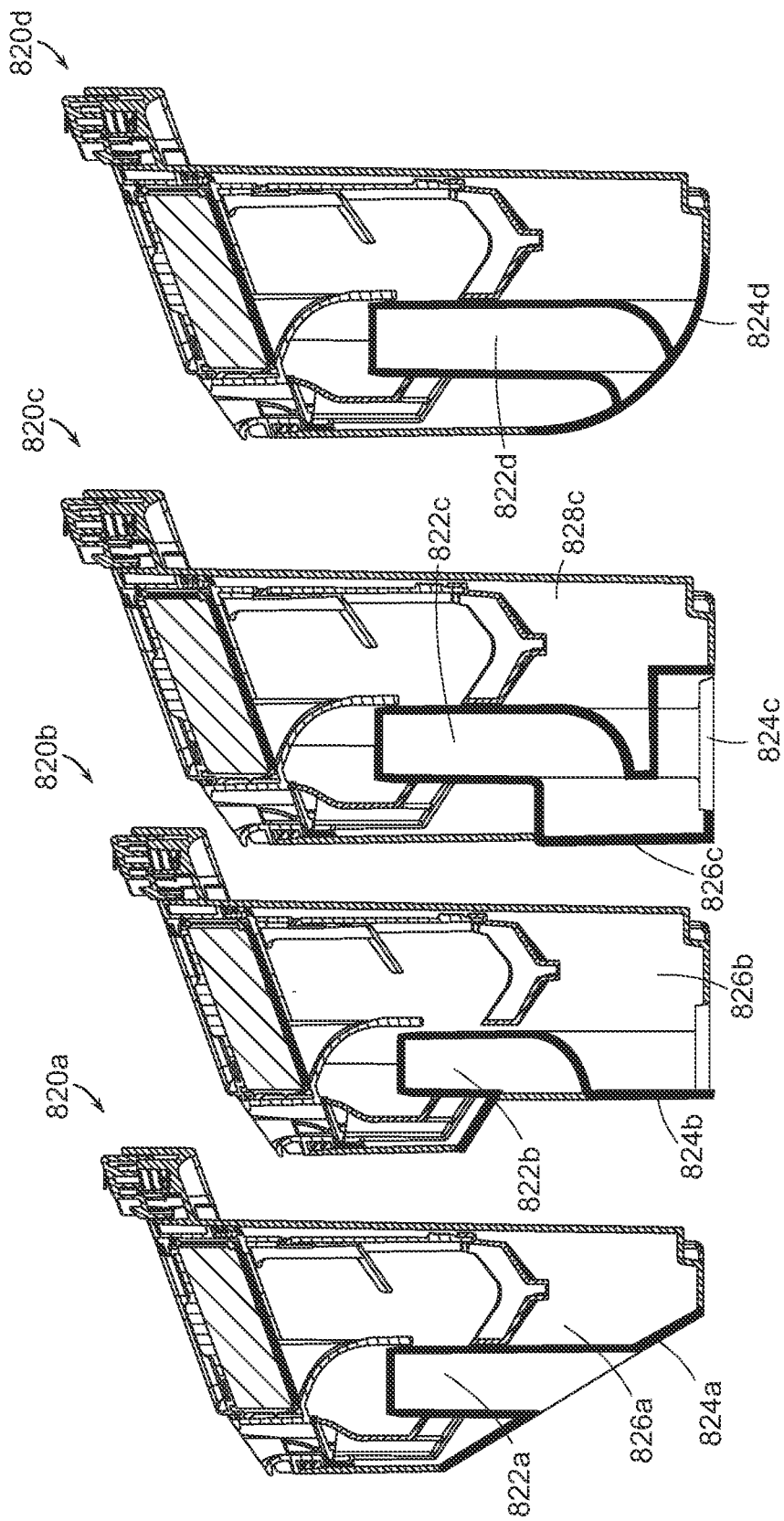
FIG. 18A is a left side view of the fluid supply tank of FIG. 12A, having a hollow standpipe according to another embodiment.
FIG. 18B is a left side view of the fluid supply tank of FIG. 12A, having a hollow standpipe according to another embodiment.
FIG. 18C is a left side view of the fluid supply tank of FIG. 12A, having a hollow standpipe according to another embodiment.
FIG. 18D is a left side view of a the fluid supply tank of FIG. 12A, having a hollow standpipe according to another embodiment.

FIG. 18A depicts a recovery tank 820a having a slanted lower sidewall 824a. The hollow standpipe 822a extends upward from the slanted sidewall 824a. FIG. 18B depicts a recovery tank 820b having a rear carve-out portion in a rear sidewall 824b thereof. The hollow standpipe 822b extends laterally from the rear sidewall 824b and protrudes into the container 826b in an upward manner, curving to compensate for the initial lateral extension. FIG. 18C depicts a recovery tank 820c having an irregularly shaped hollow standpipe 822c. The hollow standpipe 822c is shown extending into the container 828c from a bottom surface 824c thereof, before curving rearward at an approximate right angle. The hollow standpipe 822c extends along a rear sidewall 826c of the container 828c and then is depicted curving frontward before extending upward in a central portion of the container 828c. FIG. 18D depicts the recovery tank 820d having a similar configuration as recovery tank 820a, depicted in FIG. 18A, except that instead of a slanted lower sidewall, recovery tank 820d has a curved lower sidewall 824d from which the hollow standpipe 822d extends.

Figure 19B:
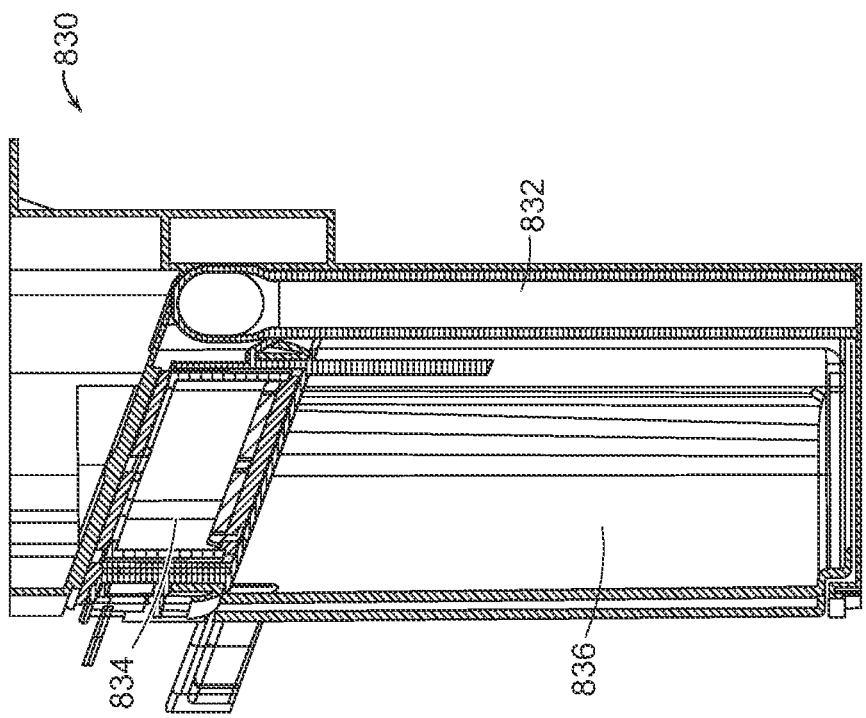
FIG. 19B is a right side view of the fluid supply tank of FIG. 19A.
Figure 19A:
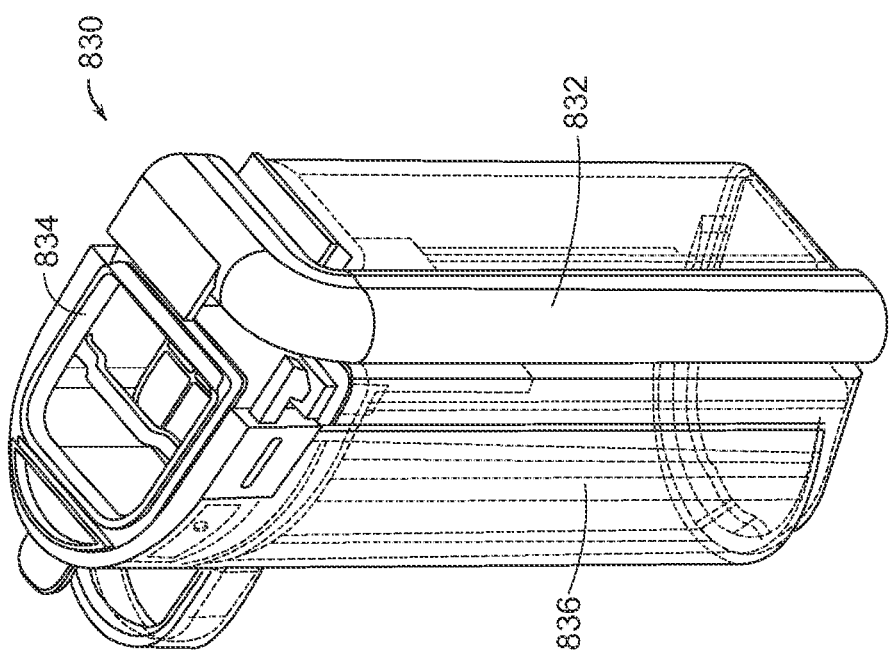
FIG. 19A is a right rear perspective view of another embodiment of a fluid supply tank having an external hollow standpipe.

FIGS. 19A-19B depict another embodiment of a recovery tank 830 having an external hollow standpipe 832. The hollow standpipe 832 is shown extending upward at a rear portion of the recovery tank 830 and then curving laterally such that it extends adjacent a rearward side of a lid 834. The hollow standpipe 832, like those described previously, can be in fluid communication with the interior of recovery tank 830, such that fluid and debris can be drawn therethrough to be deposited within the container 836. Although not shown in FIGS. 19A-19B, the recovery tank 830 can include a separator (e.g., separator 812), and the hollow standpipe 832 can be configured to deposit drawn-in fluid and debris onto the separator, to allow the drawn-in debris to be separated from the fluid.

Figure 20:
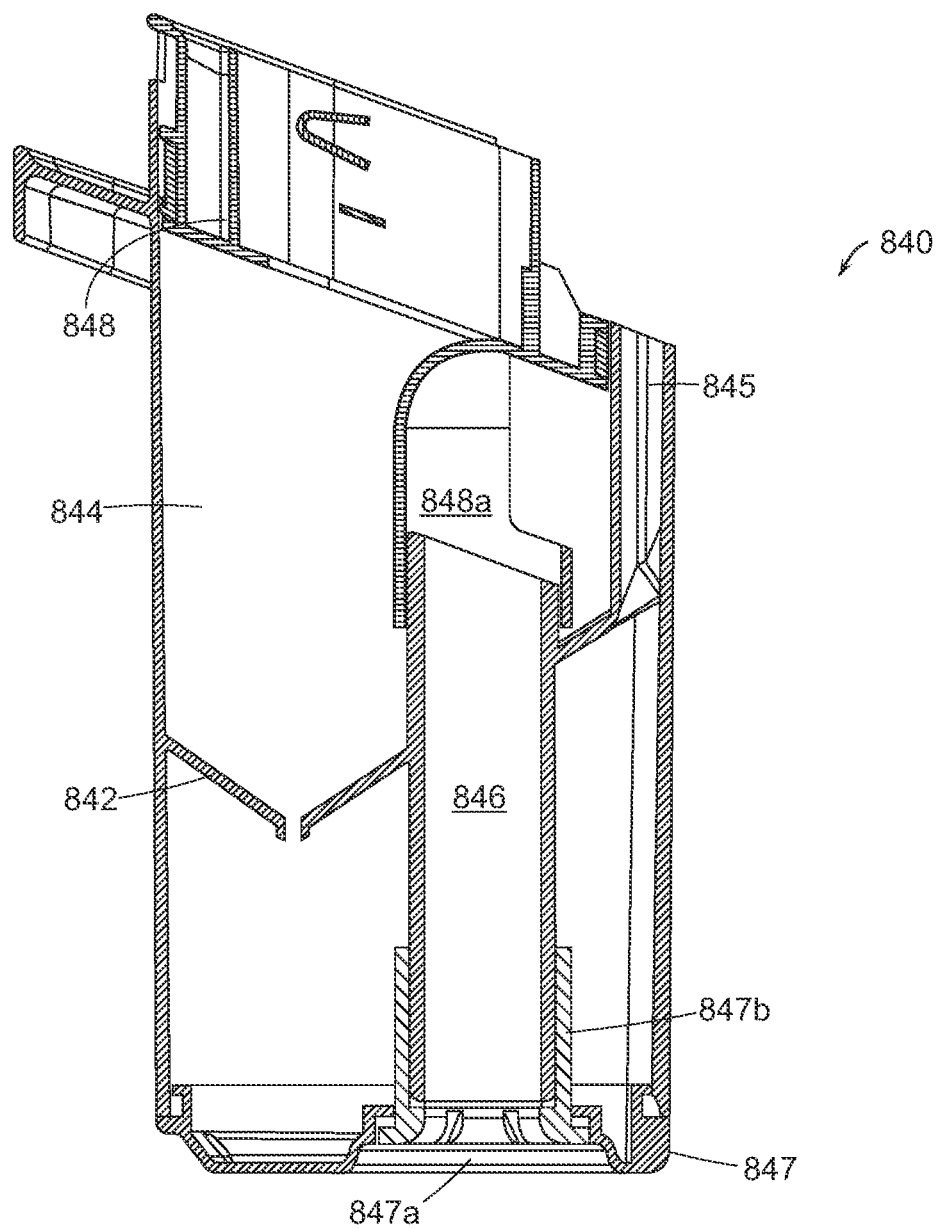
FIG. 20 is a right side view of another embodiment of a fluid supply tank having a fixed separator and an pivoting bottom.

FIG. 20 depicts another embodiment of a recovery tank 840. In this embodiment, the separator 842 is fixedly coupled to (e.g., unitary or integral with) the container 844 such that it cannot be removed from the container. As with prior embodiments, a hollow standpipe 846 can extend through the separator 842. However, the hollow standpipe 846 can be fixed to or integral with the separator 842. In this manner, the container 844, the separator 842, and the hollow standpipe 846 are integral with one another. The recovery tank 840 can also include a spout 845 disposed in the rear of the container 844, which can allow for the disposal of captured fluid and small debris from the container 844. A lid 848 can be removably coupled to the container 844 and can include a lower extension 848a extending downward over the hollow standpipe 846. The extension 848a can redirect fluid and debris drawn into the container 844 toward the hollow standpipe 846, thus preventing fluid and debris from flowing through the lid 848. The container 844 can also include a removable bottom 847 that can allow for access to the region of the container 844 beneath the separator 842. The removable bottom 847 can be attached to the container 844 in any number of ways, including a friction fit, a hinge, etc. The removable bottom 847 can include an intake port 847a with an upward extending collar 847b. The collar 847b can receive the hollow standpipe 846 therein and allow for the introduction of fluid and debris into the container therethrough.

In addition to dry cleaning modes, the cleaning device is also operable in wet cleaning modes which employ the use of a fluid supply tank, a fluid pump, spray nozzles, and deflectors, in addition to the vacuum assembly with subassemblies described previously. FIGS. 12A-15D illustrate components of a fluid assembly for use in wet cleaning modes and operations, such as a fluid supply tank 610, tubing 620, a fluid pump 622, a fluid application face 624, and spray nozzles 630

As explained above, the body housing 210 includes a second cavity on the upper front face 210b that is shaped to receive and retain a fluid supply tank 610. In the exemplary embodiment, as shown in FIGS. 12A-12F, the fluid supply tank 610 includes a valve cap 612 removably threaded to a fluid tank 614. The fluid tank 614 is divided into an upper tier 614a and a lower tier 614b, and each of the tiers 614a, 614b has a substantially hemi-cylindrical shape. The upper tier 614a is shaped to conform with the overall form of the body housing 210, providing an outer limit for the upper front face 210b of the body housing 210. The lower tier 614b is smaller than the upper tier 614a and is received internally within the body housing 210, occupying part of the second area. The fluid tank 614 further defines a hollow interior, which receives fluid to be supplied by the cleaning device 10 during a wet cleaning operation. The valve cap 612 of the fluid supply tank 610 is threadably coupled to the lower tier 614a, and it permits one-way flow of fluid therethrough—from the hollow interior of the fluid tank 614 to externally thereof. The valve cap 612 is sized to be received in the second cavity 210f of the body housing 210 in a complementary recess. When the valve cap 612 is properly seated in the second cavity, fluid is able to flow therethrough, and when the valve cap 612 is not properly seated, the valve cap 612 can act to seal the fluid within the fluid supply tank 610.

Figure 12A:
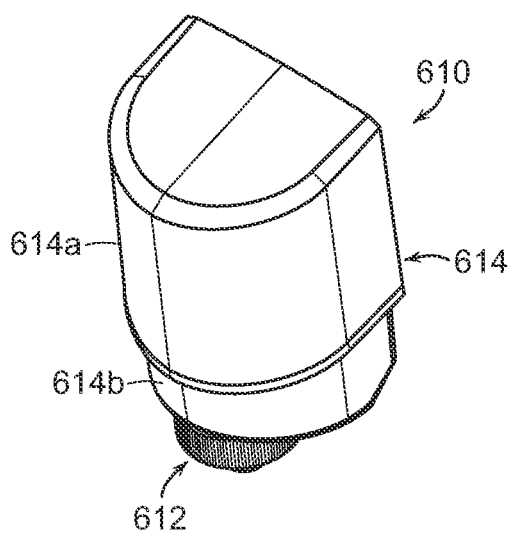
FIG. 12A is a front perspective view of a fluid supply tank of the cleaning device of FIG. 1A.
Figure 12B:
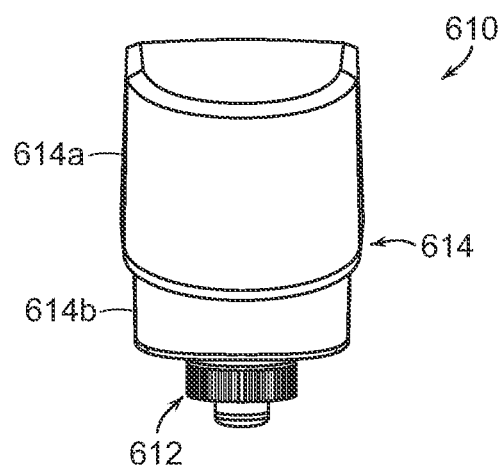
FIG. 12B is a front view of the fluid supply tank of FIG. 12A.
Figure 12C:
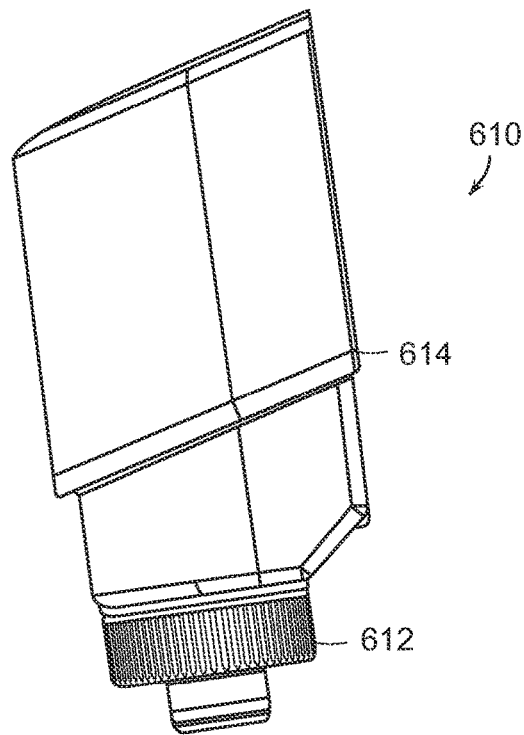
FIG. 12C is a right side view of the fluid supply tank of FIG. 12A.
Figure 12D:
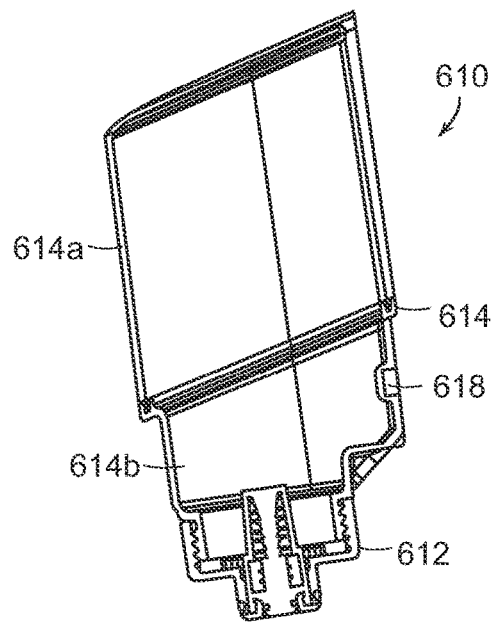
FIG. 12D is a cross-sectional side view of the fluid supply tank of FIG. 12A.
Figure 12E:
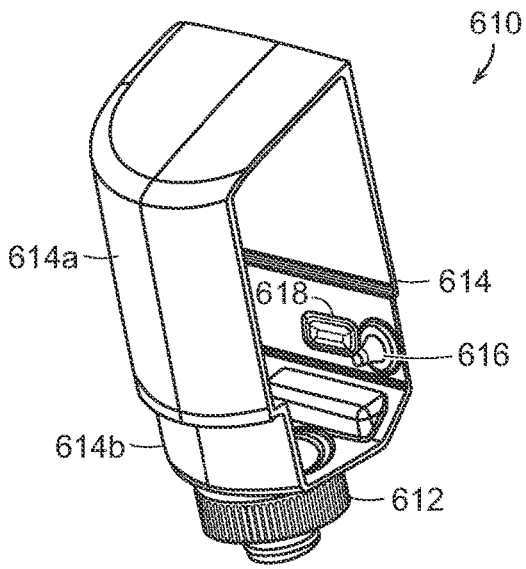
FIG. 12E is a front perspective cross-sectional view of the fluid supply tank of FIG. 12A.
Figure 12F:
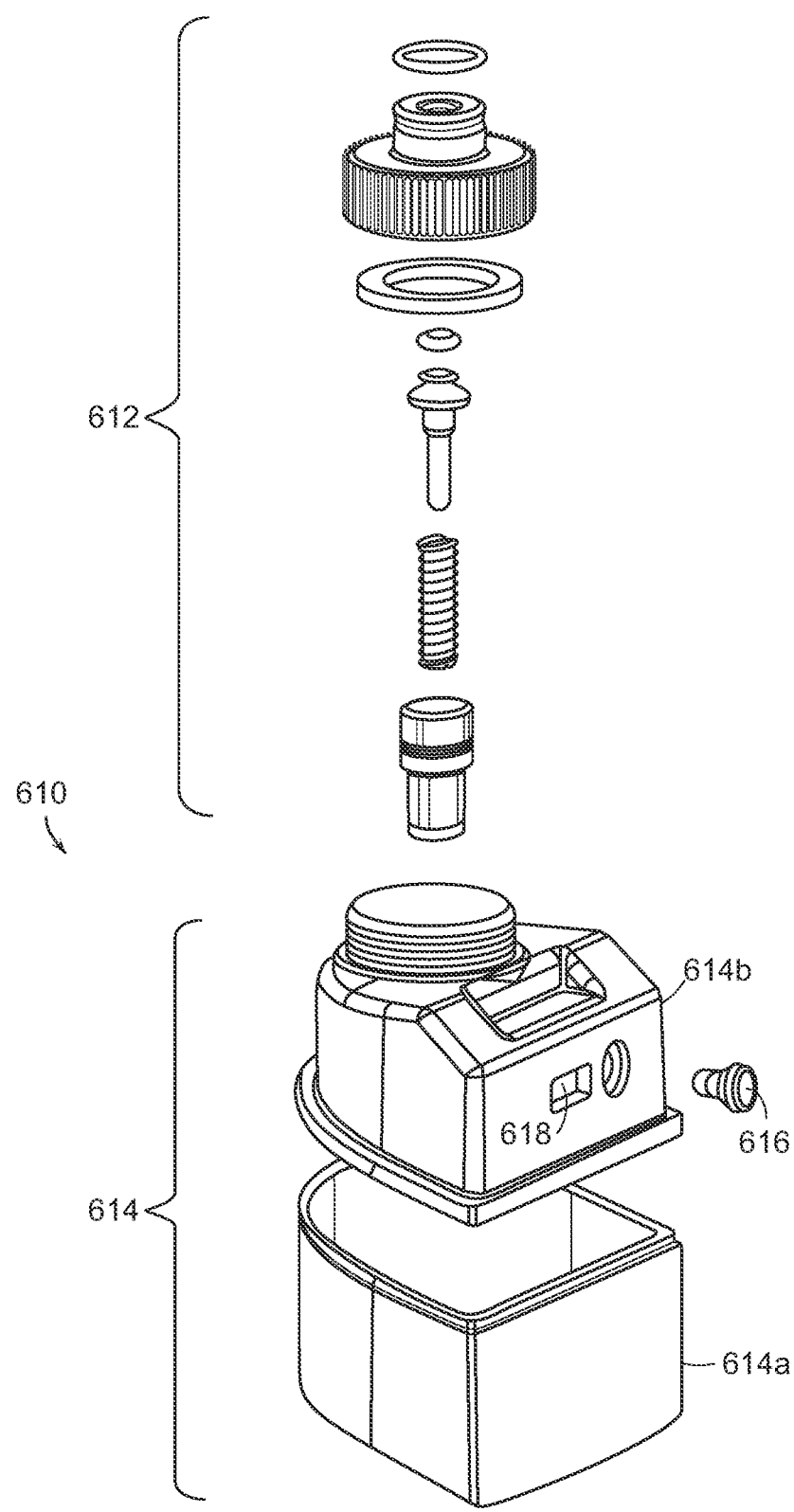
FIG. 12F is an exploded view of the fluid supply tank of FIG. 12A.

As shown in FIGS. 12E and 12F, the lower tier 614b can further include a bleeder valve 616 and a retention depression 618. As the fluid tank 614 empties of fluid, the bleeder valve 616 can allow for an equalization of pressure in the hollow interior to facilitate a constant supply of fluid to the cleaning device 10, without creating a vacuum within the hollow interior. The retention depression 618, in the exemplary embodiment, is a depression disposed in the lower tier 614b which is shaped to receive the tank engagement feature 211 on the body housing 210, introduced above and depicted in FIGS. 8A and 8B. As explained above, actuation of the fluid tank switch 212 will allow for the fluid supply tank 610 to be removed from the second area, and specifically, in the exemplary embodiment, actuation of the fluid tank switch 212 retracts the tank engagement feature 211 into the body housing 210 so that it no longer engages the retention depression 618.

FIGS. 13A-13I and 23 depict various components used in wet cleaning modes, including tubing 620, a fluid pump 622, and fluid application face 624, and spray nozzles 630. During a wet cleaning mode, fluid contained within the fluid supply tank 610 is expelled from the cleaning device 10 and onto a surface to be cleaned. When fluid leaves the fluid supply tank 610, it is transported through the cleaning device 10 in tubing 620. The tubing 620 connects to the fluid supply tank 610, travels down the body assembly 200, and then into the head assembly 100.

Figure 13A:
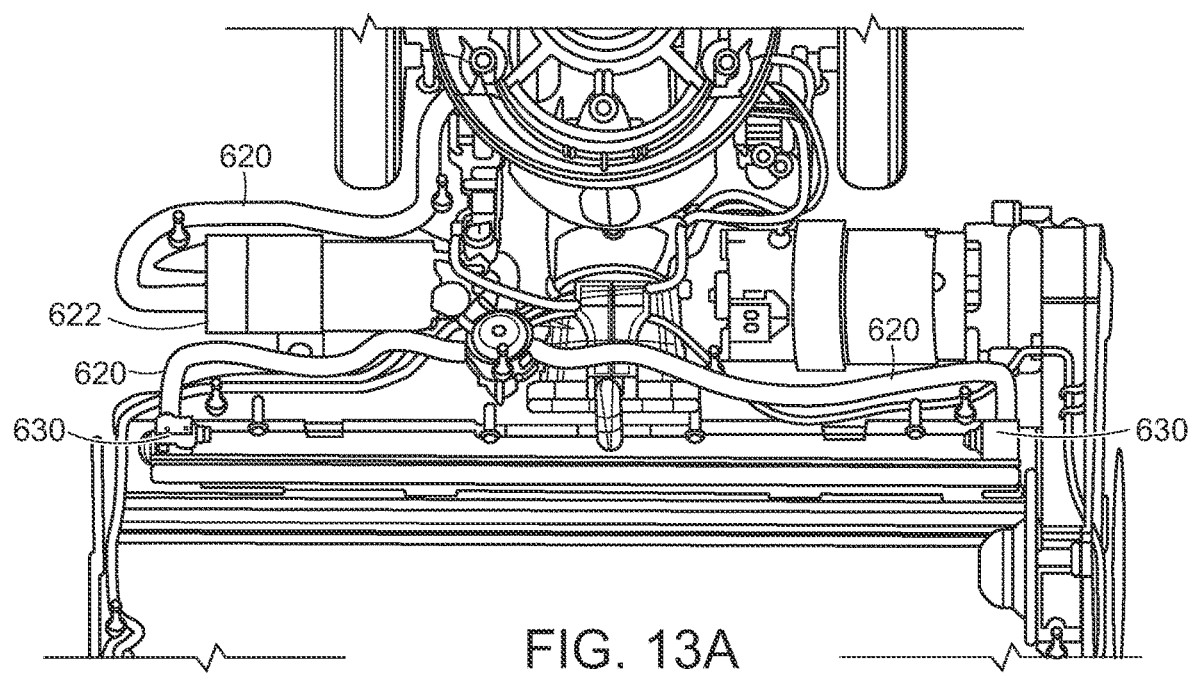
FIG. 13A is a top view of a head assembly having no upper housing and showing components used in wet vacuum modes.
Figure 13B:
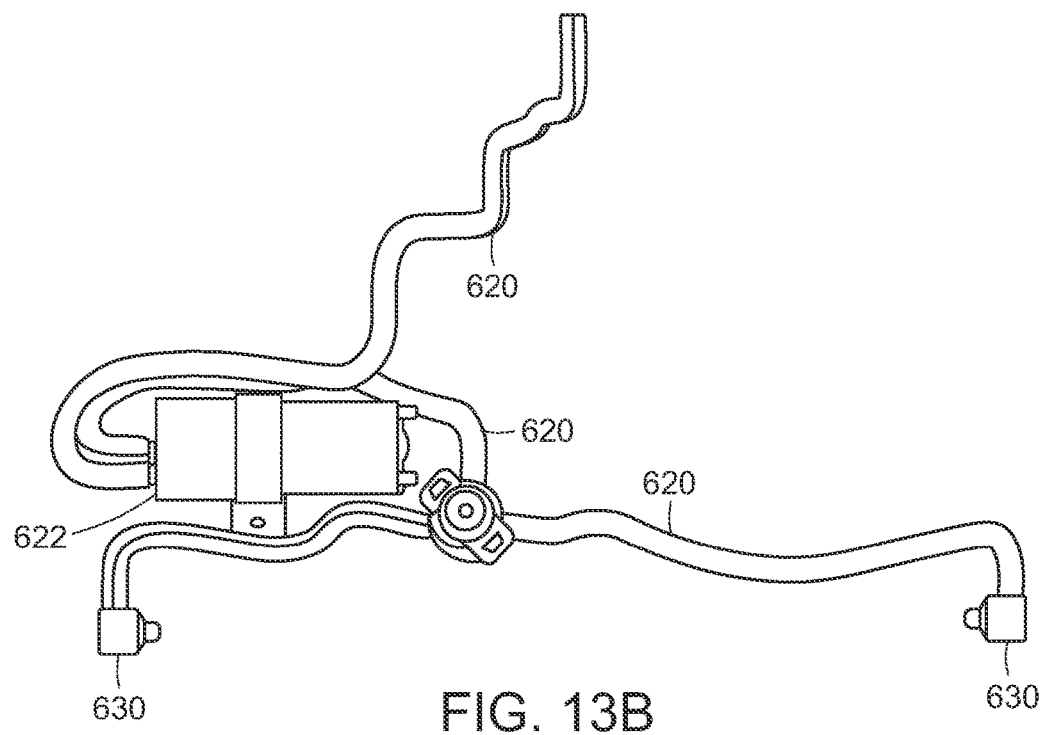
FIG. 13B is a top view of the tubing, fluid pump, and nozzles shown FIG. 13A.

FIG. 13A depicts an internal view of the head assembly 100 without the top side 110b of the head housing 110. FIG. 13B depicts only the tubing 620, the fluid pump 622, and the spray nozzles 630, which are all contained within the head assembly 100. The fluid pump 630 is configured to pump fluid from the fluid supply tank 610 through the cleaning device 10. The tubing 630 connects the fluid supply tank 610 to the pump 622 and then leaves the pump 622 before splitting and finally connecting to the left and right spray nozzles 630L, 630R disposed on the fluid application face 624 of the head assembly 100, as discussed above. Therefore, in this configuration, the fluid supply tank 610 is in fluid communication with the left and right spray nozzles 630L, 630R by way of the fluid pump 622 and tubing 620. Operation of the cleaning device 10 during wet cleaning modes will be described in greater detail below.

Figure 13C:
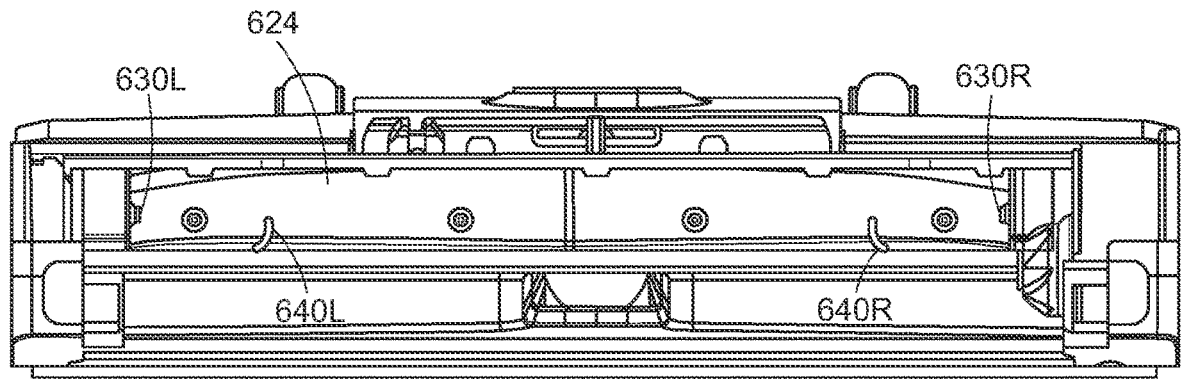
FIG. 13C is a front view of the application face of the head assembly of FIG. 13A.

As previously explained and as shown in FIG. 13C, the head assembly 100 includes a fluid application face 624 disposed on a front side 110e thereof. The fluid application face 624 is mounted to an upper portion of the front side 110e of the head housing 110, and it spans a substantial width of the head housing between the left and right spray nozzles 630L, 630R. The face 624 is substantially cylindrical and concave in shape, protruding slightly toward a middle of the face 624. When viewed from a side perspective, such as seen in a partial cross-sectional view of FIG. 13I, the face 624 is concave enough to allow for the left and right spray nozzles 630L, 630R to be fully contained within the resulting depression.

Also contained on the fluid application face 624 are left and right deflectors 640L, 640R. Each deflector can be in the form of a projection extending generally perpendicular to the application face 624. Both of the left and right deflectors 640L, 640R are shown as having a curved configuration, curving away from the spray nozzles 630L, 630R, however the deflectors can be planar or they can have alternative shapes and orientations in other embodiments. In the illustrated embodiment, the left and right deflectors 640L, 640R are molded directly onto the fluid application face 624. In other embodiments, these deflectors could be removably attached to the fluid application face 624, or may be attached—either molded or removably so—to another feature. The left and right deflectors 640L, 640R are at least partially disposed in the spray paths of the left and right spray nozzles 630L, 630R respectively so that, during a cleaning operation, the deflectors 640L, 640R are impacted by sprayed fluid. In an exemplary embodiment, the deflectors 640L, 640R are positioned a distance from each spray nozzle 630L, 630R that is sufficient to allow fluid spray from the spray nozzles to encounter the deflectors and to be deflected back toward the end of the brushroll, thus aiding in delivering fluid to the ends of the brushroll.

Figure 13D:
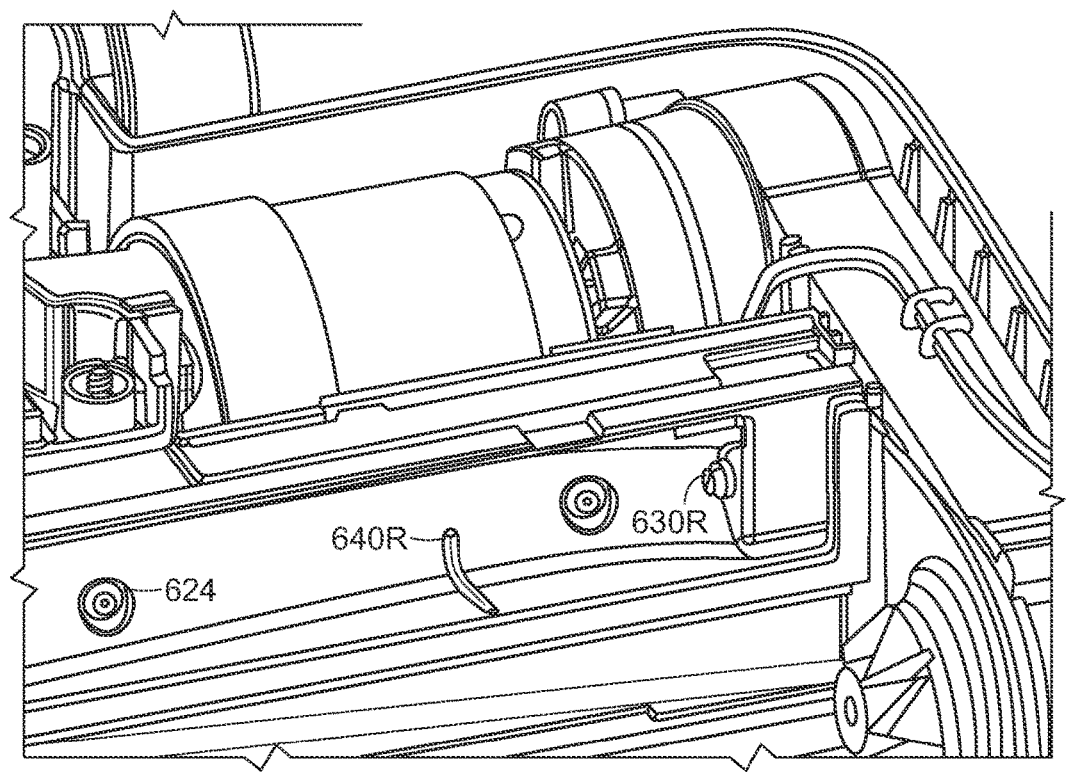
FIG. 13D is a partial front perspective view of a right side of the head assembly of FIG. 13A, having a brushroll removed.
Figure 13E:
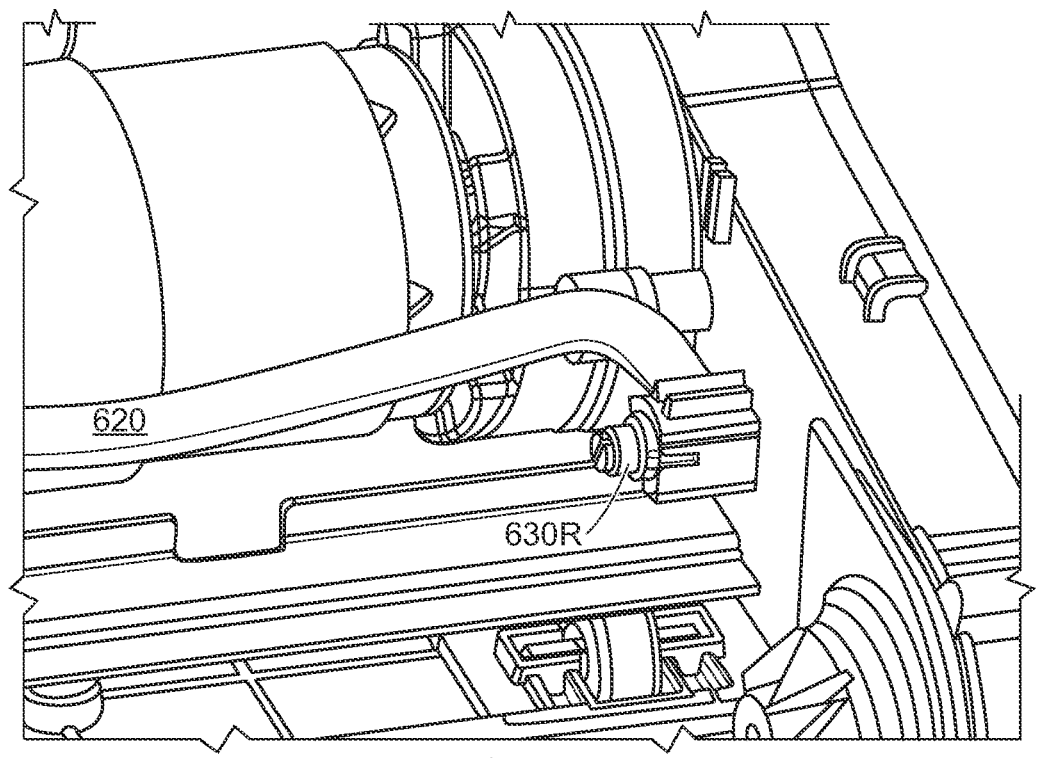
FIG. 13E is a partial front perspective view of the right side of the head assembly of FIG. 13A, having an application face removed.
Figure 13F:
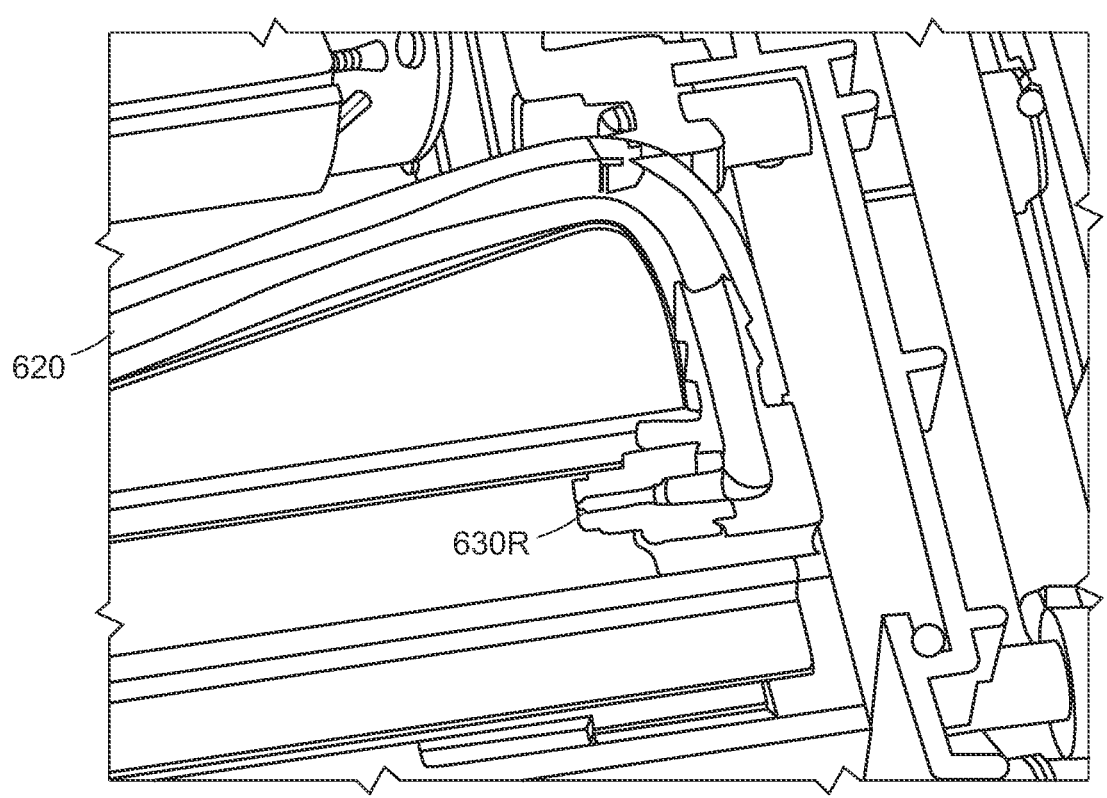
FIG. 13F is a partial cross-sectional view of the right side of the head assembly of FIG. 13A.
Figure 13G:
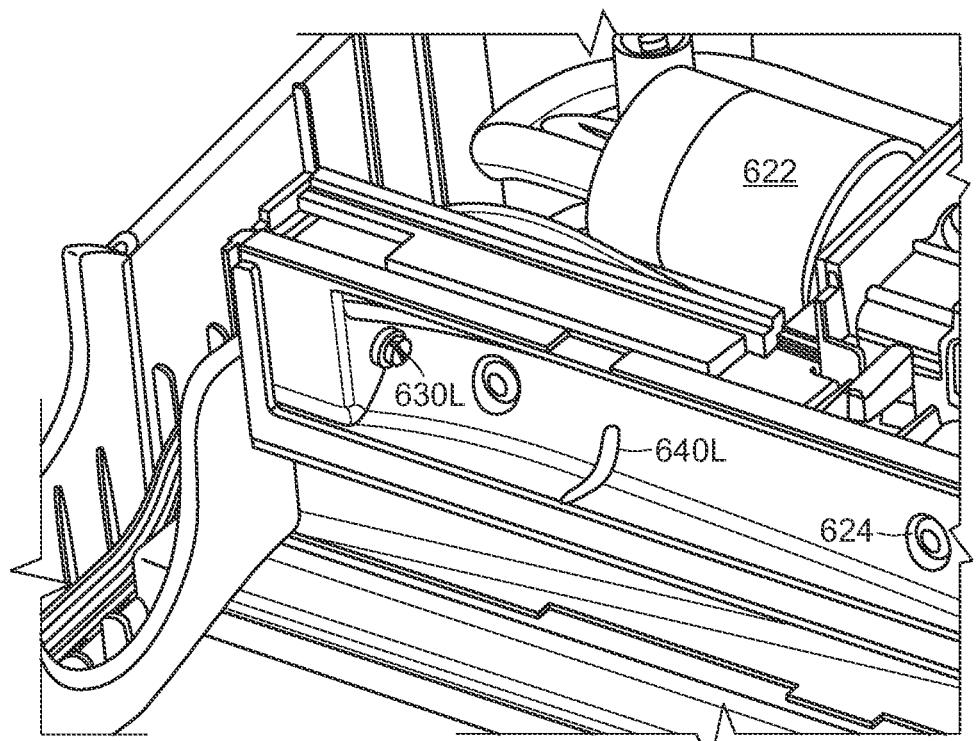
FIG. 13G a partial front perspective view of the left side of the head assembly of FIG. 13A
Figure 13H:
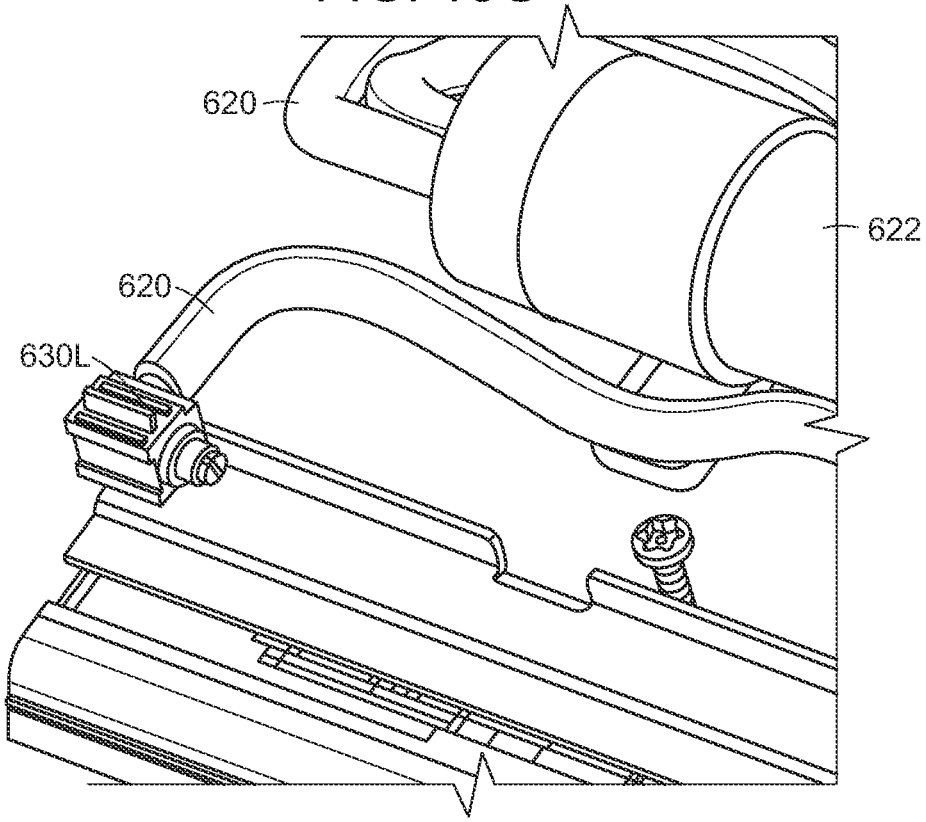
FIG. 13H is a partial front perspective view of the left side of the head assembly of FIG. 13A, having the application face removed.
Figure 13I:
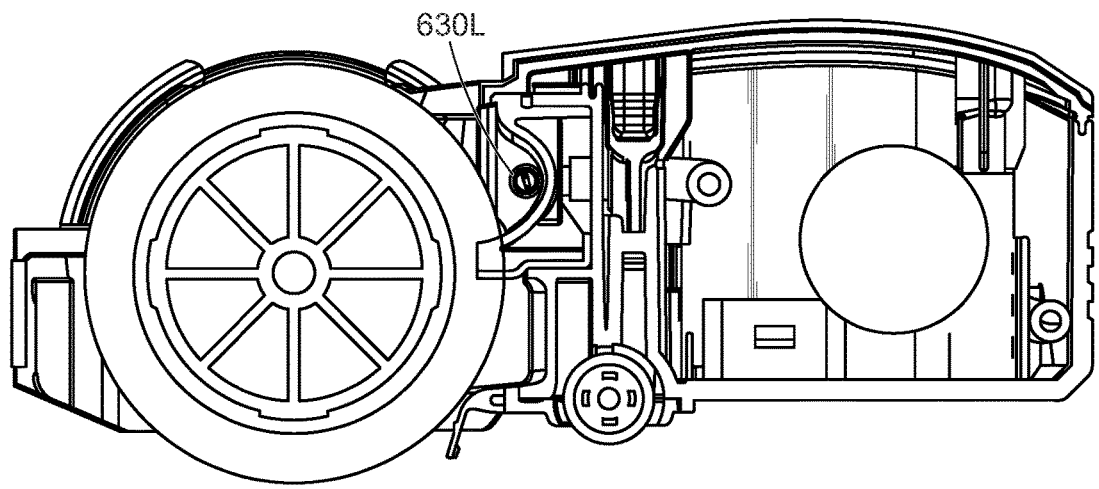
FIG. 13I is a front view of the application face of the head assembly of FIG. 13A.
Figure 14A:
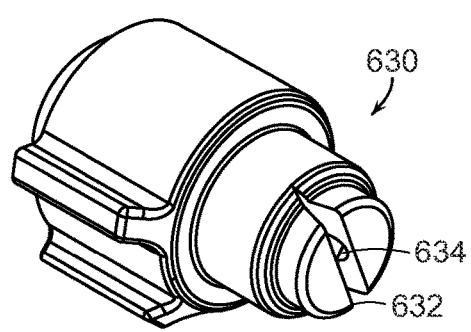
FIG. 14A is a front perspective view of a spray nozzle of the cleaning device of FIG. 1A.
Figure 14B:
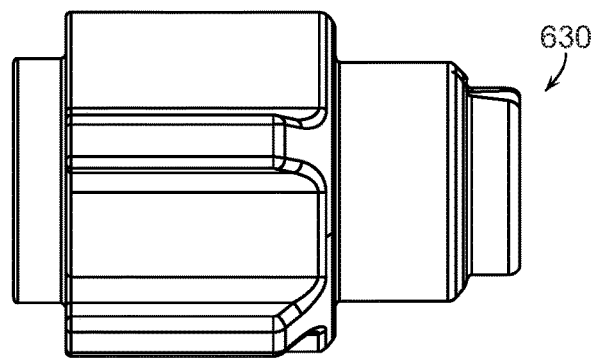
FIG. 14B is a right side view of the spray nozzle of FIG. 14A.
Figure 14C:
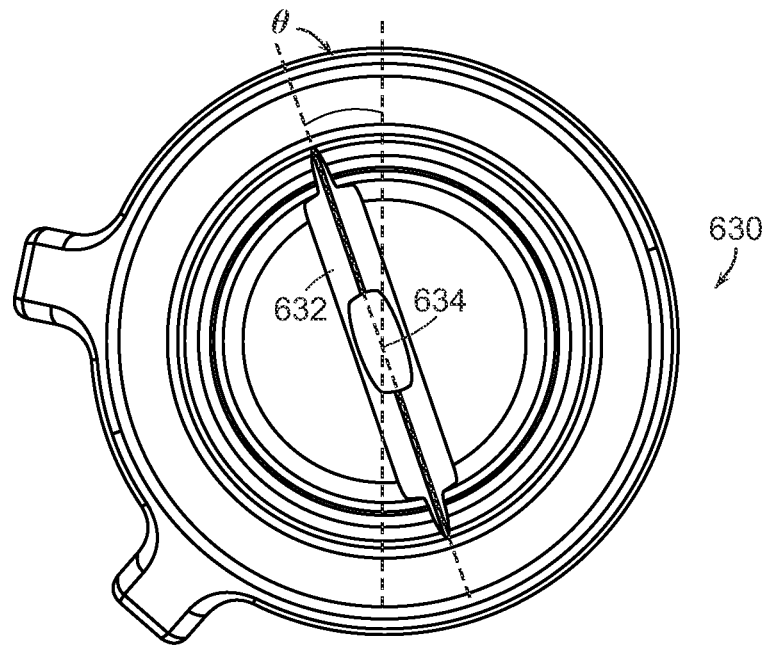
FIG. 14C is a front view of the spray nozzle of FIG. 14A.
Figure 14D:
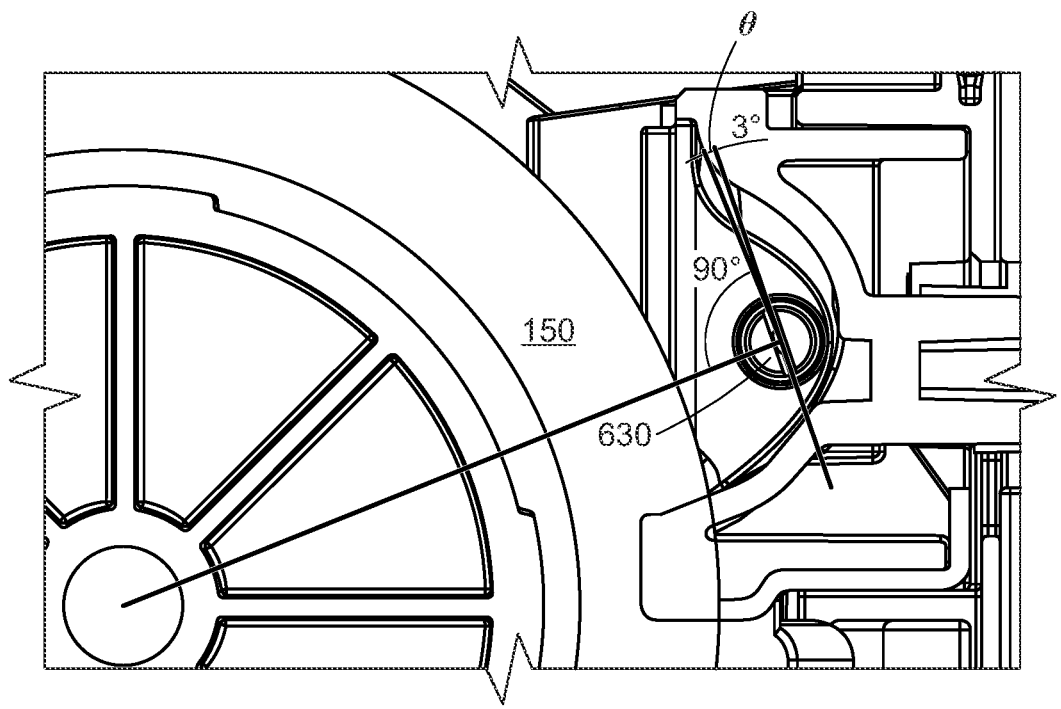
FIG. 14D is a partial cross-sectional view of a head assembly including the spray nozzle of FIG. 14A.

The left and right spray nozzles 630L, 630R protrude from the fluid application face 624 and are generally aimed inward at each other, while also being aimed toward the brushroll 150. In an exemplary embodiment, each of the left and right spray nozzles 630L, 630R is substantially similar, and as such, description will be made to only one spray nozzle 630 in a general manner. FIGS. 13D-13F show the right side of the head assembly 100, including the fluid application face 624, right spray nozzle 630R, and tubing 620, while FIGS. 13G-13I show the left side of the head assembly.

Figure 23:
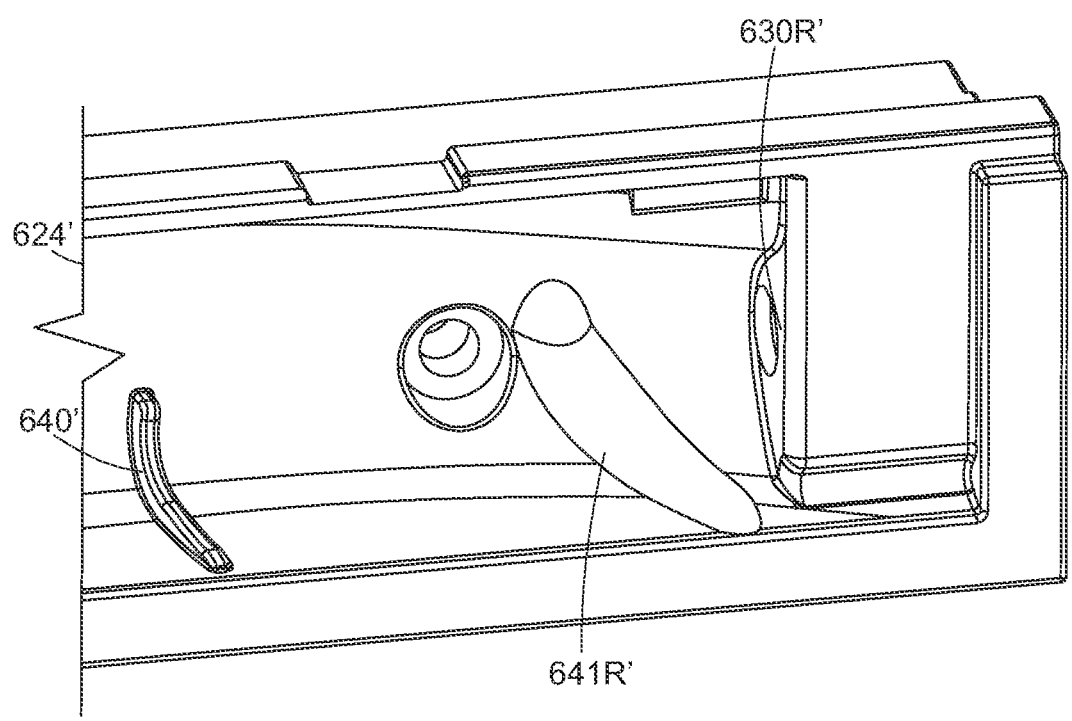
FIG. 23 is a partial perspective view of a fluid application face according to another embodiment.

FIG. 23 depicts a portion of a fluid application face 624' according to another embodiment. The fluid application face 624' can function similarly to the fluid application face 640, through the cooperation of the right spray nozzle 630R' and the right deflector 640R', however the fluid application face 624' can include a secondary right deflector 640R' mounted thereon. The secondary right deflector 641R' is depicted in FIG. 23 as being larger than the right deflector 640R' and is also depicted as being positioned closer to the right spray nozzle 630R' than the right deflector 640R'. However, the specific form and location of the secondary right spray nozzle 640R' could vary. In operation, the right spray nozzle 630R' and the secondary right spray nozzle 641R' can operate to redirect fluid emitted by the right spray nozzle 630R'. The secondary right spray nozzle 641R' can be configured to direct additional fluid to a periphery of a brushroll.

FIGS. 14A-14D depict a spray nozzle 630 according to an embodiment. The spray nozzle 630 has a generally cylindrical form and includes a discharge port 632 in fluid communication with the fluid supply tank 610 and through which fluid is emitted. The discharge port 632 itself is wedge-shaped with a central hole 634, and this arrangement creates a planar, fan-shaped spray pattern when fluid is emitted from the discharge port 632. This planar, fan-shaped pattern can, in some embodiments, be between 5°-60°. In other embodiment, the fan-shaped pattern can be between 10°-50°. In still other embodiments, the fan-shaped pattern can be between 15°-45°.

In some embodiments, the discharge port 632 can be rotated such that a spray angle θ is offset from a vertical axis by a few degrees. This offset can be anywhere from 1°-30° in either the clockwise or counter-clockwise orientation. In some embodiments, the offset is between 5°-25°. In still other embodiments, the offset is between 10°-20°. In the exemplary embodiment, the discharge port of the left spray nozzle is shown rotated approximately 15° counterclockwise from a vertical orientation. The spray nozzle 630 can also be aligned with a plane tangential to the surface of the brushroll 150 at a point on the brushroll 150 closest to the spray nozzle 630, such that the angle of offset and the tangential plane would be substantially parallel, in order to maximize fluid coverage onto the brushroll 150. The angle of offset ϕ could also vary by several degrees in either direction, and in some embodiments may vary by as many as 1°, 2°, 3°, 4°, or 5° from the tangential plane. An exemplary view of the spray nozzle 630 with a spray angle skewed from the tangential plane is shown n FIG. 14D.

FIGS. 15A-15D depict a fluid application face 650 with built-in spray nozzles 652 according to another embodiment.

Figure 15A:
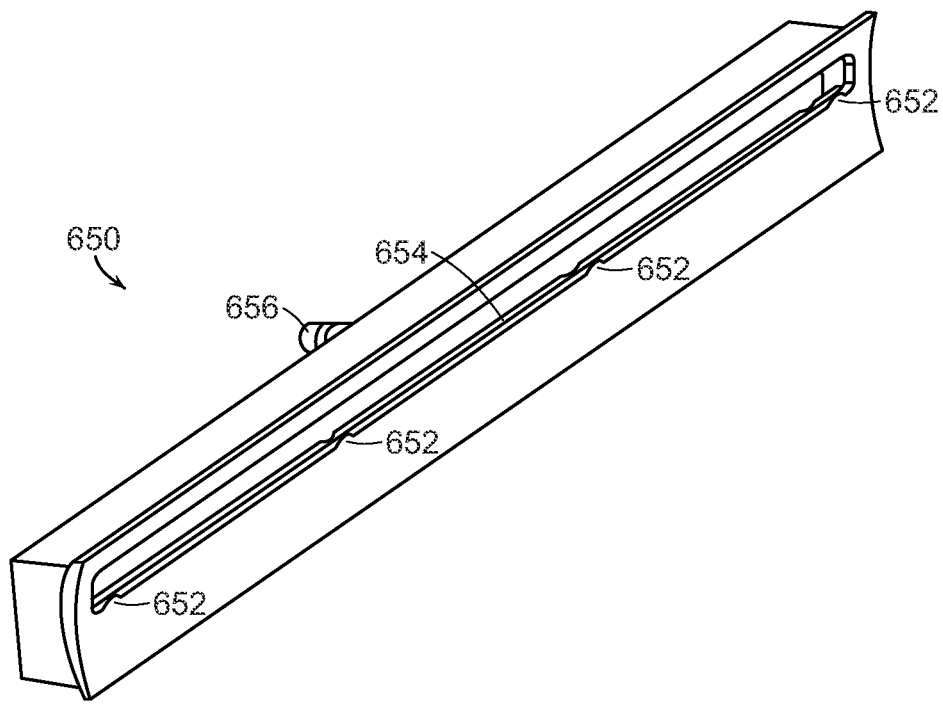
FIG. 15A is a front perspective view of an alternative embodiment of an application face.
Figure 15B:
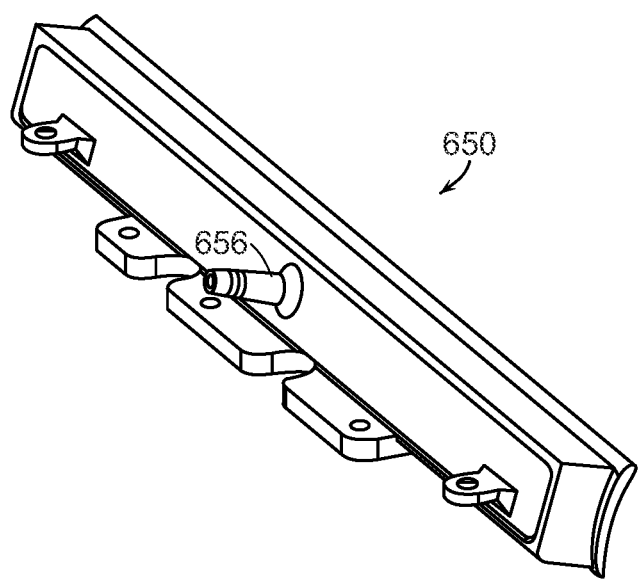
FIG. 15B is a rear perspective view of the application face of FIG. 15A.
Figure 15C:
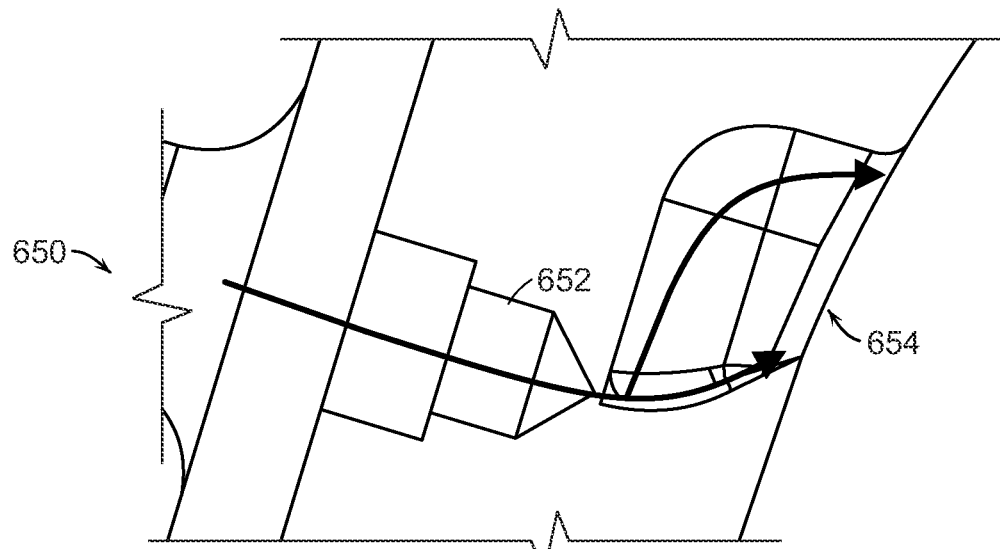
FIG. 15C is a partial cross-sectional view of the application face of FIG. 15A.

The fluid application face 650 is shown in FIG. 15A, and it includes a single outlet 654 extending nearly the entire width of the face. At a rear side of the fluid application face 650 is a port 656 that is able to connect with tubing (not pictured) in order to fluidly couple the fluid application face 650 to a fluid path. Nested within the outlet 654 on the front side are spray nozzles 652 spaced evenly at the outlet 654, and they are configured to output fluid along a path as shown in FIG. 15C. In an exemplary embodiment, four spray nozzles 652 are dispersed evenly across the width of the outlet, however in other embodiments, the number of spray nozzles 652 and their positions can vary so that they are evenly or unevenly spaced. The spray nozzle 652 introduces fluid into the outlet, and the fluid flows in a path defined by the rounded contours of the outlet 654 before being emitted in a direction aimed toward a brushroll 150. The supplied fluid volume can be large enough that fluid flows laterally within the outlet 654 and is therefore applied to a brushroll 150 from an entirety of the width of the outlet 654 in order to evenly coat the brushroll 150 with fluid, thereby preventing streaking during a cleaning operation.

Figure 15D:
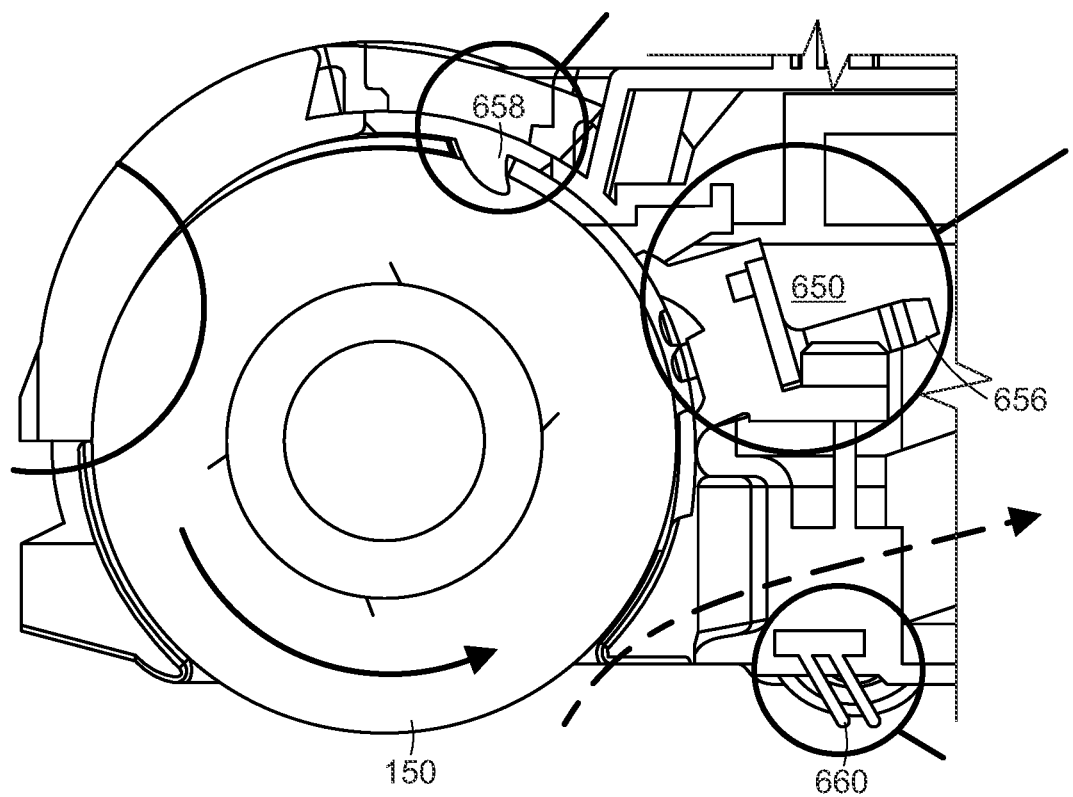
FIG. 15D is a partial cross-sectional view of a head assembly including the application face of FIG. 15A.

FIG. 15D depicts a partial cross-section of a head assembly having the fluid application face 650 therein. In the illustrated embodiment, a comb 658 is disposed proximate to the brushroll 150. During a cleaning operation, as the brushroll 150 rotates, the brushroll 150 may capture and pick up fibrous material. As the brushroll 150 rotates, if allowed, the fibrous material can become entwined around the brushroll 150 and interfere with the cleaning capabilities of the cleaning system 10. The presence of the comb 658 assists in capturing fibrous material to prevent entwinement with the brushroll 150, which then allows an operator to remove the captured material. Also depicted in FIG. 15D is another embodiment of a rubber guide 660, similar to the embodiment described above. While not shown, the comb 658 can be disposed on the brushroll cover 140 of FIGS. 5A and 5B, or on any embodiment presented herein.

Figure 21:
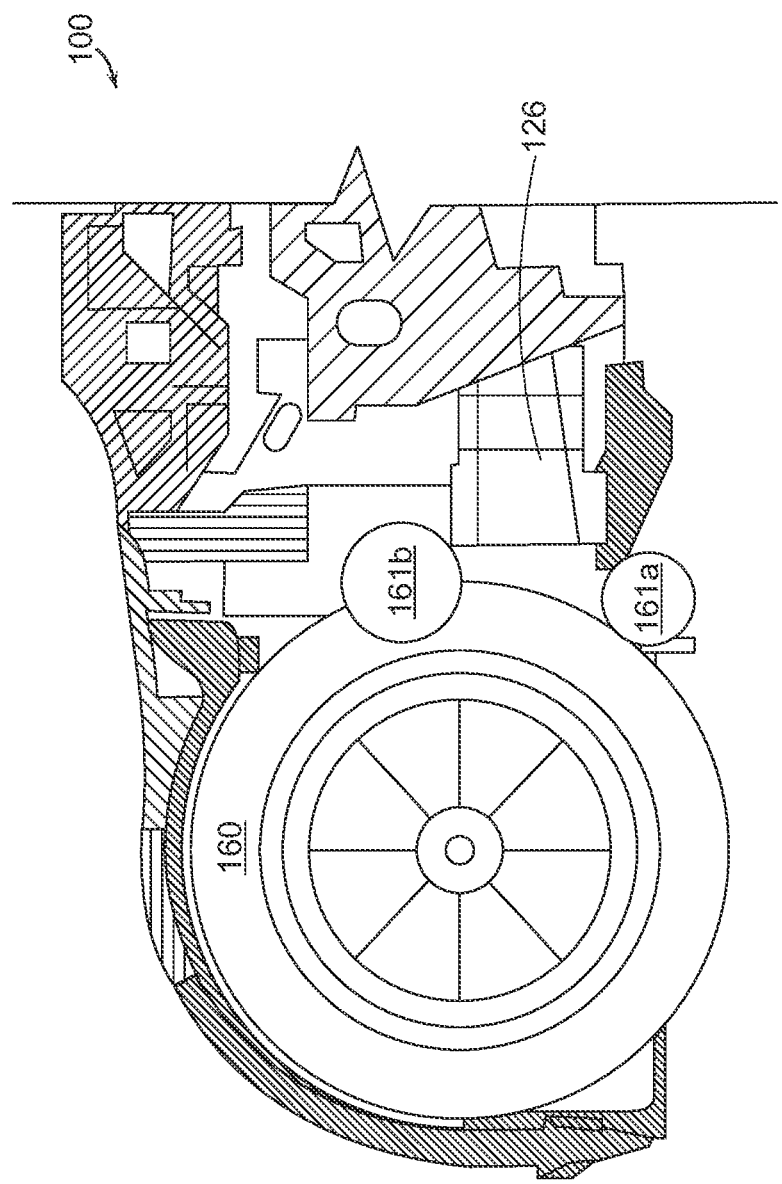
FIG. 21 is a partial cross-sectional view of a head assembly having a passive roller according to another embodiment.

In another embodiment, the head assembly 100 can include at least one passive roller. FIG. 21 illustrates a first passive roller 161a and a second passive roller 161b, although one or the other may be used in place of both passive rollers 161a, 161b. The passive rollers 161a, 161b are substantially cylindrical and can be freely rotatable about central axes thereof. The first and/or second passive roller 161a, 161b can be configured to remove fluid from a surface and redirect it to a position where it can be drawn into the head assembly 100. The first and/or second passive rollers 161a, 161b can also be configured to remove excess fluid from the brushroll 160. The first passive roller 161a is shown disposed near a floor surface, while the second passive roller 161b is shown positioned near the central intake 126. However, these locations can vary depending upon various arrangements of components as described herein.

Figure 22:
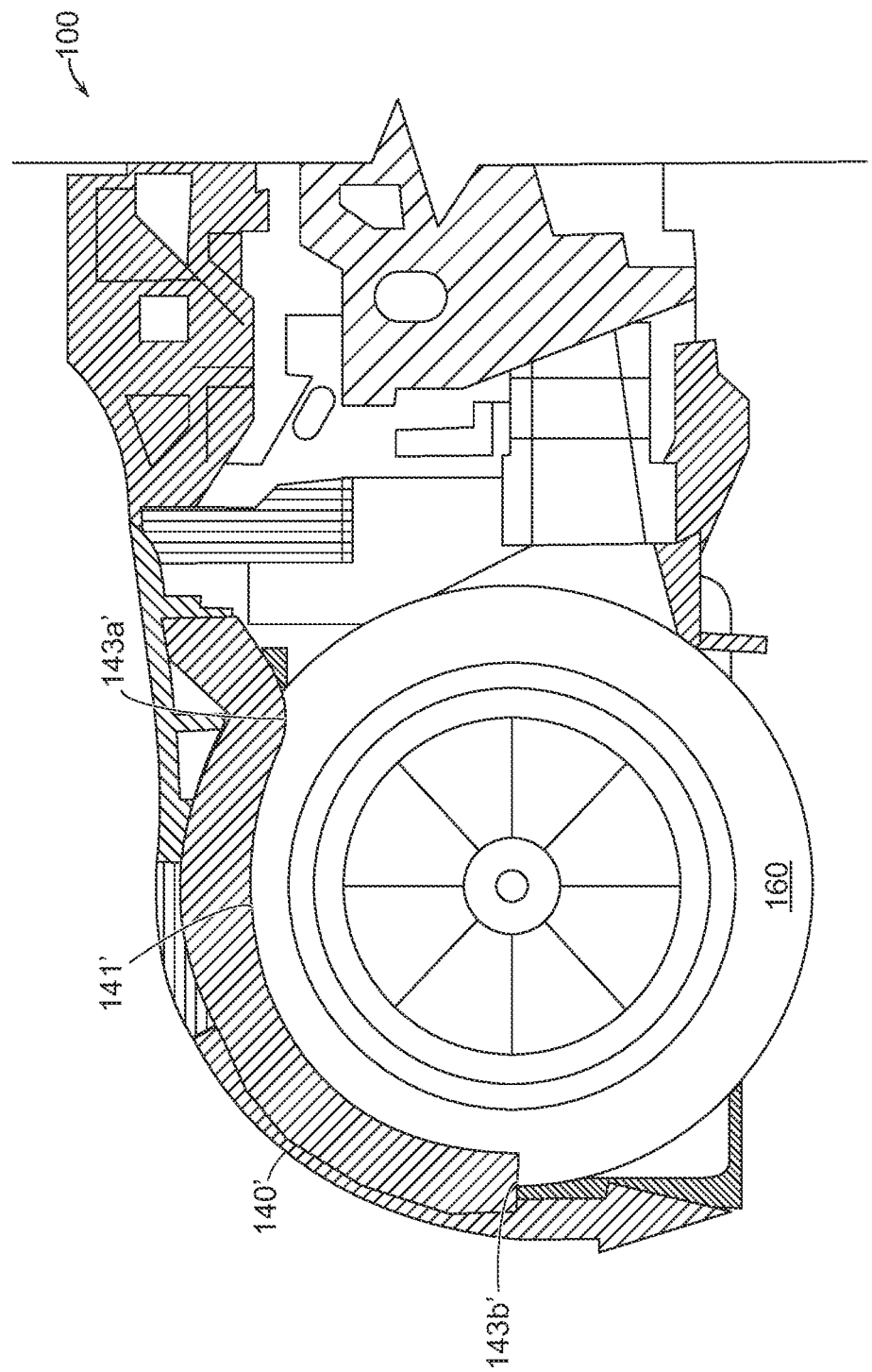
FIG. 22 is a partial cross-sectional view of a head assembly having a brushroll cover with an arcuate inner extension.

In another embodiment, the brushroll cover can aid in removing excess fluid from the brushroll. FIG. 22 depicts the head assembly 100 including a brushroll cover 140' having an arced inner wall extension 141. The extension 141 can extend toward and into contact with the brushroll 160 to assist in the removal of excess fluid and debris trapped by the brushroll 160 itself during a cleaning operation. While the extension 141 is shown in FIG. 22 having leading and trailing edges 143a, 143b, the extension 141 can also gradually taper away from the brushroll 160.

In operations employing the fluid mode, such as in the wet vacuum modes referenced above, fluid is applied to elements of the device, a surface to be cleaned, or a combination thereof, in order to aid in dirt and waste removal.

Wet cleaning modes can be activated through actuation of a wet cleaning switch 662, which in one embodiment can be located on the top side of the body housing 210. In order to prepare for cleaning in such modes, the fluid supply tank 610 is filled with a fluid and retained within the body housing 210. The cleaning device 10 can operate normally in a dry cleaning mode in which the vacuum assembly 400 is employed to suction in dirt and debris, but upon actuation of the wet cleaning switch 662, the cleaning device 10 will also begin to emit fluid to aid in the cleaning process.

In an exemplary embodiment, fluid is pumped out of the fluid supply tank 610 by the fluid pump 622 and is forced through the tubing 620 and out of the left and right spray nozzles 630L, 630R. The spray nozzles 630L, 630R are directed toward the brushroll 150 in order to spray a central region of the brushroll 150 with fluid. Some of the sprayed fluid is also directed at the deflectors, which as indicated above will deflect the sprayed fluid onto a different region of the brushroll 150, such as an outer region on the left and right sides adjacent the central region. In this way, the brushroll 150 can be substantially and evenly coated by fluid emitted from the spray nozzles 630L, 630R. When the coated brushroll 150 spins over a cleaning surface, the rotation of the brushroll 150 and the emitted fluid can work together to loosen dirt and debris from the surface. Once the dirt and debris is loosened, it mixes with the emitted fluid and creates a slurry which can then be suctioned into the cleaning device 10 through the central intake 126. From the central intake 126, the slurry travels up the hosing 230 and into the container 422 of the recovery tank 420 via the standpipe 424 where it can then be separated into basic components with the separator 440. The slurry will travel down the sloped portions of the separator and through the drain 442. Larger debris will be captured by the ridges of the drain 442, while smaller debris and fluid will fall to the bottom of the container 422. As the slurry enters the container 422 through the standpipe 424, any particulates and fluid which enter with excessive velocity will impact the deflector 640 and be redirected toward the rear of the container 422 and eventually toward the drain 442. The slurry will undergo separation, with the fluid and smaller particles passing through the drain 442 and the larger particles being retained by the ridges 446.

When the fluid level detectors 449a, 449b sense that the fluid in the container 422 has reached the max level, an indicator will appear on the body assembly 200 indicating that the fluid must be emptied. In one embodiment, the cleaning device 10 can indicate that the fluid level has reached the max level by providing a red water droplet on the cleaning device 10. The indicator can appear anywhere on the cleaning device 10, and, for example, may appear on the top side 210d of the housing body 210. At this point, the latch assembly 470 of the recovery tank 420 can be actuated, and the recovery tank 420 can be removed from the first cavity within the body housing 210. Without needing to remove the lid, any waste in the bottom of the container 422 can be emptied through the spout 450 in the top of the recovery tank 420. The container 422 can be tipped to guide the retained fluid toward the rear of the container 422, closer to the channel 451. To continue disposal, the container 422 can be tipped further to allow fluid to flow through the channel 451 and out the spout 450, all while larger particles and debris retained by the separator 440 remain within the container 422, unable to be disposed with the fluid. Once waste in the bottom of the container 422 has been emptied, the separator 440 can be removed from the container 422. Larger particles captured by the separator 440, which were too large to end up in the bottom of the container 422, will be removed with the separator 440. These larger particles can then be disposed of.

During a wet cleaning operation, the fluid supply tank 610 can run low or run out of fluid. When the supply of fluid reaches a low point, such as when the fluid supply tank 610 is empty, the cleaning device 10 will be prevented from operating in a wet cleaning operation. If this happens, an alert can be presented on the device 10 that the fluid supply tank 610 must be refilled before a wet cleaning operation can begin, or, if one was in progress, can continue. In some embodiments, the alert can use the same water droplet as is used to indicate a max fluid level has been reached. In other embodiments, when indicating that the fluid supply tank 610 has run low, the water droplet can appear to pulse in a blue color, indicating that the fluid supply tank requires additional fluid. Once the fluid supply tank 610 is refilled, the cleaning device 10 can continue in the wet cleaning operation as before, or it may begin a new wet cleaning operation.

In other embodiments, as shown in FIGS. 16A-16G, a charging mat 700 can be provided for use with the cleaning device 10. The illustrated charging mat 700 includes a substantially square base 710 with a depressed region 720 in the center. The depressed region 720 can be sized to correspond to the bottom of the head assembly 100, and it can support the cleaning device 10 therein. The depressed region 720 can also include areas to receive the large and small wheels 112, 114, the brushroll in use, such as brushroll 150 or brushroll 160, and the overall head housing 110. The charging mat 700 can also include accessory holders 730 at a rear thereof, which can act as receptacles to receive attachments for the cleaning device 10. These attachments vary, and can include replacement brushrolls, such as brushroll 150 and brushroll 160, and other tools for cleaning. In some embodiments, the accessory holders 730 may not be included.

Figure 16A:
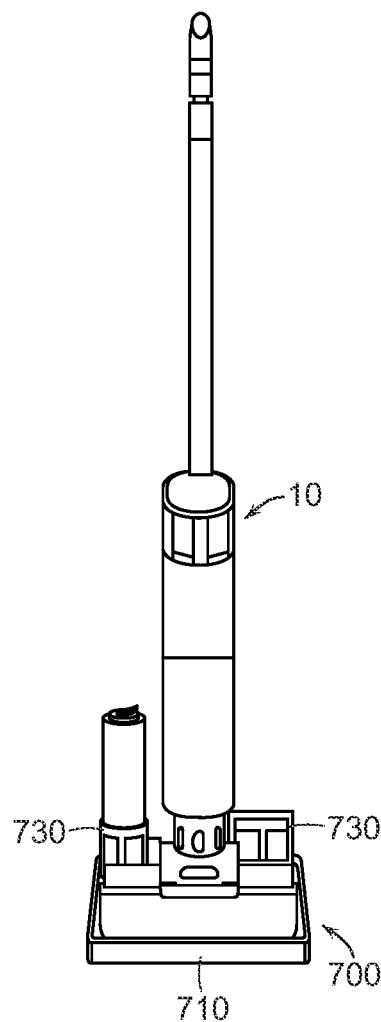
FIG. 16A is a front view of the cleaning device of FIG. 1A placed on a charging mat.
Figure 16B:
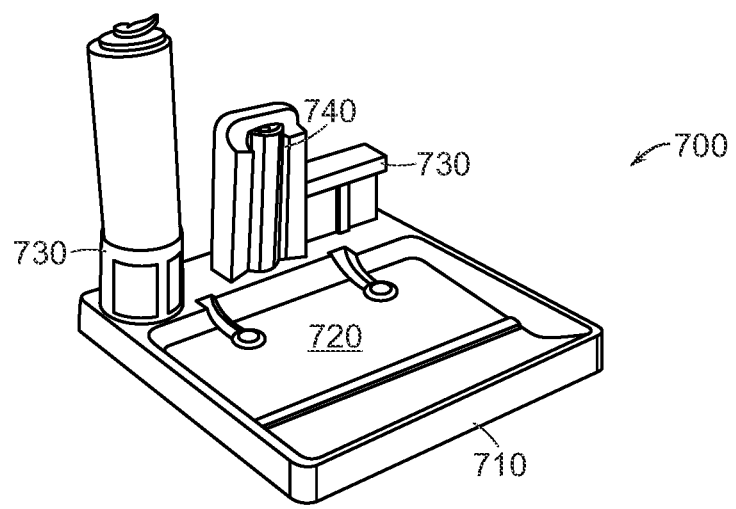
FIG. 16B is a front perspective view of the charging mat of FIG. 16A.
Figure 16C:
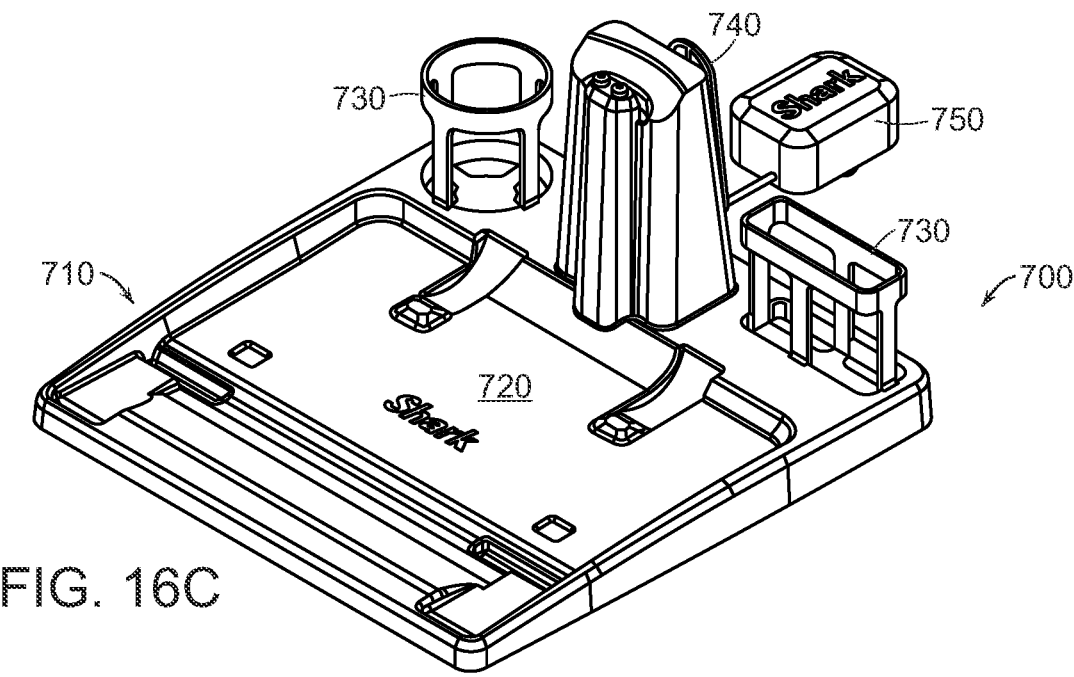
FIG. 16C is a front perspective view of the charging mat of FIG. 16A.
Figure 16D:
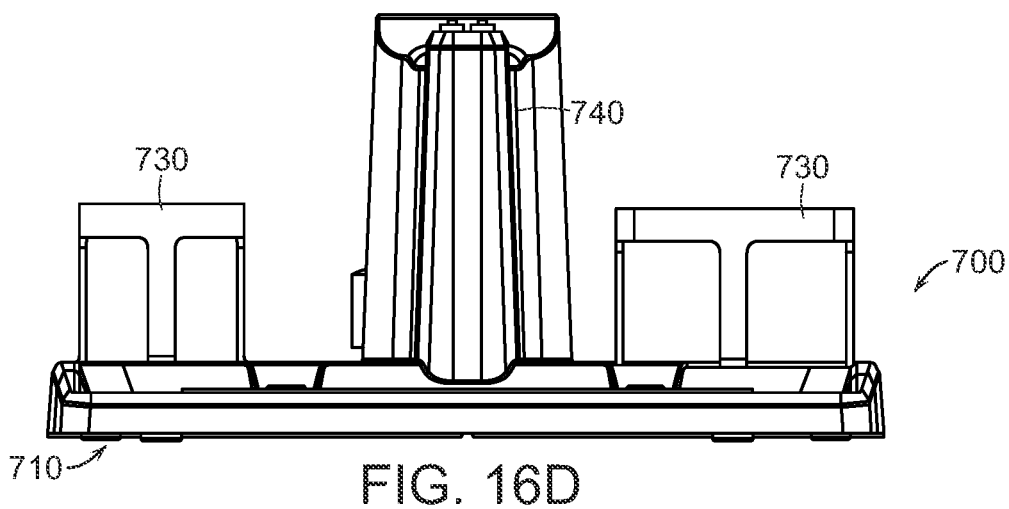
FIG. 16D is a front view of the charging mat of FIG. 16A.
Figure 16E:
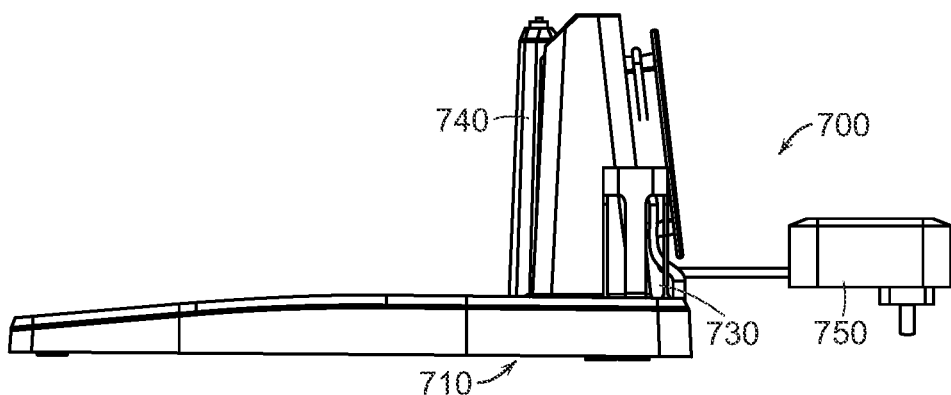
FIG. 16E is a right side view of the charging mat of FIG. 16A.
Figure 16F:
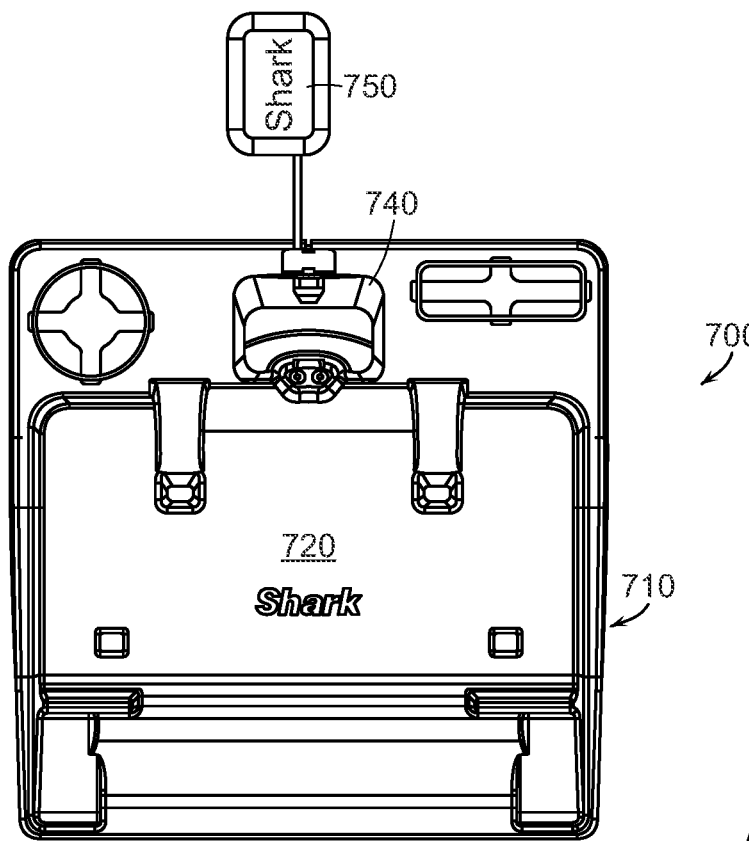
FIG. 16F is a top view of the charging mat of FIG. 16A.
Figure 16G:
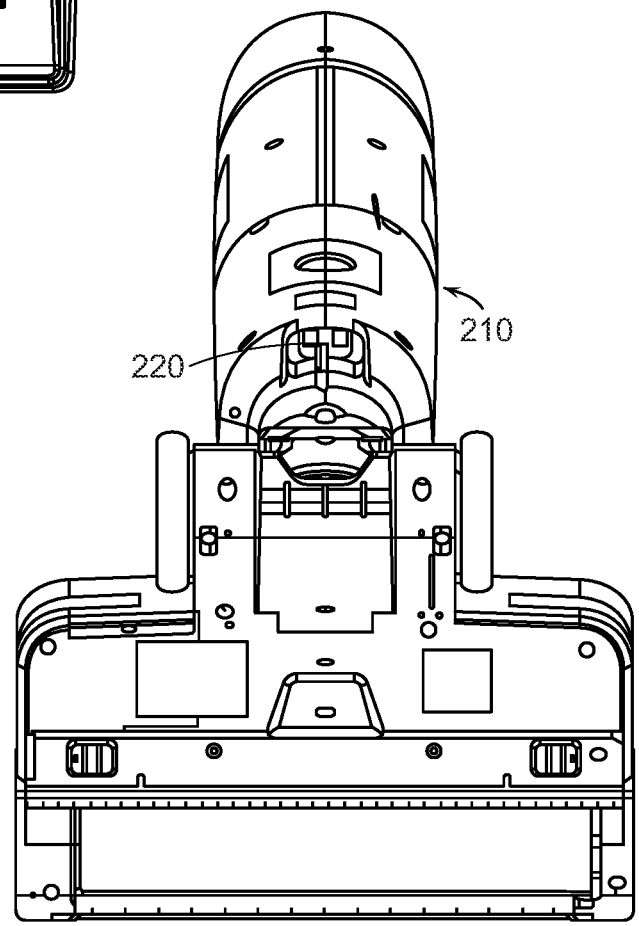
FIG. 16G is a rear perspective view of the cleaning device of FIG. 1A, without a charging mat.
Figure 17A:
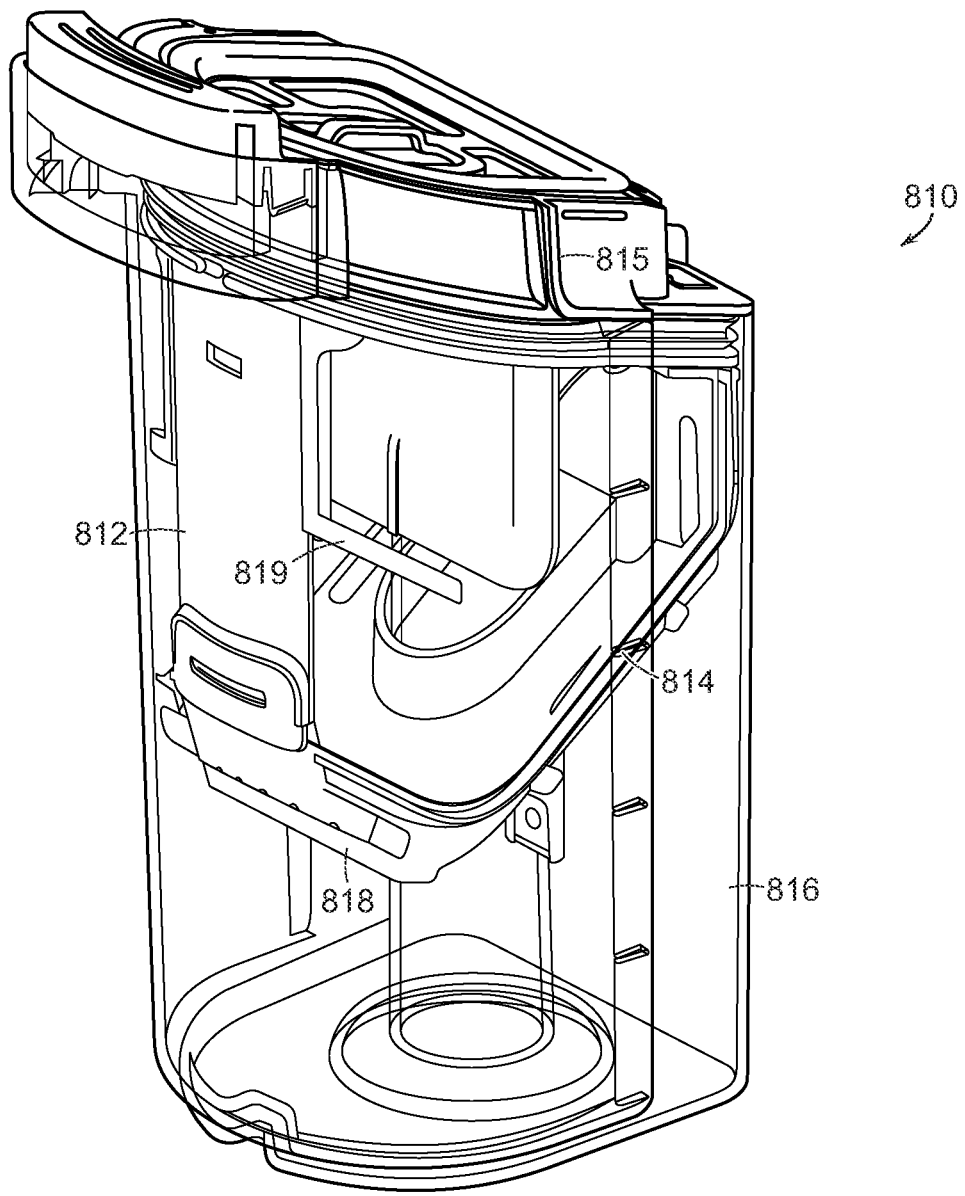
FIG. 17A is a perspective view of another embodiment of a fluid supply tank.
Figure 17B:
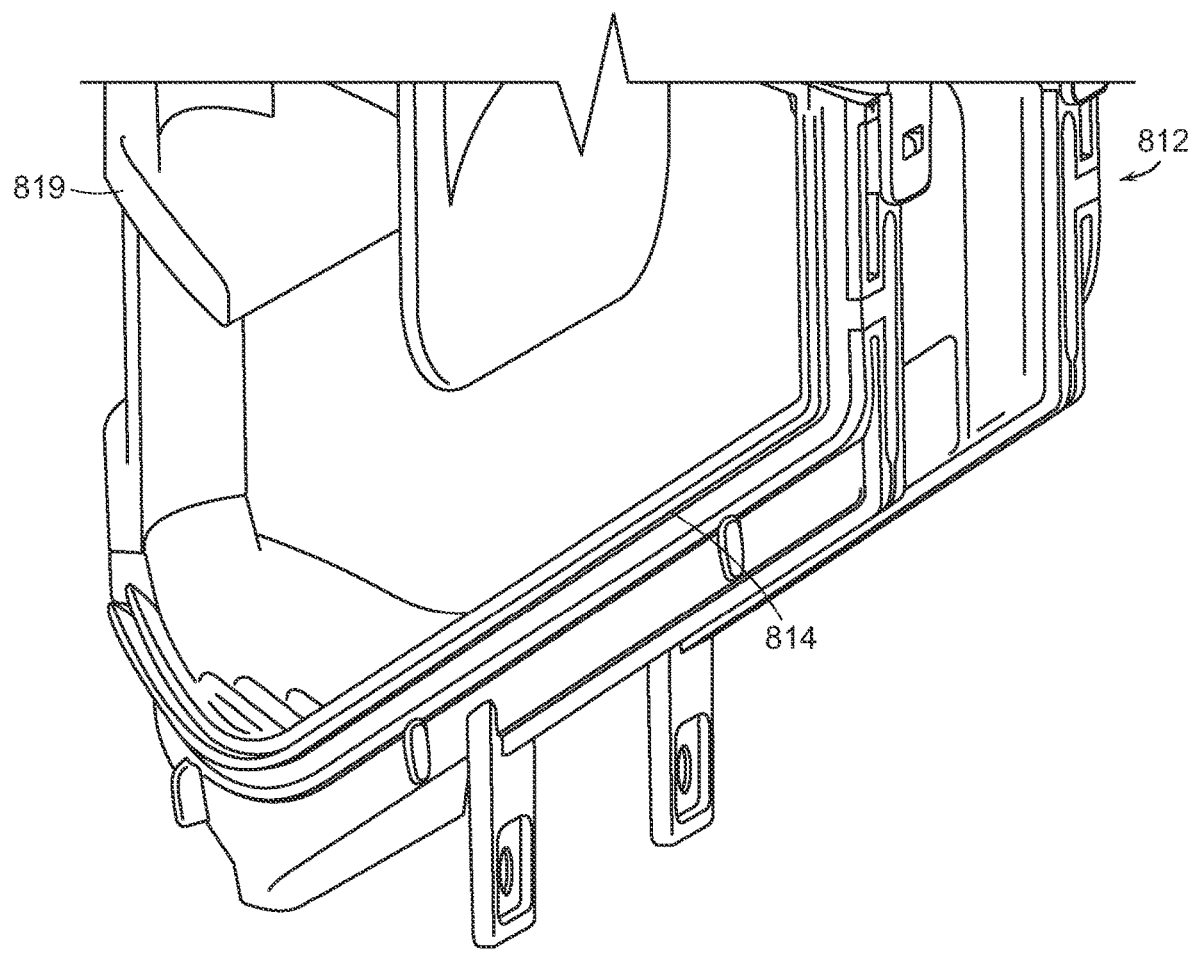
FIG. 17B is a partial perspective view of a separator of the fluid supply tank of FIG. 17A.
Figure 17D:
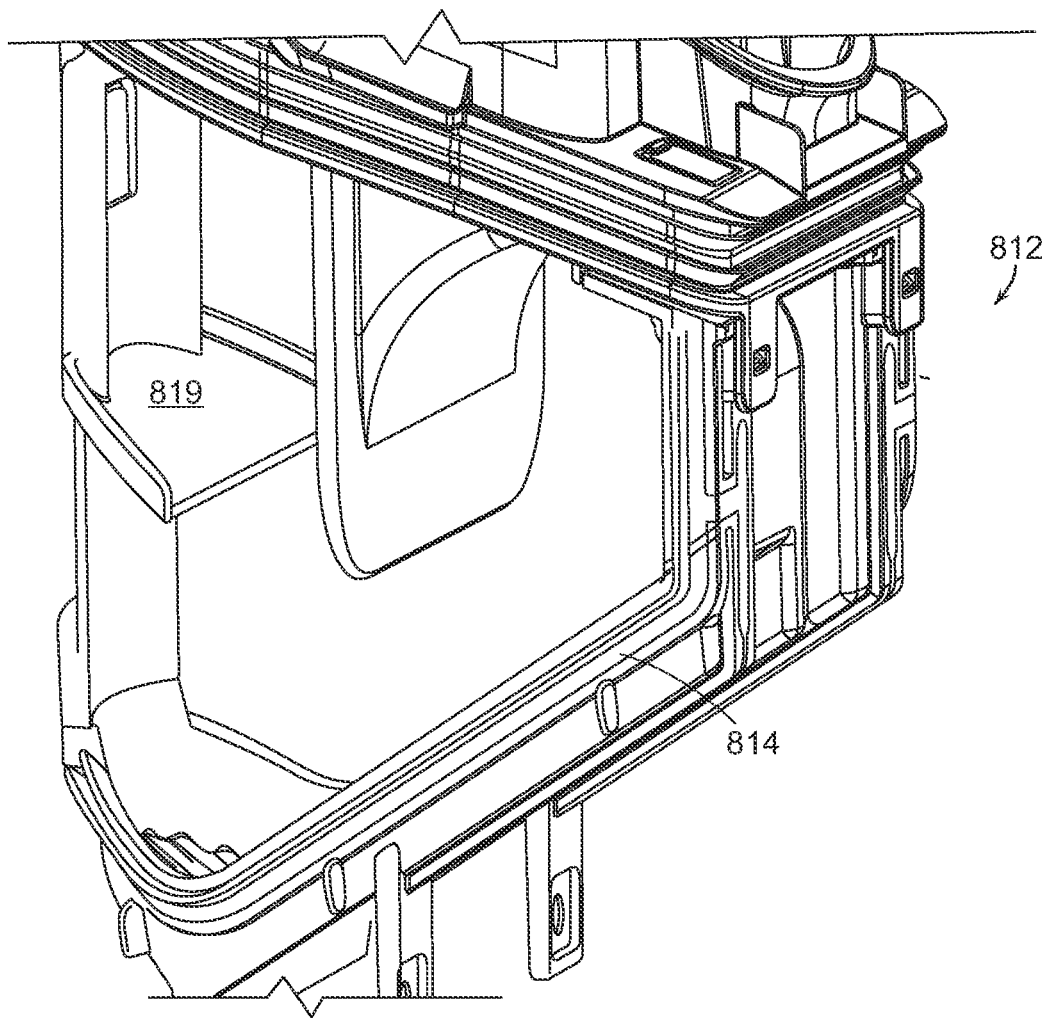
FIG. 17D is another partial perspective view of the separator of FIG. 17B.

Also located at the rear end of the charging mat 700 is a charging port 740 extending upwardly from the base 710. The charging port 740 is configured to electrically couple to electrical contacts 220 located on the cleaning device 10. The contacts 220 on the cleaning device 10 can be found at the rear of the body assembly 210, as depicted in FIG. 16G. Extending from the back of the charging mat 700 is a plug 750, which can be inserted into an outlet to provide the entire charging mat 700—and, in turn, the cleaning device 10—with power. When connected to the charging mat 700, the cleaning device 10 may turn on a battery life indicator to represent a simplified level of charge. In an embodiment, the battery life indicator is a battery image. As the cleaning device 10 charges to various levels, such as 25%, 50%, 75% and 100% capacity, the battery life indicator can proportionally indicate a relative charge level of the cleaning device. In other embodiments, the battery life indicator can be a different image, such as a pie chart, or a simple percentage indicator.

As the cleaning device 10 is used, the same battery indicator can deplete as the device 10 loses power. The battery indicator can indicate the same levels when in use as when charging, displaying the stages in a reverse order as the cleaning device 10 uses power. In some embodiments, the cleaning device 10 can rely on a separate indicator for use during operation of the device 10, in addition to the indicator for use during charging.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cleaning device, comprising:
  a housing body having an upright handle assembly and a head assembly coupled thereto, the housing body having a suction source therein; and
  a fluid recovery tank removably coupled to the housing body, the fluid recovery tank including
    a container having an opening in a top portion thereof extending into an inner chamber configured to hold a liquid therein, the inner chamber having an inlet formed in a bottom wall and configured to receive fluid from the head assembly,
    a separator removably disposed within the opening in the container and configured to separate solid debris from fluid drawn into the inner chamber, and
    a lid removably coupled to the separator, the lid having an outlet fluidly coupled to the suction source such that a suction force can be applied through the outlet, the chamber, and the inlet to the head assembly to draw fluid and debris into the inner chamber, and
    a pour spout formed in the separator and having an opening formed there through and in fluid communication with the inner chamber, wherein the separator is configured to allow fluid to be poured from the pour spout while retaining solid debris in the inner chamber.

2. The cleaning device of claim 1, wherein the separator includes a lower surface that is spaced from the lid and from the bottom wall of the container, the lower surface of the separator having an opening formed therein to allow fluid to pass therethrough while substantially preventing solid debris from passing therethrough.

3. The cleaning device of claim 2, wherein the lower surface of the separator is substantially V-shaped with opposed walls oriented at an angle relative to one another and mated along a lower-most end thereof, the opening being formed between the walls at the lower-most end.

4. The cleaning device of claim 1, wherein the separator includes a sidewall having a channel formed therein and aligned with the pour spout to allow fluid to flow from the container out the pour spot.

5. The cleaning device of claim 1, wherein the separator separates the inner chamber into an upper portion for retaining solid debris, and a lower portion for retaining fluid.

6. The cleaning device of claim 1, wherein the lid includes a removable filter disposed across the outlet.

7. The cleaning device of claim 6, wherein the removable filter comprises a first filter material having a first porosity and a second filter material having a second porosity that is different than the first porosity.

8. The cleaning device of claim 1, further comprising a latch on the container and configured to engage the housing body to retain the fluid recovery tank on the housing body.

9. The cleaning device of claim 8, wherein the latch is positioned on a first side of the container and the pour spout is positioned on a second side of the container opposite the first side.

10. The cleaning device of claim 1, wherein the inlet in the bottom wall includes a hollow standpipe extending from the bottom wall toward the lid and having an inner lumen there through for receiving fluid and debris from the head assembly.

11. The cleaning device of claim 10, wherein the hollow standpipe extends through an opening in the separator to deliver fluid and debris into the separator.

12. The cleaning device claim 1, wherein the separator includes at least one deflector configured to direct fluid away from the lid.

13. The cleaning device of claim 12, wherein the at least one deflector is located proximate to the inlet.

14. The cleaning device of claim 12, wherein the at least one deflector comprises a first deflector located proximate the inlet and a second deflector located below the lid.

15. A fluid recovery tank for use on a cleaning device, comprising:
a container having a bottom wall and sidewalls defining an inner chamber therein, a top of the container being open, the bottom wall including a fluid inlet therein;
a separator removably disposed within the open top of the container and extending into the chamber, the separator having a removable lid disposed therein, and having a pour spout formed therein, the separator separating the chamber into an upper portion and a lower portion, and the separator being configured to retain solid debris within the upper portion while allowing liquid in the bottom portion to be poured out of the pour spout.

16. The fluid recovery tank of claim 15, wherein the separator includes a lower surface that is spaced from the lid and from the bottom wall of the container, the lower surface of the separator having an opening formed therein to allow fluid to pass there through while substantially preventing solid debris from passing there through.

17. The fluid recovery tank of claim 15, wherein the separator includes a sidewall having a channel formed therein and aligned with the pour spout to allow fluid to flow from the container out the pour spot.

18. The fluid recovery tank of claim 15, wherein the lid includes a removable filter disposed therein and configured to allow a suction force to be applied there through.

19. The fluid recovery tank of claim 18, wherein the removable filter includes a first filter material having a first porosity and a second filter material having a second porosity that is different than the first porosity.

20. The fluid recovery tank of claim 15, further comprising a spring-biased latch movably mounted on an exterior surface of the container.

21. The fluid recovery tank of claim 20, wherein the latch is positioned on a first side of the container and the pour spout is positioned on a second side of the container opposite the first side.

22. The fluid recovery tank of claim 15, wherein the inlet in the bottom wall includes a hollow standpipe extending from the bottom wall toward the lid and having an inner lumen there through for receiving fluid and debris from the head assembly, the hollow standpipe extending through an opening in the separator.

23. The fluid recovery tank of claim 15, wherein the pour spout is configured to be in an open position when the lid is in an open position and a closed position.

24. The fluid recovery tank of claim 15, wherein the separator includes a seal configured to frictionally engage the container to create a water-tight seal therewith.

25. The cleaning device claim 15, wherein the separator includes at least one deflector configured to direct fluid away from the lid.

26. The cleaning device of claim 25, wherein the at least one deflector is located proximate to the fluid inlet.

27. The cleaning device of claim 25, wherein the at least one deflector comprises a first deflector located proximate the fluid inlet and a second deflector located below the lid.

* * * * *